(12) United States Patent
Kilian et al.

(10) Patent No.: US 11,909,519 B2
(45) Date of Patent: Feb. 20, 2024

(54) DATA TRANSMITTER AND DATA RECEIVER WITH LOW LATENCY FOR THE TELEGRAM SPLITTING TRANSFER METHOD

(71) Applicant: Fraunhofer-Gesellschaft zur Foerderung der angewandten Forschung e.V., Munich (DE)

(72) Inventors: Gerd Kilian, Erlangen (DE); Josef Bernhard, Erlangen (DE); Guenter Rohmer, Erlangen (DE); Maximilian Roth, Erlangen (DE); Frank Nachtrab, Erlangen (DE); Jakob Kneissl, Erlangen (DE); Johannes Wechsler, Erlangen (DE); Michael Schlicht, Erlangen (DE); Raimund Meyer, Erlangen (DE); Frank Obernosterer, Fuerth (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/868,272

(22) Filed: May 6, 2020

(65) Prior Publication Data
US 2020/0336241 A1    Oct. 22, 2020

Related U.S. Application Data

(63) Continuation of application No. PCT/EP2018/080775, filed on Nov. 9, 2018.

(30) Foreign Application Priority Data

Nov. 10, 2017  (DE) ..................... 10 2017 220 061.8

(51) Int. Cl.
*H04J 3/16* (2006.01)
*H04L 1/00* (2006.01)
(Continued)

(52) U.S. Cl.
CPC .......... *H04L 1/0018* (2013.01); *H04L 1/0003* (2013.01); *H04L 1/0007* (2013.01);
(Continued)

(58) Field of Classification Search
CPC ... H04L 1/0018; H04L 1/0003; H04L 1/0007; H04L 1/0009; H04L 1/1854; H04L 5/0012
See application file for complete search history.

(56) References Cited

U.S. PATENT DOCUMENTS 7,359,343 B2   4/2008 Goodings
8,537,876 B2   9/2013 Tiirola et al.
(Continued)

FOREIGN PATENT DOCUMENTS

CN    1728580 A    2/2006
CN   101599213 A   12/2009
(Continued)

OTHER PUBLICATIONS

Kilian, Gerd, et al., "Improved coverage for low-power telemetry systems using telegram splitting", Proceedings of 2013 European Conference on Smart Objects, Systems and Technologies (SmartSysTech), 2013, 6 pages.
(Continued)

*Primary Examiner* — Abdelnabi O Musa
(74) *Attorney, Agent, or Firm* — Perkins Coie LLP; Michael A. Glenn

(57) ABSTRACT

Embodiments provide transfer methods. The method includes a step of transferring data of a first class from a data transmitter to a data receiver, wherein the data of the first (Continued)

class is transferred divided onto a first plurality of sub-data packets using a first hopping pattern. Furthermore, the method includes a step of transferring data of a second class from the data transmitter or a different data transmitter to the data receiver, wherein the data of the second class is transferred divided onto a second plurality of sub-data packets using a second hopping pattern, wherein transmission pauses between sub-data packets transferred according to the first hopping pattern are smaller than transmission pauses between sub-data packets transferred according to the second hopping pattern.

83 Claims, 30 Drawing Sheets

(51) Int. Cl.
  *H04L 1/1829* (2023.01)
  *H04L 5/00* (2006.01)
(52) U.S. Cl.
  CPC .......... *H04L 1/0009* (2013.01); *H04L 1/1854* (2013.01); *H04L 5/0012* (2013.01)

(56) References Cited

U.S. PATENT DOCUMENTS

| | | | |
|---|---|---|---|
| 8,711,801 B2 | 4/2014 | Vesma et al. | |
| 11,368,186 B2* | 6/2022 | Kilian | H04B 1/7143 |
| 11,671,140 B2* | 6/2023 | Kilian | H04B 1/713 375/133 |
| 2002/0172162 A1 | 11/2002 | Goodings | |
| 2004/0125776 A1 | 7/2004 | Haugli et al. | |
| 2005/0176371 A1 | 8/2005 | Palin et al. | |
| 2005/0207451 A1 | 9/2005 | Partyka | |
| 2006/0025136 A1 | 2/2006 | Fujita et al. | |
| 2007/0249295 A1 | 10/2007 | Ukita et al. | |
| 2009/0303898 A1 | 12/2009 | Isenmann et al. | |
| 2009/0325567 A1 | 12/2009 | Ukita et al. | |
| 2012/0002616 A1 | 1/2012 | Ishii et al. | |
| 2012/0092991 A1 | 4/2012 | Jeong et al. | |
| 2014/0176341 A1 | 6/2014 | Bernhard et al. | |
| 2016/0044729 A1 | 2/2016 | Tu et al. | |
| 2016/0241433 A1 | 8/2016 | Huang et al. | |
| 2016/0248550 A1 | 8/2016 | Sorrentino | |
| 2018/0206209 A1 | 7/2018 | Jechoux et al. | |
| 2018/0220257 A1* | 8/2018 | Bhattad | H04W 4/70 |
| 2019/0246315 A1 | 8/2019 | Kilian et al. | |
| 2019/0253101 A1 | 8/2019 | Kilian et al. | |
| 2019/0253102 A1* | 8/2019 | Kilian | H04L 1/0061 |
| 2019/0273580 A1* | 9/2019 | Petkov | H04L 1/203 |
| 2019/0394636 A1* | 12/2019 | Kilian | H04W 40/244 |
| 2020/0037319 A1* | 1/2020 | Li | H04L 5/0055 |
| 2020/0044687 A1* | 2/2020 | Wechsler | H04L 5/0012 |
| 2020/0177233 A1* | 6/2020 | Kneissl | H04L 5/0044 |
| 2020/0266852 A1* | 8/2020 | Kilian | H04L 1/004 |
| 2021/0036721 A1* | 2/2021 | Kilian | H04B 1/0021 |
| 2021/0194538 A1* | 6/2021 | Kilian | H04L 5/0048 |
| 2022/0345177 A1* | 10/2022 | Kilian | H04B 1/7143 |

FOREIGN PATENT DOCUMENTS

| | | |
|---|---|---|
| CN | 103369725 A | 10/2013 |
| CN | 106372605 A | 2/2017 |
| DE | 10164665 A1 | 8/2002 |
| DE | 102011082098 A1 | 3/2013 |
| DE | 102016220882 A1 | 4/2018 |
| DE | 102016220883 A1 | 4/2018 |
| DE | 102016220884 A1 | 4/2018 |
| EP | 2751526 B1 | 11/2015 |
| KR | 20170042312 A | 4/2017 |
| RU | 2485708 C2 | 3/2013 |
| WO | 2012051044 A1 | 4/2012 |
| WO | 2013030303 A2 | 3/2013 |
| WO | 2015062693 A1 | 5/2015 |
| WO | 2015128385 A1 | 9/2015 |
| WO | 2016022716 A1 | 2/2016 |
| WO | 2017017257 A1 | 2/2017 |
| WO | 2017162740 A1 | 9/2017 |
| WO | 2017167366 A1 | 10/2017 |

OTHER PUBLICATIONS

Kilian, Gerd, et al., "Increasing Transmission Reliability for Telemetry Systems Using Telegram Splitting", IEEE Transactions on Communications, vol. 63, No. 3, pp. 949-961, Mar. 2015, pp. 949-961.

Yuming, Sun, et al., "Fast FH—OFDM Communication Frame Format and Its Verification", (Beijing Institute of Control Engineering, Beijing 10019, China).

ZTE Corporation, "Combination of uplink semi-persistent schedule and frequency hopping", 3GPP TSG RAN WG1 Meeting #49bis Tdoc R1-072907, Jun. 2007.

* cited by examiner

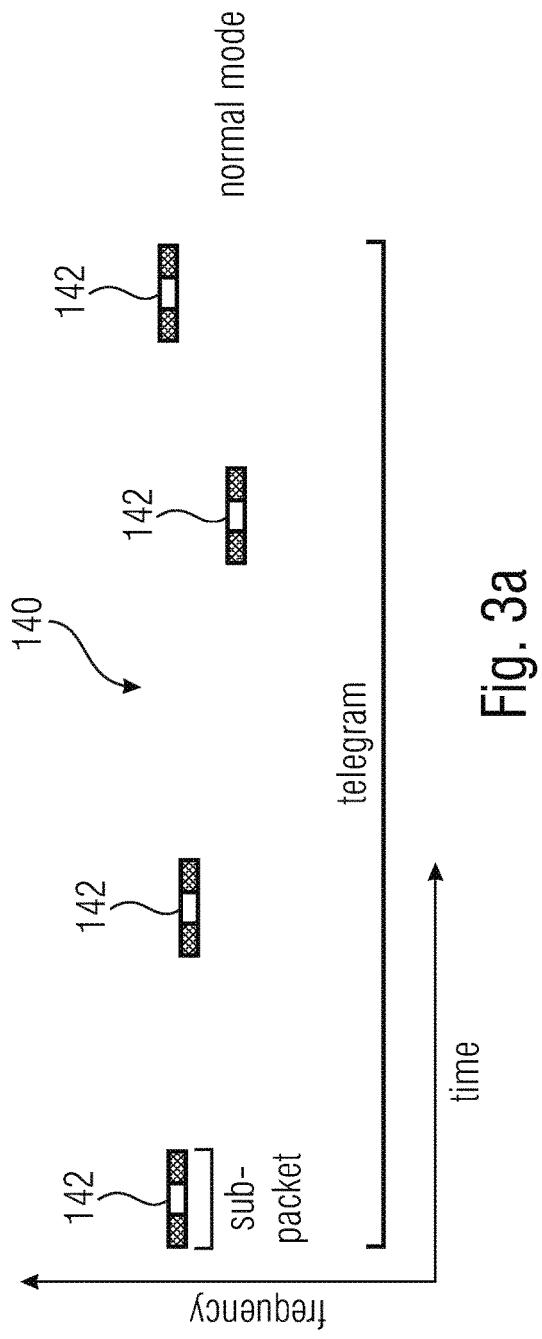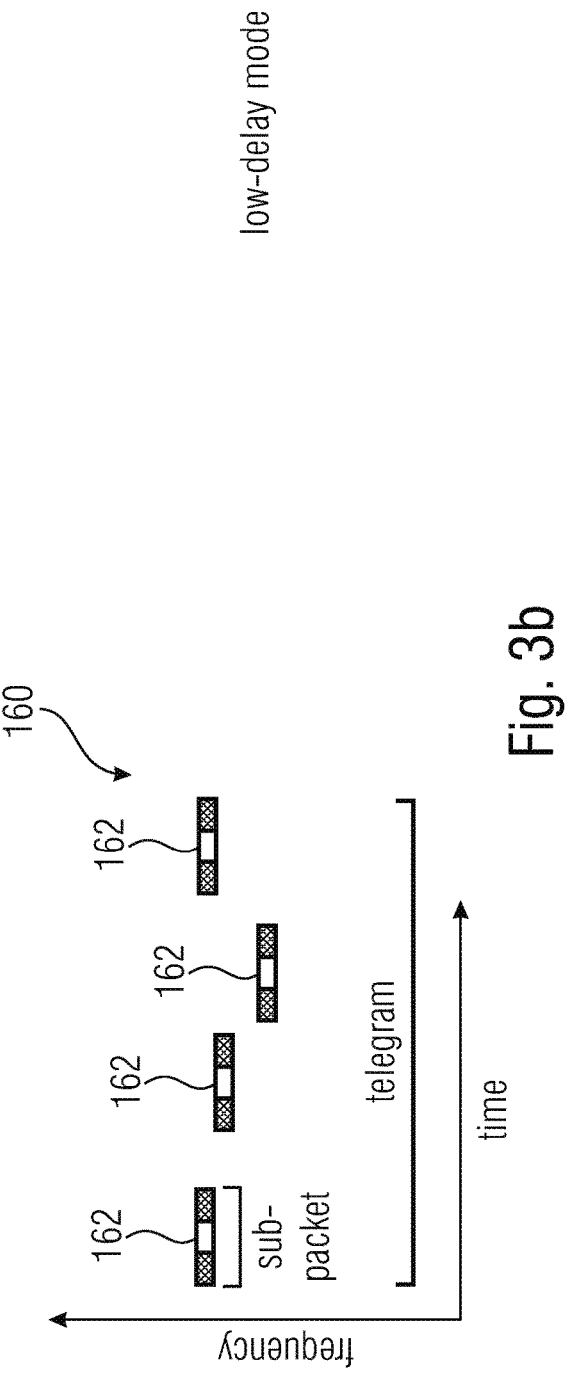

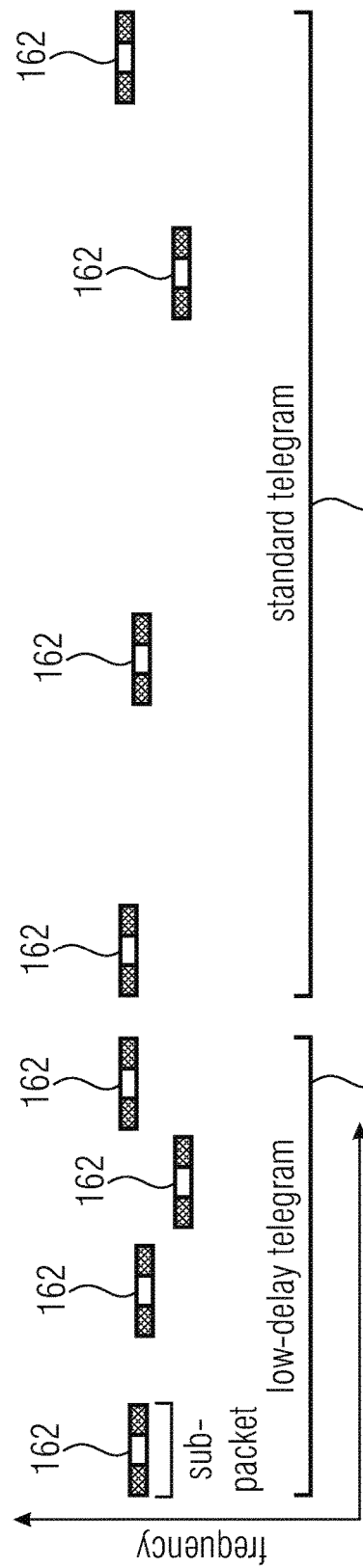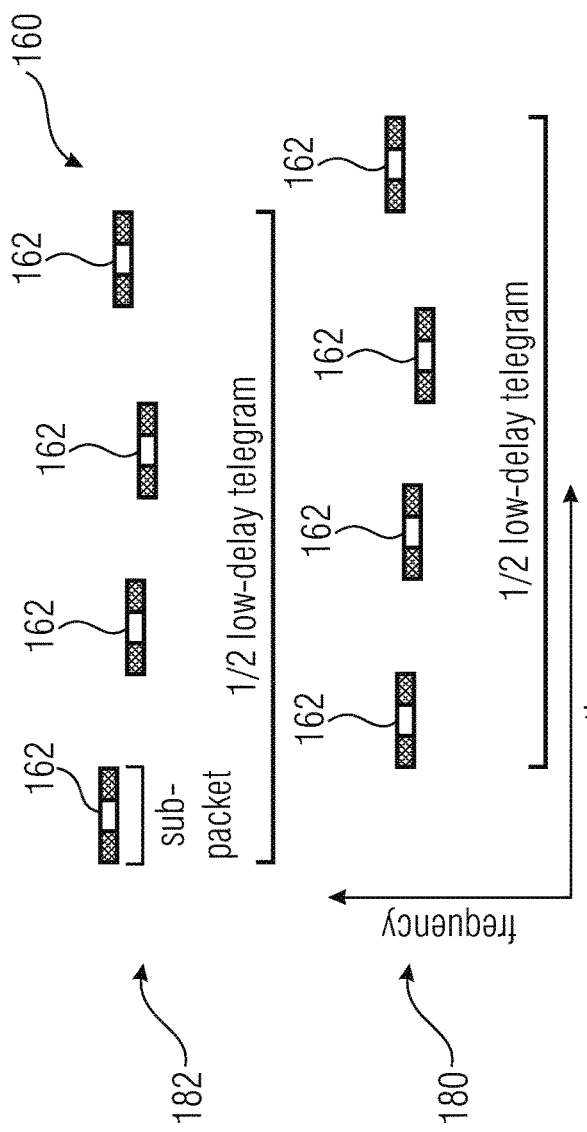

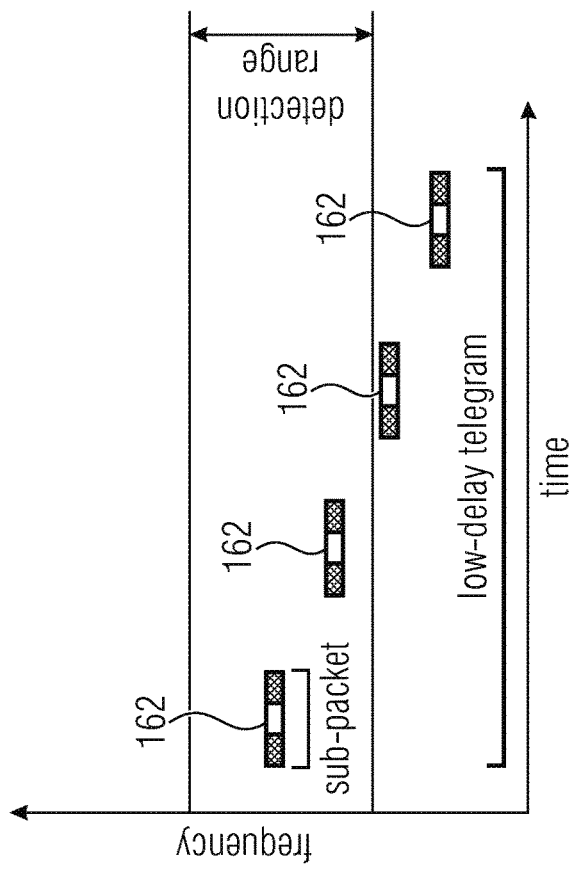
Fig. 27
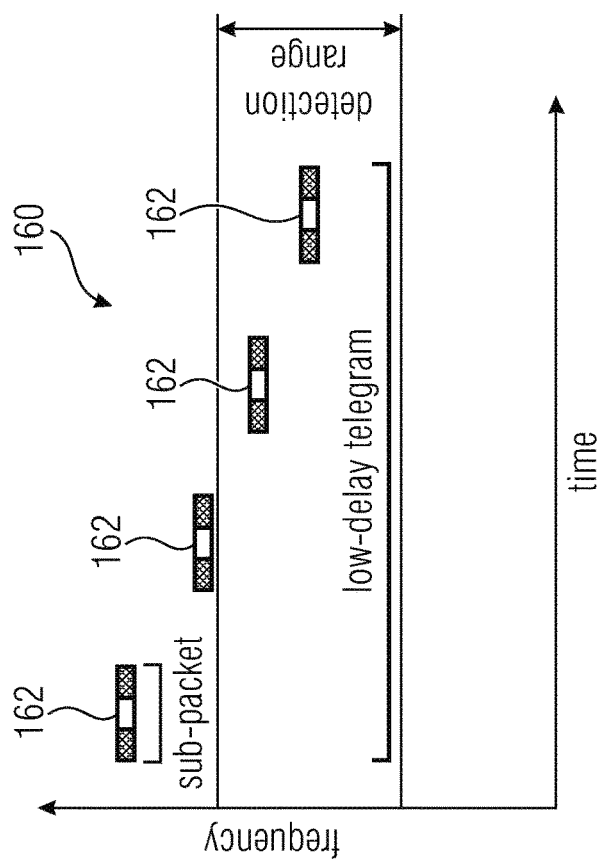
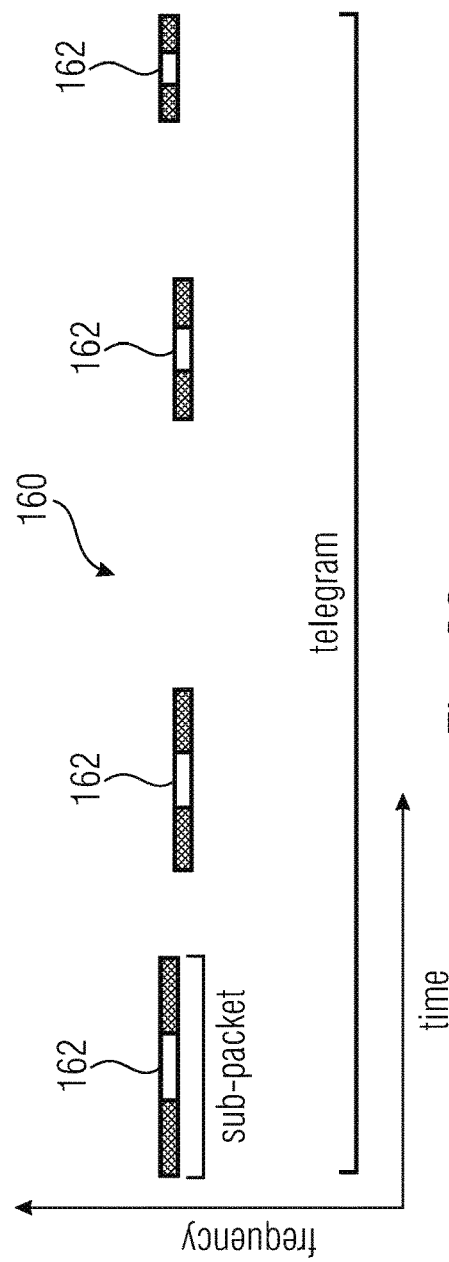
Fig. 28

| pattern number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| | # of sub-packets in the core frame $S_c$ | | | | | | | | | | | | | | | | | | | | | | | |
| 1 | 5 | 4 | 3 | 2 | 17 | 21 | 20 | 19 | 18 | 13 | 12 | 11 | 10 | 6 | 0 | 7 | 22 | 16 | 23 | 14 | 8 | 15 | | |

Fig. 37

| pattern number | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| | # of sub-packets in the core frame $S_c$ | | | | | | | | | | | | | | | | | | | | | | |
| 1 | 66 | 66 | 66 | 66 | 66 | 66 | 66 | 66 | 66 | 123 | 66 | 66 | 66 | 66 | 60 | 66 | 66 | 198 | 66 | 66 | 255 | 66 | 66 |

Groupings: 1st 330, 5th 330, 1st 330, 3rd 330, 1st 387, 5th 387, 3rd 387

Fig. 38

DATA TRANSMITTER AND DATA RECEIVER WITH LOW LATENCY FOR THE TELEGRAM SPLITTING TRANSFER METHOD

CROSS-REFERENCES TO RELATED APPLICATIONS

This application is a continuation of copending International Application No. PCT/EP2018/080775, filed Nov. 9, 2018, which is incorporated herein by reference in its entirety, and additionally claims priority from German Application No. DE 10 2017 220 061.8, filed Nov. 10, 2017, which is incorporated herein by reference in its entirety.

BACKGROUND OF THE INVENTION

Embodiments concern a data transmitter and a data receiver for the telegram splitting transfer method, and in particular a data transmitter and a data receiver with low latency for the telegram splitting transfer method. Some embodiments concern a transfer mode with low latency for the telegram splitting.

Systems for transferring data from many sensor nodes to one base station/several base stations or for transferring data from one base station/several base stations to many sensor nodes are known. For example, this is used in the IoT (IoT=Internet of Things). For example, sensor data (e.g. from street lamps or parking sensors) is transmitted to a base station that then processes the data and provides an added value to the user (e.g. route guidance to a free parking space).

Typically, such sensor networks include a large number of sensor nodes which are equipped with very small batteries. However, in order to achieve a long service life, the channel access is usually carried out in a non-coordinated manner, i.e. each sensor node accesses the channel at random points in time. This concept is also referred to as ALOHA access method or, in a sub-form, as Slotted-ALOHA access method.

Due to the high number of participants and the non-coordinated channel access, overlaps (interferences) occur in the transfer between the emissions of the different sensor nodes. In addition, the transfer often takes place in the so-called ISM bands or SRD bands (ISM=Industrial, Scientific and Medical; SRD=Short Range Devices) which are also used by other systems (e.g. WIFI, Bluetooth, radio keys). These systems cause additional interferences during the transfer.

The telegram splitting transfer method which significantly increases the transfer reliability in the transmission of telegrams in these channels under the above-mentioned conditions is known. In detail, the telegram splitting transfer method described in EP 2 751 526 B1 uses certain time/frequency hopping patterns for the transfer of data via the radio channel. In order to be able to successfully decode a packet, the hopping pattern used for the transmission has to be known at the receiver. In order to ensure this, time/frequency hopping patterns known to all participants are defined for telegram splitting networks.

The telegram splitting transfer method is further described in WO 2015/128385 A1, WO 2017/017257 A1 and WO 2017/167366 A1 and in the publications [G. Kilian, H. Petkov, R. Psiuk, H. Lieske, F. Beer, J. Robert, and A. Neuberger, "Improved coverage for low-power telemetry systems using telegram splitting," in Proceedings of 2013 European Conference on Smart Objects, Systems and Technologies (SmartSysTech), 2013] and [G. Kilian, M. Breiling, H. H. Petkov, H. Lieske, F. Beer, J. Robert, and A. Neuberger, "Increasing Transmission Reliability for Telemetry Systems Using Telegram Splitting," IEEE Transactions on Communications, vol. 63, no. 3, pp. 949-961, March 2015].

However, a disadvantage of the telegram splitting transfer method is the high latency time which results from the pauses between the individual partial packets of the transfer.

In the Internet of Things (IoT), there is a multitude of possible applications; in some applications, the latency time of the system is of secondary importance (e.g. reading out water meters), however, there are also systems in which the latency plays an important role (e.g. pipe bursts or security monitoring of personnel in areas of conflict).

For this second class of systems, in which the latency time plays an important role, a suitable solution for power-efficient sensor networks has not yet been found.

SUMMARY

An embodiment may have a data transmitter configured to divide data of a first class onto a first plurality of sub-data packets and to transmit the first plurality of sub-data packets using a first hopping pattern, wherein the data transmitter is configured to divide data of a second class onto a second plurality of sub-data packets and to transmit the second plurality of sub-data packets using a second hopping pattern, wherein transmission pauses between sub-data packets transmitted according to the first hopping pattern are smaller than transmission pauses between sub-data packets transmitted according to the second hopping pattern, and/or wherein sub-data packets transmitted according to the first hopping pattern are shorter than sub-data packets transmitted according to the second hopping pattern.

Another embodiment may have a data transmitter configured to channel-encode data and to divide the same onto a plurality of sub-data packets and to transmit the plurality of sub-data packets according to a hopping pattern; wherein the data transmitter is configured to channel-encode the data and to divide the same onto the plurality of sub-data packets such that, in a faultless transfer, only a first group of sub-data packets is needed to successfully decode the data, wherein transmission pauses between the sub-data packets of the first group of sub-data packets are smaller than transmission pauses between sub-data packets of a second group of sub-data packets transmitted after the first group of sub-data packets; wherein transmission pauses between the sub-data packets of the first group of sub-data packets are smaller than transmission pauses between sub-data packets of a second group of sub-data packets transmitted after the first group of sub-data packets; wherein the data transmitter is configured to distribute the channel-encoded data of the first class onto the first plurality of sub-data packets such that, in a faulty transfer, a higher coding gain is achieved through a combination of the first group of sub-data packets and the second group of sub-data packets.

Another embodiment may have a data transmitter configured to divide data onto a plurality of sub-data packets and to transmit the plurality of sub-data packets using a first hopping pattern, wherein the data transmitter is configured to repeatedly transmit the plurality of sub-data packets using a second hopping pattern; wherein transmission pauses between sub-data packets transmitted according to the first hopping pattern are smaller than transmission pauses between sub-data packets transmitted according to the second hopping pattern.

Another embodiment may have a data transmitter configured to emit data of a first class using a data packet, and wherein the data transmitter is configured to divide the data onto a plurality sub-data packets and to repeatedly emit the data using the plurality of sub-data packets, wherein the plurality of sub-data packets is emitted according to a first hopping pattern; wherein data transmitter is configured to divide data of a second class onto a second plurality of sub-data packets and to transmit the second plurality of sub-data packets using a second hopping pattern; wherein the transmission pauses between the sub-data packets transmitted according to the first hopping pattern are smaller than the transmission pauses between the sub-data packets transmitted according to the second hopping pattern.

Another embodiment may have a data receiver configured to receive, using a first hopping pattern, data of a first class transferred divided onto a first plurality of sub-data packets, wherein the data receiver is configured to receive, using a second hopping pattern, data of a second class transferred divided onto a second plurality of sub-data packets; wherein transmission pauses between sub-data packets received according to the first hopping pattern are smaller than transmission pauses between sub-data packets received according to the second hopping pattern, and/or wherein sub-data packets transmitted according to the first hopping pattern are shorter than sub-data packets transmitted according to the second hopping pattern.

Another embodiment may have a data receiver for receiving channel-encoded data, wherein the channel-encoded data is divided onto a plurality of sub-data packets and transferred distributed according to a hopping pattern, wherein the data is channel-encoded and divided onto the plurality of sub-data packets such that, in a faultless transfer, only a first group of sub-data packets is needed to successfully decode the data, wherein transmission pauses between the sub-data packets of the first group of sub-data packets are smaller than transmission pauses between sub-data packets of a second group of sub-data packets transmitted after the first group of sub-data packets; wherein the data receiver is configured to receive at least the first group of sub-data packets, and to decode a part of the channel-encoded data received with the first group of sub-data packets in order to acquire the data; wherein the data receiver is configured to, if decoding the data has not been successful, combine, for achieving a higher coding gain, at least a second part of the channel-encoded data received with at least a second group of sub-data packets with the first part of the channel-encoded data and to decode the same in order to acquire the data.

Another embodiment may have a data receiver configured to receive data divided onto a plurality of sub-data packets and transferred using a first hopping pattern and repeatedly using a second hopping pattern; wherein transmission pauses between sub-data packets transferred according to the first hopping pattern are smaller than transmission pauses between sub-data packets transferred according to the second hopping pattern.

Another embodiment may have a data receiver configured to receive data of a first class transferred using a data packet, and wherein the data receiver is configured to receive, according to a first hopping pattern, the data divided on a plurality of data packets and transferred repeatedly using the plurality of sub-data packets; wherein the data receiver is configured to transmit an acknowledgement of receipt in a temporal interval between the reception of the data packet and the plurality of sub-data packets; wherein transmission pauses between sub-data packets received according to the first hopping pattern are smaller than transmission pauses between sub-data packets received according to the second hopping pattern.

Another embodiment may have a system including an inventive data transmitter and inventive data receiver.

Another embodiment may have a transfer method, having the steps of: transferring data of a first class from a data transmitter to a data receiver, wherein the data of the first class is transferred divided onto a first plurality of sub-data packets using a first hopping pattern; transferring data of a second class from the data transmitter or a different data transmitter to the data receiver, wherein the data of the second class is transferred divided onto a second plurality of sub-data packets using a second hopping pattern; wherein transmission pauses between sub-data packets transferred according to the first hopping pattern are smaller than transmission pauses between sub-data packets transferred according to the second hopping pattern.

Another embodiment may have a non-transitory digital storage medium having a computer program stored thereon to perform the transfer method, having the steps of: transferring data of a first class from a data transmitter to a data receiver, wherein the data of the first class is transferred divided onto a first plurality of sub-data packets using a first hopping pattern; transferring data of a second class from the data transmitter or a different data transmitter to the data receiver, wherein the data of the second class is transferred divided onto a second plurality of sub-data packets using a second hopping pattern; wherein transmission pauses between sub-data packets transferred according to the first hopping pattern are smaller than transmission pauses between sub-data packets transferred according to the second hopping pattern, when said computer program is run by a computer.

Another embodiment may have a data transmitter configured to transmit, distributed in time and/or frequency according to a hopping pattern, data divided onto a plurality of sub-data packets, wherein the hopping pattern is a time hopping pattern, a frequency hopping pattern or a combination of the time hopping pattern and the frequency hopping pattern, wherein the time hopping pattern is the time hopping pattern with 24 hops indicated in the following table:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 66 | 66 | 66 | 66 | 66 | 66 | 66 | 66 | 66 | 123 | 66 | 66 | 66 | 60 | 60 | 66 | 66 | 198 | 66 | 66 | 255 | 66 | 66 | wherein the line in the table is the time hopping pattern, wherein each column in the table is a hop of the time hopping pattern starting from a second hop so that each time hopping pattern has 24 hops, wherein each cell in the table indicates a temporal interval of a reference point of the respective hop to a same reference point of an immediately subsequent hop in—advantageously multiples of—symbol durations; wherein the frequency hopping pattern is the frequency hopping pattern with 24 hops indicated in the following table:

| # of sub-data packets in the core frame SC |
|---|

| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | 1 | 5 | 4 | 3 | 2 | 17 | 21 | 20 | 19 | 18 | 9 | 13 | 12 | 11 | 10 | 6 | 0 | 7 | 22 | 16 | 23 | 14 | 8 | 15 | wherein the line in the table is the frequency hopping pattern, wherein each column in the table is a hop of the frequency hopping pattern, wherein each cell in the table indicates a transmission frequency of the respective hop of the frequency hopping pattern in carriers of UCG_C0 to UCG_C23.

Another embodiment may have a data receiver configured to receive data transferred divided onto a plurality of sub-data packets and distributed in time and/or frequency according to a hopping pattern, wherein the hopping pattern is a time hopping pattern, a frequency hopping pattern or a combination of the time hopping pattern and the frequency hopping pattern, wherein the time hopping pattern is the time hopping pattern with 24 hops indicated in the following table:

| # of sub-data packets in the core frame SC |
|---|

| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| 1 | 66 | 66 | 66 | 66 | 66 | 66 | 66 | 66 | 66 | 123 | 66 | 66 | 66 | 66 | 60 | 66 | 66 | 198 | 66 | 66 | 255 | 66 | 66 | wherein the line in the table is the time hopping pattern, wherein each column in the table is a hop of the time hopping pattern starting from a second hop so that each time hopping pattern has 24 hops, wherein each cell in the table indicates a temporal interval of a reference point of the respective hop to a same reference point of an immediately subsequent hop in—advantageously multiples of—symbol durations; wherein the frequency hopping pattern is the frequency hopping pattern with 24 hops indicated in the following table:

| # of sub-data packets in the core frame SC |
|---|

| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 1 | 1 | 5 | 4 | 3 | 2 | 17 | 21 | 20 | 19 | 18 | 9 | 13 | 12 | 11 | 10 | 6 | 0 | 7 | 22 | 16 | 23 | 14 | 8 | 15 | wherein the line in the table is the frequency hopping pattern, wherein each column in the table is a hop of the frequency hopping pattern, wherein each cell in the table indicates a transmission frequency of the respective hop of the frequency hopping pattern in carriers of UCG_C0 to UCG_C23.

Another embodiment may concern transmitting data using a hopping pattern, wherein the hopping pattern is a time hopping pattern, a frequency hopping pattern or a combination of the time hopping pattern and the frequency hopping pattern, wherein the time hopping pattern is the time hopping pattern with 24 hops indicated in the following table:

| # of sub-data packets in the core frame SC |
|---|

| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| 1 | 66 | 66 | 66 | 66 | 66 | 66 | 66 | 66 | 66 | 123 | 66 | 66 | 66 | 66 | 60 | 66 | 66 | 198 | 66 | 66 | 255 | 66 | 66 | wherein the line in the table is the time hopping pattern, wherein each column in the table is a hop of the time hopping pattern starting from a second hop so that each time hopping pattern has 24 hops, wherein each cell in the table indicates a temporal interval of a reference point of the respective hop to a same reference point of an immediately subsequent hop in—advantageously multiples of—symbol durations; wherein the frequency hopping pattern is the frequency hopping pattern with 24 hops indicated in the following table:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 1 | 5 | 4 | 3 | 2 | 17 | 21 | 20 | 19 | 18 | 9 | 13 | 12 | 11 | 10 | 6 | 0 | 7 | 22 | 16 | 23 | 14 | 8 | 15 | wherein the line in the table is the frequency hopping pattern, wherein each column in the table is a hop of the frequency hopping pattern, wherein each cell in the table indicates a transmission frequency of the respective hop of the frequency hopping pattern in carriers of UCG_C0 to UCG_C23.

Another embodiment may concern receiving data using a hopping pattern, wherein the hopping pattern is a time hopping pattern, a frequency hopping pattern or a combination of the time hopping pattern and the frequency hopping pattern, wherein the time hopping pattern is the time hopping pattern with 24 hops indicated in the following table:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | |
| 1 | 66 | 66 | 66 | 66 | 66 | 66 | 66 | 66 | 66 | 123 | 66 | 66 | 66 | 66 | 60 | 66 | 66 | 198 | 66 | 66 | 255 | 66 | 66 | | wherein the line in the table is the time hopping pattern, wherein each column in the table is a hop of the time hopping pattern starting from a second hop so that each time hopping pattern has 24 hops, wherein each cell in the table indicates a temporal interval of a reference point of the respective hop to a same reference point of an immediately subsequent hop in—advantageously multiples of—symbol durations; wherein the frequency hopping pattern is the frequency hopping pattern with 24 hops indicated in the following table:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 1 | 5 | 4 | 3 | 2 | 17 | 21 | 20 | 19 | 18 | 9 | 13 | 12 | 11 | 10 | 6 | 0 | 7 | 22 | 16 | 23 | 14 | 8 | 15 | wherein the line in the table is the frequency hopping pattern, wherein each column in the table is a hop of the frequency hopping pattern, wherein each cell in the table indicates a transmission frequency of the respective hop of the frequency hopping pattern in carriers of UCG_C0 to UCG_C23.

Another embodiment may have a data transmitter configured to divide data of a first class onto a first plurality of sub-data packets and to transmit the first plurality of sub-data packets using a first hopping pattern, wherein the data transmitter is configured to divide data of a second class onto a second plurality of sub-data packets and to transmit the second plurality of sub-data packets using a second hopping pattern, wherein transmission pauses between sub-data packets transmitted according to the first hopping pattern are smaller than transmission pauses between sub-data packets transmitted according to the second hopping pattern, and/or wherein sub-data packets transmitted according to the first hopping pattern are shorter than sub-data packets transmitted according to the second hopping pattern; wherein the data transmitter is configured to channel-encode the data of the first class and transmit the same using the first hopping pattern, wherein the data transmitter is configured to distribute the channel-encoded data of the first class onto the first plurality of sub-data packets such that, in a faultless transfer, only a first group of sub-data packets is needed to successfully decode the data of the first class, and such that, in a faulty transfer, a higher coding gain is achieved through a combination of the first group of sub-data packets and a second group of sub-data packets, wherein the first group of sub-data packets is transmitted temporally before the second group of sub-data packets.

Another embodiment may have a data receiver configured to receive, using a first hopping pattern, data of a first class transferred divided onto a first plurality of sub-data packets, wherein the data receiver is configured to receive, using a second hopping pattern, data of a second class transferred divided onto a second plurality of sub-data packets; wherein transmission pauses between sub-data packets received according to the first hopping pattern are smaller than transmission pauses between sub-data packets received according to the second hopping pattern, and/or wherein sub-data packets transmitted according to the first hopping pattern are shorter than sub-data packets transmitted according to the second hopping pattern; wherein the data of the first class is channel-encoded, wherein the channel-encoded data of the first class is distributed onto the first plurality of sub-data packets such that, in a faultless transfer, only a first group of sub-data packets is needed to successfully decode the data of the first class, and such that, in a faulty transfer, a higher coding gain is achieved through a combination of the first group of sub-data packets and a second group of sub-data packets, wherein the first group of sub-data packets is transferred temporally before the second group of sub-data packet; wherein the data receiver is configured to decode a first part of the channel-encoded data received with the first group of sub-data packets in order to acquire the data of the first class, and, if decoding the data of the first class has not been successful, to combine, for achieving a higher coding gain, at least a second part of the channel-encoded data received with at least a second group of sub-data packets with the first part of the channel-encoded data and to decode the same in order to acquire the data of the first class.

Embodiments provide a data transmitter configured to divide data of a first class onto a first plurality of sub-data packets and to transmit the first plurality of sub-data packets using a first hopping pattern, wherein the data transmitter is configured to divide data of a second class onto a second plurality of sub-data packets and to transmit the second plurality of sub-data packets using a second hopping pattern, wherein transmission pauses between sub-data packets transmitted according to the first hopping pattern are smaller than transmission pauses between sub-data packets transmitted according to the second hopping pattern, and/or wherein sub-data packets transmitted according to the first hopping pattern are shorter than sub-data packets transmitted according to the second hopping pattern.

In embodiments, the data of the first class may comprise a higher priority and/or higher requirements as to a maximum transfer duration than the data of the second class.

In embodiments, the data transmitter is configured to divide data of a third class onto a third plurality of sub-data packets and to transmit the third plurality of sub-data packets using a third hopping pattern, wherein the transmission pauses between the sub-data packets transmitted according to the second hopping pattern are smaller than transmission pauses between sub-data packets transmitted according to the third hopping pattern.

In embodiments, the data of the second class may comprise a higher priority and/or higher requirements as to a maximum transfer duration than the data of the third class.

In embodiments, the data transmitter is configured to divide the data of the first class or a first data packet comprising the data of the first class onto the first plurality of sub-data packets such that each of the first plurality of sub-data packets comprises only a part of the data of the first class or of the first data packet, wherein the data transmitter is configured to divide the data of the second class or a second data packet comprising the data of the second class onto the second plurality of sub-data packets such that each of the second plurality of sub-data packets only comprises a part of the data of the second class or of the second data packet.

In embodiments, the first plurality of sub-data packets comprises fewer sub-data packets than the second plurality of sub-data packets.

In embodiments, the data transmitter is configured to provide sub-data packets transmitted according to the first hopping pattern and/or to the second hopping pattern with synchronization sequences such that a temporal interval between synchronization sequences of the sub-data packets transmitted with the first hopping pattern and synchronization sequences of the sub-data packets transmitted with the second hopping pattern is the same.

In embodiments, sub-data packets transmitted according to the first hopping pattern are longer than sub-data packets transmitted according to the second hopping pattern.

In embodiments, sub-data packets transmitted according to the first hopping pattern are distributed across a larger frequency range than sub-data packets transmitted according to the second hopping pattern.

In embodiments, the data transmitter is configured to transmit the data of the first class with a higher data rate or a different modulation method than the data of the second class.

In embodiments, the data transmitter is configured to receive a first message temporally synchronized to the transmission of the data of the first class using the first hopping pattern, and wherein the data transmitter is configured to receive a second message temporally synchronized to the transmission of the data of the second class using the second hopping pattern, wherein a temporal interval between the first hopping pattern and the first message is smaller than a temporal interval between the second hopping pattern and the second message.

In embodiments, the first message is a first downlink message transferred divided onto a plurality of sub-data packets according to a first downlink hopping pattern, wherein the second message is a second downlink message transferred divided onto a plurality of sub-data packets according to a second downlink hopping pattern, wherein transmission pauses between the plurality of sub-data packets transferred by means of the first downlink hopping pattern are shorter than transmission pauses between the plurality of sub-data packets transferred by means of the second downlink hopping pattern.

In embodiments, the data transmitter is configured, upon transmitting the data of the first class, to receive from a data receiver an acknowledgement of receipt signalizing a successful receipt of the data of the first class.

In embodiments, the data transmitter is configured to emit the data of the first class repeatedly using the first hopping pattern or a different hopping pattern until the acknowledgement of receipt has been received.

In embodiments, the data transmitter is configured to receive from the data receiver the acknowledgement of receipt temporally overlapping to the emission of:
the data of the first class using the first hopping pattern,
or the data of the second class using the second hopping pattern,
so that at least one sub-data packet transmitted according to the respective hopping pattern is arranged between two sub-data packets of a hopping pattern with which the acknowledgement of receipt of the data receiver is emitted.

In embodiments, the data transmitter is configured to transmit at least two sub-data packets according to the first hopping pattern on different frequencies and with a full temporal overlap or at least a partial temporal overlap.

In embodiments, the data transmitter is configured to calculate at least a part of the first hopping pattern from the data of the first class or a channel-encoded version of the data of the first class so that at least a part of the first hopping pattern itself encodes at least a part of the data of the first class.

In embodiments, a first group of hops of the first hopping pattern is specified, wherein the data transmitter is configured to calculate a second group of hops of the first hopping pattern from the data of the first class or a channel-encoded version of the data of the first class so that the second group of hops of the first hopping pattern itself encodes at least a part of the data of the first class, wherein the data transmitter is configured to transmit the first plurality of sub-data packets according to the first group of hops and the second group of hops.

In embodiments, the data transmitter is configured to calculate the first hopping pattern from the data of the first class or a channel-encoded version of the data of the first class so that at least a part of the first hopping pattern itself encodes at least a part of the data of the first class, wherein the data transmitter is configured to transmit the first hopping pattern temporally synchronized to a synchronization signal for synchronization in a data receiver.

In embodiments, the data transmitter is configured to divide the data of the first class onto the first plurality of sub-data packets such that, in a faultless transfer, each sub-data packet for itself may be decoded at the receiver side in order to obtain data of the first class, and such that, in a faulty transfer, a higher coding gain is achieved through a combination of at least two of the sub-data packets.

In embodiments, the data transmitter is configured to channel-encode the data of the first class and transmit the same using the first hopping pattern, wherein the data transmitter is configured to distribute the channel-encoded data of the first class onto the first plurality of sub-data packets such that, in a faultless transfer, only a first group of sub-data packets is needed to successfully decode the data of the first class, and such that, in a faulty transfer, a higher coding gain is achieved through a combination of the first group of sub-data packets and a second group of sub-data packets, wherein the first group of sub-data packets is transmitted temporally before the second group of sub-data packets.

In embodiments, the data of the first class comprises core information and extension information, wherein the data transmitter is configured to divide the data of the first class onto the first plurality of sub-data packets such that as first group of sub-data packets comprises the core information and a second group of sub-data packets comprises the extension information, wherein the first group of sub-data packets is transmitted temporally before the second group of sub-data packets.

In embodiments, the data transmitter is configured to calculate the first hopping pattern using address information of the data transmitter or information derived therefrom so that the first hopping pattern itself identifies the data transmitter.

In embodiments, the data transmitter is further configured to calculate the first hopping pattern using time-dependent or event-dependent information of the data transmitter.

In embodiments, the data transmitter is configured to transmit encoded or encrypted information about the first hopping pattern in advance to a data receiver.

In embodiments, the first hopping pattern is assigned to the data receiver by a base station.

In embodiments, the data transmitter is configured to obtain, from a base station of a communication network, short address information that is shorter than address information unambiguously identifying the data transmitter within the communication network and to use the same when emitting with the first hopping pattern.

In embodiments, the data transmitter is configured to calculate the first hopping pattern from the short address information so that the first hopping pattern itself identifies the data transmitter.

In embodiments, the short address information is assigned to a group of data transmitters, wherein the group of data transmitters is arranged in a spatially related area.

In embodiments, the data of the first class is short information derived from a sensor value and being shorter than the sensor value.

In embodiments, the data transmitter is configured to transmit in advance to a data receiver the short information and a sensor value associated to the short information or a group of sensor values associated to the short information.

In embodiments, the first hopping pattern is assigned to the data transmitter by a base station according to frequency of use and/or a priority.

In embodiments, sub-data packets transmitted according to the first hopping pattern comprises the same temporal interval and frequency interval.

In embodiments, the data transmitter is configured to calculate at least a part of a synchronization sequence for synchronizing the first plurality of sub-data packets in a data receiver from at least a part of the data of the first class, the first class, address information of the data transmitter or short address information of the data transmitter.

In embodiments, the data transmitter is configured to channel-encode data of the first class and to transmit the same using the first hopping pattern, wherein the data transmitter is configured to distribute the channel-encoded data of the first class onto the first plurality of sub-data packets such that, in a faultless transfer, only a first group of sub-data packets is needed to successfully decode the data of the first class, wherein the data transmitter is configured to transmit the first group of sub-data packets with a different data rate than a second group of sub-data packets.

In embodiments, the data transmitter is configured to distribute the channel-encoded data of the first class onto the first plurality of sub-data packets such that, in a faulty transfer, a higher coding gain is achieved through a combination of the first group of sub-data packets and the second group of sub-data packets.

In embodiments, the data transmitter is configured to channel-encode the data of the first class and to divide the same onto the first plurality of sub-data packets, wherein the data transmitter is configured to successively increase or decrease a data rate with which the sub-data packets are transmitted.

In embodiments, the data transmitter is configured such that a length of the sub-data packets of the first plurality of sub-data packets decreases or increases with an increasing number of transmitted sub-data packets.

In embodiments, a transmission power is specified to the data transmitter by a base station, or wherein the data transmitter is configured to select a transmission power depending on a priority or channel occupancy.

Further embodiments provide a data transmitter configured to channel-encode data and to divide the same onto a plurality of sub-data packets and to transmit the first plurality of sub-data packets according to a hopping pattern, wherein the data transmitter is configured to channel-encode the data and to divide the same onto the plurality of sub-data packets such that, in a faultless transfer, only a first group of sub-data packets is needed to successfully decode the data, wherein transmission pauses between the sub-data packets of the first group of sub-data packets are smaller than transmission pauses between sub-data packets of a second group of sub-data packets transmitted after the first group of sub-data packets.

In embodiments, the transmission pauses between the sub-data packets of the first group or second group or both groups of sub-data packets may increase with an increasing number of transmitted sub-data packets.

Further embodiments provide a data transmitter configured to divide data onto a plurality of sub-data packets and to transmit the plurality of sub-data packets using a first hopping pattern, wherein the data transmitter is configured to repeatedly transmit the plurality of sub-data packets using a second hopping pattern, wherein transmission pauses between sub-data packets transmitted according to the first hopping pattern are smaller than transmission pauses between sub-data packets transmitted according to the second hopping pattern.

In embodiments, the first hopping pattern may extend across two separate frequency bands.

In embodiments, the data transmitter is configured to transmit the data using the first hopping pattern twice in two separate frequency bands.

In embodiments, the data transmitter is configured to emit the data using the second hopping pattern in two separate frequency bands.

In embodiments, the data transmitter is configured to transmit the data using the second hopping pattern twice in two separate frequency bands.

In embodiments, the data transmitter is configured to emit in an interleaved manner the data using the first hopping pattern and repeatedly using the second hopping pattern so that at least one sub-data packet transmitted according to the second hopping pattern is arranged between two sub-data packets transmitted according to the first hopping pattern.

Further embodiments provide a data transmitter configured to emit data of a first class using a data packet, and wherein the data transmitter is configured to repeatedly emit the data using a plurality of sub-data packets, wherein the plurality of sub-data packets is emitted according to a first hopping pattern.

In embodiments, the data transmitter is configured to repeatedly emit the data of the first class using a further data packet.

In embodiments, the data transmitter is configured to emit in a temporally interleaved manner the data of the first class using the further data packet and using the plurality of sub-data packets so that the further data packet is temporally arranged between two of the plurality of sub-data packets.

In embodiments, the data transmitter is configured to select a temporal interval between the emission of the data packet and the plurality of sub-data packets to have such a size that receiving an acknowledgement of receipt from a data receiver is possible in the temporal interval.

In embodiments, the data transmitter is configured to divide data of a second class onto a second plurality of sub-data packets and to transmit the second plurality of sub-data packets using a second hopping pattern, wherein the transmission pauses between the sub-data packets transmitted according to the first hopping pattern are smaller than the transmission pauses between the sub-data packets transmitted according to the second hopping pattern.

In embodiments, the first hopping pattern comprises a plurality of sub-hopping patterns that are time-shifted and/or frequency-shifted versions of each other, wherein the data transmitter is configured to transmit the first plurality of sub-data packets according to the plurality of sub-hopping patterns, wherein the plurality of sub-hopping patterns are interleaved in each other such that sub-data packets assigned to different sub-hopping patterns are alternately transmitted.

In embodiments, the data transmitter is configured to provide the first plurality of sub-data packets and the second plurality of sub-data packets with the same synchronization sequences for synchronizing the first plurality of sub-data packets and the second plurality of sub-data packets in a data receiver.

Further embodiments provide a data receiver configured to receive, using a first hopping pattern, data of a first class transferred divided onto a first plurality of sub-data packets, wherein the data receiver is configured to receive, using a second hopping pattern, data of a second class transferred divided onto a second plurality of sub-data packets, wherein transmission pauses between sub-data packets received according to the first hopping pattern are smaller than transmission pauses between sub-data packets received according to the second hopping pattern, and/or wherein sub-data packets transmitted according to the first hopping pattern are shorter than sub-data packets transmitted according to the second hopping pattern.

In embodiments, the data of the first class may comprise a higher priority and/or higher requirements as to a maximum transfer duration than the data of the second class.

In embodiments, the data receiver is configured to receive, using a third hopping pattern, data of a third class transferred divided onto a third plurality of sub-data packets, wherein the transmission pauses between the sub-data packets received according to the second hopping pattern are smaller than transmission pauses between sub-data packets received according to the third hopping pattern.

In embodiments, the data of the second class may comprise a higher priority and/or higher requirements as to a maximum transfer duration than the data of the third class.

In embodiments, the data of the first class or a first data packet comprising the data of the first class may be divided onto the first plurality of sub-data packets such that each of the first plurality of sub-data packets only comprises a part of the data of the first class or of the first data packet, wherein the data receiver is configured to receive and combine the first plurality of sub-data packets in order to obtain the data of the first class; and/or wherein the data of the second class or a second data packet comprising the data of the second class is divided onto the second plurality of sub-data packets such that each of the second plurality of sub-data packets only comprises a part of the data of the second class or of the second data packet, wherein the data receiver is configured to receive and combine the second plurality of sub-data packets in order to obtain the data of the second class.

In embodiments, the first plurality of sub-data packets may comprise fewer sub-data packets that the second plurality of sub-data packets.

In embodiments, sub-data packets transferred according to the first hopping pattern and the second hopping pattern may be provided with synchronization sequences such that a temporal interval between synchronization sequences of the sub-data packets transferred with the first hopping pattern and synchronization sequences of the sub-data packets transferred with the second hopping pattern is the same, wherein the data receiver is configured to detect, using the same reference synchronization sequence, in a reception data stream the sub-data packets transferred according to the first hopping pattern and the sub-data packets transferred according to the second hopping pattern.

In embodiments, sub-data packets transferred according to the first hopping pattern may be longer than sub-data packets transferred according to the second hopping pattern.

In embodiments, sub-data packets transferred according to the first hopping pattern may be distributed across a larger frequency range than sub-data packets transferred according to the second hopping pattern.

In embodiments, the data of the first class may be transferred with a higher data rate or a different modulation method than the data of the second class.

In embodiments, the data receiver is configured to transmit a first message temporally synchronized to the reception of the data of the first class using the first hopping pattern, and wherein the data receiver is configured to transmit a second message temporally synchronized to the reception of the data of the second class using the second hopping pattern, wherein a temporal interval between the first hopping pattern and the first message is smaller than a temporal interval between the second hopping pattern and the second message.

In embodiments, the first message is a first downlink message transferred divided onto a plurality of sub-data packets according to a first downlink hopping pattern, wherein the second message is a second downlink message transferred divided onto a plurality of sub-data packets according to a second downlink hopping pattern, wherein transmission pauses between the plurality of sub-data packets transferred by means of the first downlink hopping pattern are shorter than transmission pauses between the plurality of sub-data packets transferred by means of the second downlink hopping pattern.

In embodiments, the data receiver is configured to emit, responsive to a successful reception of the data of the first class, an acknowledgement of receipt signalizing a successfully reception of the data of the first class, wherein the data receiver is configured to emit the acknowledgement of receipt only for the data of the first class and not for the data of the second class.

In embodiments, the data receiver is configured to emit, using a hopping pattern, the acknowledgement of receipt pattern temporally overlapping to the reception of:
  the data of the first class using the first hopping pattern,
  or the data of the second class using the second hopping pattern,
such that at least one sub-data packet transferred according to the first hopping pattern or second hopping pattern is arranged between two sub-data packets of the hopping pattern with which the acknowledgement of receipt is emitted.

In embodiments, the data receiver is configured to receive, according to the first hopping pattern, at least two sub-data packets on different frequencies and with a full temporal overlap or at least a partial temporal overlap.

In embodiments, a pattern of a first group of hops of the first hopping pattern is specified, and wherein a pattern of a second group of hops of the first hopping pattern encodes at least a part of the data of the first class or a channel-encoded version of the data of the first class itself, wherein the data receiver is configured to decode the pattern of the second group of hops of the first hopping pattern in order to obtain at least the part of the data of the first class of the channel-encoded version of the data of the first class.

In embodiments, the first hopping pattern itself may encode at least a part of the data of the first class or a channel-encoded version of the data of the first class, wherein the first hopping pattern is transferred temporally synchronized to a synchronization signal, wherein the data receiver is configured to detect, using the synchronization signal, the first hopping pattern in a reception data stream, and wherein the data receiver is configured to decode the first hopping pattern itself in order to obtain at least the part of the data of the first class or the channel-encoded version of the data of the first class.

In embodiments, the first hopping pattern itself may encode at least a part of the data of the first class or a channel-encoded version of the data of the first class, wherein the data receiver is configured to detect, by means of a hypothesis test, the first hopping pattern in a reception data stream, and wherein the data receiver is configured to decode the first hopping pattern itself in order to obtain at least the part of the data of the first class or the channel-encoded version of the data of the first class.

In embodiments, the data of the first class may be divided onto the first plurality of sub-data packets such that, in a faultless transfer, each sub-data packet for itself may be decoded at the receiver side in order to obtain the data of the first class, and such that, in a faulty transfer, a higher coding gain is achieved through a combination of at least two of the sub-data packets, wherein the data receiver is configured to decode a first sub-data packet of the first plurality of sub-data packets in order to obtain the data of the first class and, if decoding the data of the first class using the first sub-data packet has not been successful, to combine, for achieving a higher coding gain, the first sub-data packet with at least one second sub-data packet of the first plurality of sub-data packets and to decode the same in order to obtain the data of the first class.

In embodiments, the data of the first class may be channel-encoded, wherein the channel-encoded data of the first class is distributed onto the first plurality of sub-data packets such that, in a faultless transfer, only a first group of sub-data packets is needed to successfully decode the data of the first class, and such that, in a faulty transfer, a higher coding gain is achieved through a combination of the first group of sub-data packets and a second group of sub-data packets, wherein the first group of sub-data packets is transferred temporally before the second group of sub-data packets, wherein the data receiver is configured to decode a first part of the channel-encoded data received with the first group of sub-data packets in order to obtain the data of the first class, and, if decoding the data of the first class has not been successful, to combine, for achieving a higher coding gain, at least a second part of the channel-encoded data received with at least a second group of sub-data packets with the first part of the channel-encoded data and to decode the same in order to obtain the data of the first class.

In embodiments, the data of the first class may comprise core information and extension information, wherein the data of the first class is divided onto the first plurality of sub-data packets such that a first group of sub-data packets comprises the core information and a second group of sub-data packets comprises the extension information, wherein the first group of sub-data packets is transferred temporally before the second group of sub-data packets, wherein the data receiver is configured to first receive the first group of sub-data packets and to then receive the second group of sub-data packets in order to obtain the core information before the extension information.

In embodiments, the first hopping pattern may be calculated using address information of a data transmitter or information derived therefrom so that the first hopping pattern itself identifies the data transmitter, wherein the data receiver is configured to identify the data transmitter based on the first hopping pattern.

In embodiments, the first hopping pattern may further be calculated using time-dependent or even-dependent information of the data transmitter, wherein the time-dependent or even-dependent information is known to the data receiver or is transferred encrypted in at least one of the plurality of sub-data packets or a different data packet.

In embodiments, the data receiver is configured to receive encoded or encrypted information about the first hopping pattern in advance from the data transmitter.

In embodiments, the data receiver is configured to assign the first hopping pattern to a data transmitter.

In embodiments, the data receiver is configured to assign to a data transmitter short address information that is shorter than address information unambiguously identifying the data transmitter within a communication network, wherein the data receiver may be configured to identify the data transmitter based on the short information.

In embodiments, the first hopping pattern may be calculated from the short address information so that the first hopping pattern itself identifies the data transmitter, wherein the data receiver may be configured to identify the data transmitter based on the first hopping pattern.

In embodiments, the data receiver may be configured to assign the short address information to a group of data transmitters, wherein the group of data transmitters is arranged in a spatially related area.

In embodiments, the data of the first class may be short information derived from a sensor value and being shorter than a sensor value, wherein the data receiver is configured to associate, upon receiving the data of the first class comprising short information, the short information with a known sensor value.

In embodiments, the data receiver is configured to receive in advance from the data transmitter the short information and a sensor value associated to the short information or a group of sensor values associated to the short information.

In embodiments, the data receiver is configured to assign the first hopping pattern to a data transmitter according to a frequency of use and/or a priority.

In embodiments, sub-data packets transferred according to the first hopping pattern may comprise the same time interval and frequency interval.

In embodiments, at least a part of a synchronization sequence for synchronizing the first plurality of sub-data packets in a data receiver may be calculated from at least a part of the data of the first class, the first class, address information of a data receiver or short address information of a data transmitter.

In embodiments, the data of the first class may be channel-encoded and distributed onto the first plurality of sub-data packets such that, in a faultless transfer, only a first group of sub-data packets is needed to successfully decode the data of the first class, wherein the first group of sub-data packets is transmitted with a different data rate than a second group of sub-data packets, wherein the data receiver is configured to decode a first part of the channel-encoded data received with the first group of sub-data packets in order to obtain the data of the first class, and, if decoding the data of the first class has not been successful, to combine, for achieving a higher coding gain, at least a second part of the channel-encoded data received with at least one second group of sub-data packets with the first part of the channel-encoded data and to decode the same in order to obtain the data of the first class.

In embodiments, the data of the first class may be channel-encoded and distributed onto the first plurality of sub-data packets such that, in a faultless transfer, only a first group of sub-data packets is needed to successfully decode the data of the first class, and such that, in a faulty transfer, a higher coding gain is achieved through a combination of the first group of sub-data packets and a second group of sub-data packets, wherein the data receiver is configured to determine, based on an estimation of mutual information, whether the first group of sub-data packets is sufficient to successfully decode the data of the first class, or whether a combination of the first group of sub-data packets and the second group of sub-data packets is needed to successfully decode the data of the first class, wherein the data receiver is configured to decode the first group of sub-data packets in order to obtain the data of the first class if the estimation of the mutual information indicated that the first group of sub-data packets is sufficient to successfully decode the data of the first class, wherein the data receiver is configured to combine the first group of sub-data packets and the second group of sub-data packets and to decode the same if an estimation of the mutual information indicated that a combination of the first group of sub-data packets and the second group of sub-data packets is needed to successfully decode the data of the first class.

In embodiments, the data of the first class may be channel-encoded and divided onto the first plurality of sub-data packets, wherein the data receiver is configured to successively increase or decrease a data rate with which the sub-data packets are received.

In embodiments, a length of the sub-data packets of the first plurality of sub-data packets may decrease or increase with an increasing number of transmitted sub-data packets.

In embodiments, the data receiver is configured to specify a transmission power to the data transmitter.

Further embodiments provide a data receiver for receiving channel-encoded data, wherein the channel-encoded data is divided onto a plurality of sub-data packets and transferred distributed according to a hopping pattern, wherein the data is channel-encoded and divided onto the plurality of sub-data packets such that, in a faultless transfer, only a first group of sub-data packets is needed to successfully decode the data, wherein transmission pauses between the sub-data packets of the first group of sub-data packets are smaller than transmission pauses between sub-data packets of a second group of sub-data packets transmitted after the first group of sub-data packets, wherein the data receiver is configured to receive at least the first group of sub-data packets, and to decode a part of the channel-encoded data received with the first group of sub-data packets in order to obtain the data.

In embodiments, the data receiver is configured to, if decoding the data has not been successful, combine, for achieving a higher coding gain, at least a second part of the channel-encoded data received with at least a second group of sub-data packets with the first part of the channel-encoded data and to decode the same in order to obtain the data.

In embodiments, only transmission pauses between sub-data packets of the second group of sub-data packets increase with an increasing number of transmitted sub-data packets.

Further embodiments provide a data receiver configured to receive data divided onto a plurality of sub-data packets and transferred using a first hopping pattern and repeatedly using a second hopping pattern, wherein transmission pauses between sub-data packets transferred according to the first hopping pattern are smaller than transmission pauses between sub-data packets transferred according to the second hopping pattern.

In embodiments, the first hopping pattern may extend across two separate frequency bands.

In embodiments, the data receiver is configured to receive the data using the first hopping pattern twice in two separate frequency bands.

In embodiments, the data receiver is configured to receive the data using the second hopping pattern in two separate frequency bands.

In embodiments, the data receiver is configured to receive the data using the second hopping pattern twice in two separate frequency bands.

In embodiments, the data receiver is configured to receive the data in an interleaved manner using the first hopping pattern and repeatedly using the second hopping pattern so that at least one hop of the second hopping pattern is arranged between two hops of the first hopping pattern.

Further embodiments provide a data receiver configured to receive data of a first class transferred using a data packet, and wherein the data receiver is configured to receive, according to a first hopping pattern, the data transferred repeatedly using a plurality of sub-data packets.

In embodiments, the data receiver is further configured to receive the data of the first class repeatedly using a further data packet.

In embodiments, the data receiver is configured to receive in a temporally interleaved manner the data of the first class using the further data packet and using the plurality of sub-data packets so that the further data packet is temporally arranged between two of the plurality of sub-data packets.

In embodiments, the data receiver is configured to transmit an acknowledgement of receipt in a temporal interval between the reception of the data packet and the plurality of sub-data packets.

In embodiments, the data receiver is configured to receive, using a second hopping pattern, data of a second class transferred divided onto a second plurality of sub-data packets, wherein transmission pauses between two sub-data packets transferred according to the first hopping pattern are smaller than transmission pauses between sub-data packets transferred according to the second hopping pattern.

In embodiments, the first hopping pattern may comprise a plurality of sub-hopping patterns that are time-shifted and/or frequency-shifted versions of each other, wherein the data receiver is configured to receive the first plurality of sub-data packets according to the plurality of sub-hopping patterns, wherein the plurality of sub-hopping patterns are interleaved in each other such that sub-data packets assigned to different sub-hopping patterns are alternately transferred.

In embodiments, the first plurality of sub-data packets and the second plurality of sub-data packets may be provided with the same synchronization sequences for synchronizing the first plurality of sub-data packets and the second plurality of sub-data packets in a data receiver, wherein the data receiver is configured to detect in a reception data stream, using the same reference synchronization sequence, the sub-data packets transferred according to the first hopping pattern and the sub-data packets transferred according to the second hopping pattern.

Further embodiments provide a method for transferring data from a data transmitter to a data receiver. The method includes a step of transferring data of a first class from a data transmitter to a data receiver, wherein the data of the first class is transferred divided onto a first plurality of sub-data packets using a first hopping pattern. Furthermore, the method includes a step of transferring data of a second class from the data transmitter or a different data transmitter to the data receiver, wherein the data of the second class is transferred divided onto a second plurality of sub-data packets using a second hopping pattern, wherein transmission pauses between sub-data packets transferred according to the first hopping pattern are smaller than transmission pauses between sub-data packets transferred according to the second hopping pattern, and/or wherein sub-data packets transmitted according to the first hopping pattern are shorter than sub-data packets transmitted according to the second hopping pattern.

Further embodiments provide a data transmitter configured to transmit, distributed in time and/or frequency according to a hopping pattern, data divided onto a plurality of sub-data packets, wherein the hopping pattern is a time hopping pattern, a frequency hopping pattern or a combination of the time hopping pattern and the frequency hopping pattern, wherein the time hopping pattern is the time hopping pattern with 24 hops indicated in the following table:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 66 | 66 | 66 | 66 | 66 | 66 | 66 | 66 | 66 | 123 | 66 | 66 | 66 | 66 | 60 | 66 | 66 | 198 | 66 | 66 | 255 | 66 | 66 | wherein the line in the table is the time hopping pattern, wherein each column in the table is a hop of the time hopping pattern starting from a second hop so that each time hopping pattern comprises 24 hops, wherein each cell in the table indicates a temporal interval of a reference point of the respective hop to a same reference point of an immediately subsequent hop in—preferably multiples of—symbol durations;

wherein the frequency hopping pattern is the frequency hopping pattern with 24 hops indicated in the following table:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 1 | 5 | 4 | 3 | 2 | 17 | 21 | 20 | 19 | 18 | 9 | 13 | 12 | 11 | 10 | 6 | 0 | 7 | 22 | 16 | 23 | 14 | 8 | 15 | wherein the line in the table is the frequency hopping pattern, wherein each column in the table is a hop of the frequency hopping pattern, wherein each cell in the table indicates a transmission frequency of the respective hop of the frequency hopping pattern in carriers of UCG_C0 to UCG_C23.

Further embodiments provide a data receiver configured to receive data transferred divided onto a plurality of sub-data packets and distributed in time and/or frequency according to a hopping pattern, wherein the hopping pattern is a time hopping pattern, a frequency hopping pattern or a combination of the time hopping pattern and the frequency hopping pattern, wherein the time hopping pattern is the time hopping pattern with 24 hops indicated in the following table:

| # of sub-data packets in the core frame SC | | | | | | | | | | | | | | | | | | | | | | | |
|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 66 | 66 | 66 | 66 | 66 | 66 | 66 | 66 | 66 | 123 | 66 | 66 | 66 | 66 | 60 | 66 | 66 | 198 | 66 | 66 | 255 | 66 | 66 | wherein the line in the table is the time hopping pattern, wherein each column in the table is a hop of the time hopping pattern starting from a second hop so that each time hopping pattern comprises 24 hops, wherein each cell in the table indicates a temporal interval of a reference point of the respective hop to a same reference point of an immediately subsequent hop in—preferably multiples of—symbol durations;

wherein the frequency hopping pattern is the frequency hopping pattern with 24 hops indicated in the following table:

| # of sub-data packets in the core frame SC | | | | | | | | | | | | | | | | | | | | | | | |
|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 1 | 5 | 4 | 3 | 2 | 17 | 21 | 20 | 19 | 18 | 9 | 13 | 12 | 11 | 10 | 6 | 0 | 7 | 22 | 16 | 23 | 14 | 8 | 15 | wherein the line in the table is the frequency hopping pattern, wherein each column in the table is a hop of the frequency hopping pattern, wherein each cell in the table indicates a transmission frequency of the respective hop of the frequency hopping pattern in carriers of UCG_C0 to UCG_C23.

Further embodiments provide a method for transmitting data using a hopping pattern, wherein the hopping pattern is a time hopping pattern, a frequency hopping pattern or a combination of the time hopping pattern and the frequency hopping pattern, wherein the time hopping pattern is the time hopping pattern having 24 hops indicated in the following table:

| # of sub-data packets in the core frame SC | | | | | | | | | | | | | | | | | | | | | | | |
|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 66 | 66 | 66 | 66 | 66 | 66 | 66 | 66 | 66 | 123 | 66 | 66 | 66 | 66 | 60 | 66 | 66 | 198 | 66 | 66 | 255 | 66 | 66 | wherein the line in the table is the time hopping pattern, wherein each column in the table is a hop of the time hopping pattern starting from a second hop so that each time hopping pattern comprises 24 hops, wherein each cell in the table indicates a temporal interval of a reference point of the respective hop to a same reference point of an immediately subsequent hop in—preferably multiples of—symbol durations;

wherein the frequency hopping pattern is the frequency hopping pattern having 24 hops indicated in the following table:

| # of sub-data packets in the core frame SC | | | | | | | | | | | | | | | | | | | | | | | |
|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 1 | 5 | 4 | 3 | 2 | 17 | 21 | 20 | 19 | 18 | 9 | 13 | 12 | 11 | 10 | 6 | 0 | 7 | 22 | 16 | 23 | 14 | 8 | 15 | wherein the line in the table is the frequency hopping pattern, wherein each column in the table is a hop of the frequency hopping pattern, wherein each cell in the table indicates a transmission frequency of the respective hop of the frequency hopping pattern in carriers of UCG_C0 to UCG_C23.

Further embodiments provide a method for receiving data using a hopping pattern, wherein the hopping pattern is a time hopping pattern, a frequency hopping pattern or a combination of the time hopping pattern and the frequency hopping pattern, wherein the time hopping pattern is the time hopping pattern with 24 hops indicated in the following table:

| | # of sub-data packets in the core frame SC | | | | | | | | | | | | | | | | | | | | | | |
|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 66 | 66 | 66 | 66 | 66 | 66 | 66 | 66 | 66 | 123 | 66 | 66 | 66 | 66 | 60 | 66 | 66 | 198 | 66 | 66 | 255 | 66 | 66 | wherein the line in the table is the time hopping pattern, wherein each column in the table is a hop of the time hopping pattern starting from a second hop so that each time hopping pattern comprises 24 hops, wherein each cell in the table indicates a temporal interval of a reference point of the respective hop to a same reference point of an immediately subsequent hop in—preferably multiples of—symbol durations:
wherein the frequency hopping pattern is the frequency hopping pattern with 24 hops indicated in the following table:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 1 | 5 | 4 | 3 | 2 | 17 | 21 | 20 | 19 | 18 | 9 | 13 | 12 | 11 | 10 | 6 | 0 | 7 | 22 | 16 | 23 | 14 | 8 | 15 | wherein the line in the table is the frequency hopping pattern, wherein each column in the table is a hop of the frequency hopping pattern, wherein each cell in the table indicates a transmission frequency of the respective hop of the frequency hopping pattern in carriers of UCG_C0 to UCG_C23.

BRIEF DESCRIPTION OF THE DRAWINGS

Embodiments of the present invention will be detailed subsequently referring to the appended drawings, in which:

FIG. 3a shows in a diagram an exemplary occupancy of the transfer channel in the transfer of the first plurality of sub-data packets distributed in time and frequency according to the first hopping pattern;

FIG. 3b shows in a diagram an exemplary occupancy of the transfer channel in the transfer of the second plurality of sub-data packets distributed in time and frequency according to the second hopping pattern;

FIG. 7 shows in a diagram an exemplary occupancy of the transfer channel in the transfer of channel-encoded data by means of a plurality of sub-data packets using a first hopping pattern and repeatedly using a second hopping pattern;

FIG. 8 shows in a diagram an exemplary occupancy of the transfer channel in the transfer of the plurality of sub-data packets using a hopping pattern that extends across two separate frequency bands;

FIG. 27 shows in a diagram an exemplary occupancy of the transfer channel in the transfer of the first plurality of sub-data packets distributed in time and frequency according to the first hopping pattern;

FIG. 28 shows in a diagram an exemplary occupancy of the transfer channel in the transfer of the first plurality of sub-data packets distributed in time and frequency according to the first hopping pattern, wherein a length of the sub-data packets decreases with an increasing number of transmitted sub-data packets;

FIG. 37 shows in a table a definition of a low-delay frequency hopping pattern according to an embodiment; and FIG. 38 shows in a table a definition of a low-delay time hopping pattern according to an embodiment.

DETAILED DESCRIPTION OF THE INVENTION

Figure 1:
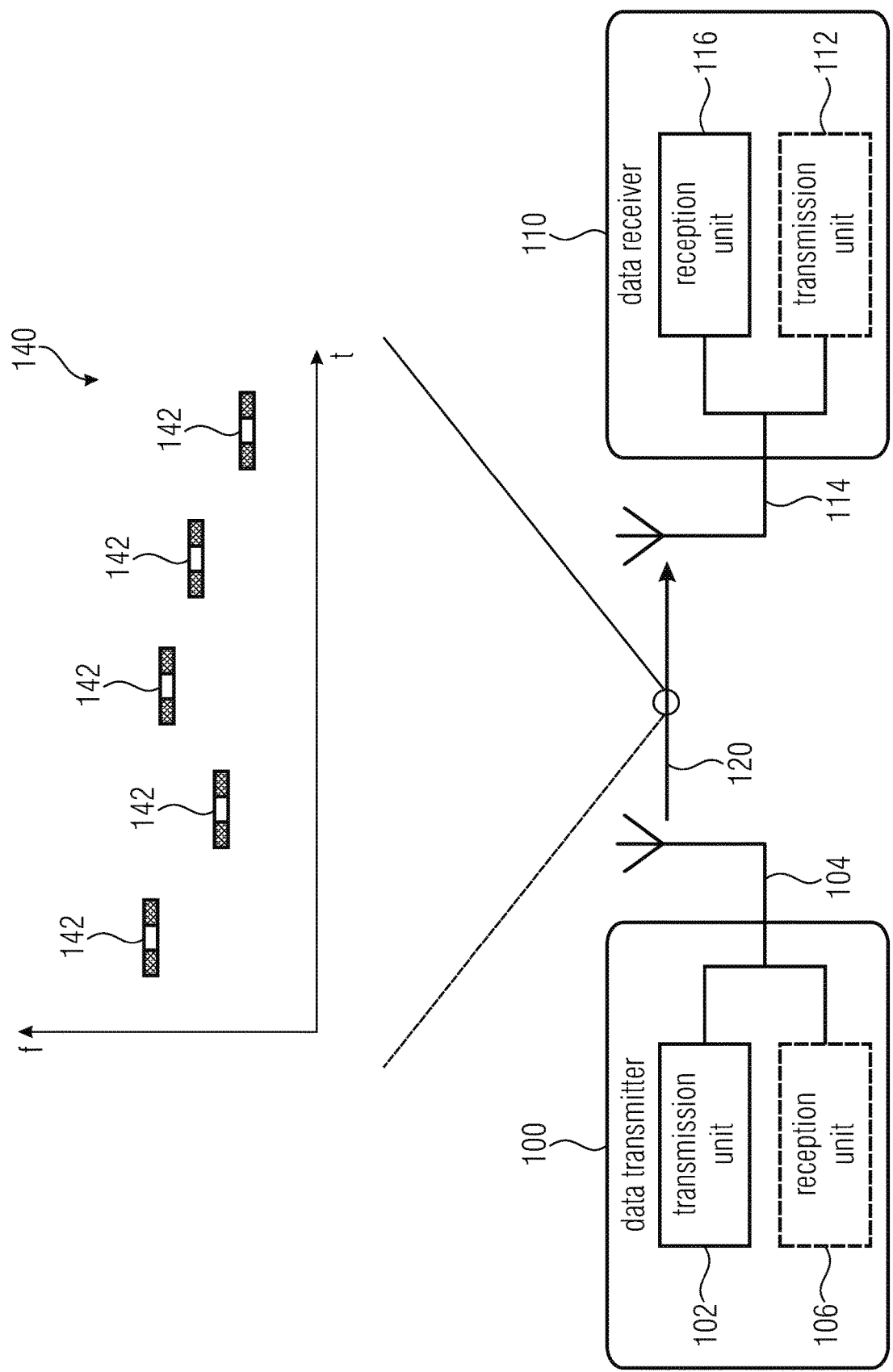
FIG. 1 shows a schematic block circuit diagram of a system with a data transmitter and a data receiver.

In the subsequent description of the embodiments of the present invention, the same elements or elements having the same effect are provided in the figures with the same reference numerals so that their description is interchangeable.

Figure 2:
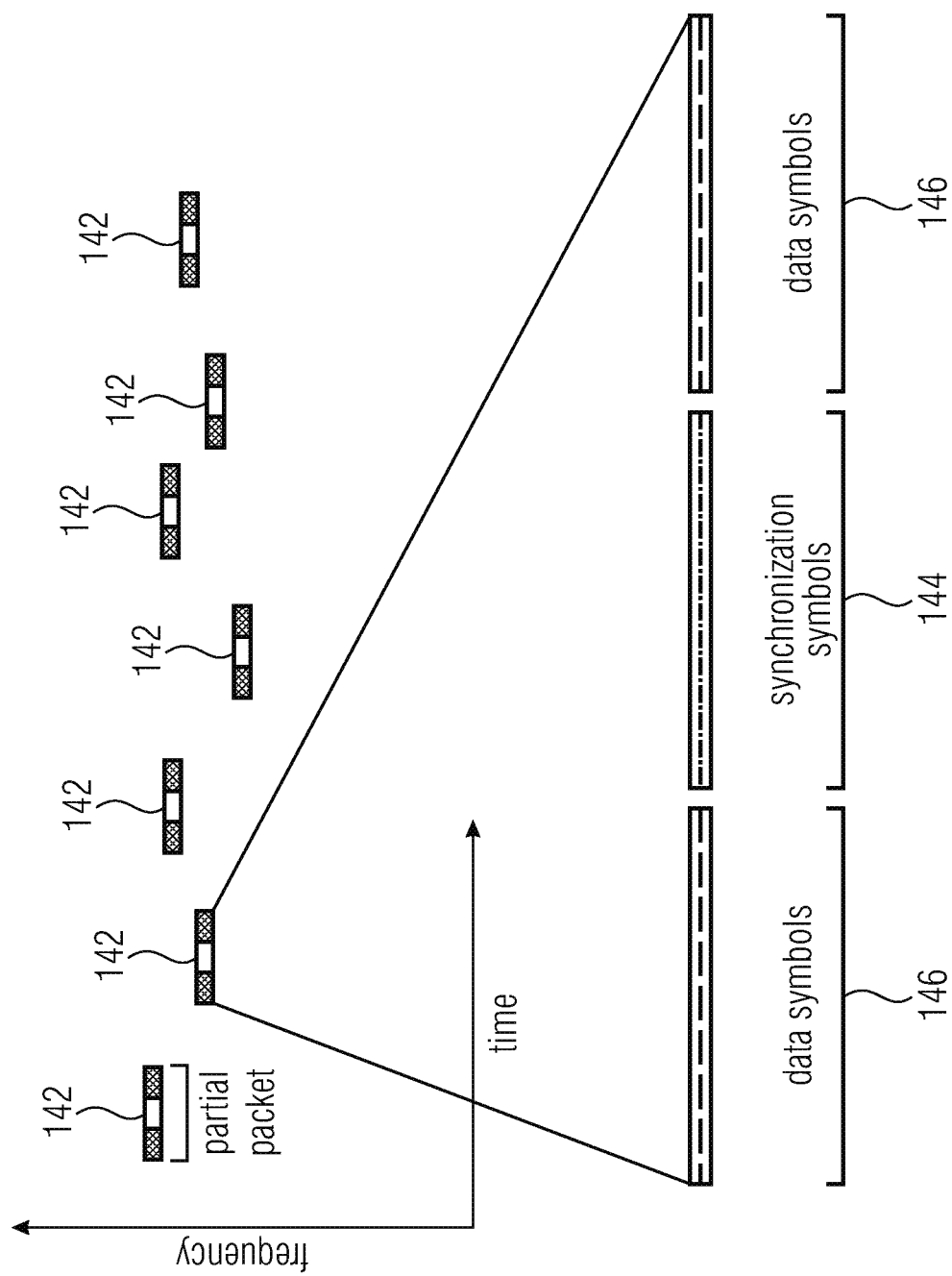
FIG. 2 shows in a diagram an exemplary occupancy of the transfer channel in the transfer of a plurality of sub-data packets according to a time/frequency hopping pattern.

Before embodiments of the present invention are described in detail, FIGS. 1 and 2 are exemplarily used to first describe in more detail the communication system on which the invention is based, wherein said communication system is to be extended by a mode for data of higher priority and/or higher requirements as to a maximum transfer duration.

However, it is to be noted that the communication system described based on FIGS. 1 and 2 is only illustrated, or described, as an example and is not to be interpreted as being restrictive. Rather, the communication system is illustrated in a highly abstract form in order to explain the underlying principles in a simple and understandable manner.

FIG. 1 shows a schematic block circuit diagram of an exemplary communication system having a data transmitter 100 and a data receiver 110.

The data transmitter 100 may be configured to divide data 120 (or a data packet with the data 120) onto a plurality of sub-data packets 142 and to transmit the plurality of sub-data packets 142 distributed in time and/or frequency using a hopping pattern 140.

The data receiver 110 may be configured to receive the plurality of sub-data packets 142 in order to obtain the data divided onto the plurality of sub-data packets and transferred distributed in time and/or frequency according to the hopping pattern 140.

As is exemplarily shown in FIG. 1, the data transmitter 100 may comprise a transmission unit (or transmission module, or transmitter) 102 configured to transmit the data 120. The transmission unit 102 may be connected to an antenna 104 of the data transmitter 100. The data transmitter 100 may further comprise a reception unit (or reception module, or receiver) 106 configured to receive data. The reception unit 106 may be connected to the antenna 104 or a further (separate) antenna of the data transmitter 100. The data transmitter 100 may also comprise a combined transmission/reception unit (transceiver).

The data receiver 110 may comprise a reception unit (or reception module, or receiver) 116 configured to receiver data 120. The reception unit 116 may be connected to an antenna 114 of the data receiver 110. Furthermore, the data receiver 110 may comprise a transmission unit (or transmission module or transmitter) 112 configured to transmit data. The transmission unit 112 may be connected to the antenna 114 or a further (separate) antenna of the data receiver 110. The data receiver 110 may also comprise a combined transmission/reception unit (transceiver).

In embodiments, the data transmitter 100 may be a sensor node, whereas the data receiver 110 may be a base station. Typically, a communication system includes at least one data receiver 110 (base station) and a multitude of data transmitters (sensor nodes, e.g. heating meters). Obviously, it is also possible that the data transmitter 100 is a base station, whereas the data receiver 110 is a sensor node. Furthermore, it is possible that the data transmitter 100 and the data receiver 110 are sensor nodes. Furthermore, it is possible that the data transmitter 100 and the data receiver 110 are base stations.

The data transmitter 100 and the data receiver 110 may be configured to transmit and receive, respectively, data 120 using the telegram splitting method (TS method). Here, a telegram, or data packet, 120 is divided into a plurality of sub-data packets (or partial data packets, or partial packets) 142, and the sub-data packets 142 are transferred distributed in time and/or frequency according to the hopping pattern 140 from the data transmitter 100 to the data receiver 110, wherein the data receiver 110 rejoins (or combines) the sub-data packets in order to obtain the data packet 120. The sub-data packets 142 may each only contain a part of the data packet 120 so that the sub-data packets 142 are each shorter than the data packet 120. The data packet 120 may further be channel-encoded so that not all of the sub-data packets 142 are needed to faultlessly decode the data packet 120 but only a part of the sub-data packets 142.

As mentioned above, the temporal distribution of the plurality of sub-data packets 142 may be carried out according to a time and/or frequency hopping pattern.

A time hopping pattern may indicate a sequence of transmission times or transmission time intervals (hops) with which the sub-data packets are transmitted. For example, a first sub-data packet may be transmitted at a first transmission time (or in a first transmission time slot) and a second sub-data packet may be transmitted at a second transmission time (or in a second transmission time slot), wherein the first transmission time and the second transmission time are different. The time hopping pattern may define (or specify or indicate) the first transmission time and the second transmission time. Alternatively, the time hopping pattern may indicate the first transmission time and a temporal interval between the first transmission time and the second transmission time. Obviously, the time hopping pattern may also only indicate the temporal interval between the first time and the second transmission time. Transmission pauses in which no transmission occurs may be present between the sub-data packets. The sub-data packets may also temporally overlap (coincide with) each other.

A frequency hopping pattern may indicate a sequence of transmission frequencies or transmission frequency hops with which the sub-data packets are transmitted. For example, a first sub-data packet may be transmitted with a first transmission frequency (or in a first frequency channel) and a second sub-data packet may be transmitted with a second transmission frequency (or in a second frequency channel), wherein the first transmission frequency and the second transmission frequency are different. The frequency hopping pattern may define (or specify or indicate) the first transmission frequency and the second transmission frequency. Alternatively, the frequency hopping pattern may indicate the first transmission frequency and a frequency interval (transmission frequency hop) between the first transmission frequency and the second transmission frequency. Obviously, the frequency hopping pattern may also only indicate the frequency interval (transmission frequency hop) between the first transmission frequency and the second transmission frequency.

Obviously, the plurality of sub-data packets 142 may be transferred distributed both in time and frequency from the data transmitter 100 to the data receiver 110. The distribution of the plurality of sub-data packets in time and frequency may be carried out according to a time/frequency hopping pattern. A time/frequency hopping pattern may be the combination of a time hopping pattern and a frequency hopping pattern, i.e. a sequence of transmission times or transmission time intervals with which the sub-data packets are transferred, wherein transmission frequencies (or transmission frequency hops) are assigned to the transmission times (or transmission time intervals).

The time and/or frequency hopping pattern may comprise a plurality of hops, wherein the plurality of hops each indicate a transmission time or a transmission frequency (or a transmission time hop or a transmission frequency hop), according to which the plurality of sub-data packets 142 may be transferred.

FIG. 2 shows in diagram an exemplary occupancy of the transfer channel in the transfer of a plurality of sub-data packets 142 according to a time/frequency hopping pattern. Here, the ordinate describes the frequency and the abscissa describes the time.

As can be seen in FIG. 2, the data packet 120 may exemplarily be divided onto n=7 sub-data packets 142 and may be transferred distributed in time and frequency according to a time/frequency hopping pattern from the data transmitter 100 to the data receiver 110.

As can further be seen in FIG. 2, a synchronization sequence 144 may also be divided onto the plurality of sub-data packets 142 so that, beside data (data symbols in FIG. 2) 146, the plurality of sub-data packets 142 each contains a part of the synchronization sequence (synchronization symbols in FIG. 2) 144.

In the following, detailed embodiments of the data transmitter 100 and the data receiver 110 are described in more detail.

1. Different Classes of Hopping Patterns

To date, all hopping patterns of a system have been developed so that they approximately have the same latency time. Thus, it is not possible to achieve a shorter latency for certain applications, which is why the system cannot be used for these applications.

1.1. Reduction of the Pauses Between the Sub-Packets

In embodiments, the data transmitter 100 may be configured to divide data of a first class onto a first plurality of sub-data packets 162 and to transmit the first plurality of sub-data packets 162 using a first hopping pattern 160, wherein the data transmitter 100 is configured to divide data of a second class onto a second plurality of sub-data packets 142 and to transmit the second plurality of sub-data packets 142 using a second hopping pattern 140, wherein transmission pauses between sub-data packets 162 transmitted according to the first hopping pattern 160 are smaller than transmission pauses between sub-data packets 142 transmitted according to the second hopping pattern 140.

Accordingly, the data receiver 110 may be configured to receive, using a first hopping pattern 160, data of a first class transferred divided onto a first plurality of sub-data packets 162, wherein the data receiver 110 may be configured to receive, using a second hopping pattern 140, data of a second class transferred divided onto a second plurality of sub-data packets 142, wherein transmission pauses between sub-data packets 162 received according to the first hopping pattern 160 are smaller than transmission pauses between sub-data packets 142 received according to the second hopping pattern 140.

In embodiments, the data of the first class may comprise a higher priority and/or higher requirements as to a maximum transfer duration than the data of the second class.

FIG. 3a shows in a diagram an exemplary occupancy of the transfer channel in the transfer of the first plurality of sub-data packets 142 according to the first hopping pattern 140, whereas FIG. 3b shows in a diagram an exemplary occupancy of the transfer channel in the transfer of the second plurality of sub-data packets 162 according to the second hopping pattern 160. When comparing FIGS. 3a and 3b, it can be seen that transmission pauses between sub-data packets 162 transferred according to the first hopping pattern 160 are smaller than transmission pauses between sub-data packets 142 transferred according to the second hopping pattern 140. In other words, FIGS. 3a and 3b show a comparison between the different classes of the hopping patterns with a reduction of the pauses.

Thus, in embodiments, in order to solve the problem of section 1, different classes of hopping patterns having a different latency may be defined. Here, the patterns with a lower latency (low-delay mode) on average comprise shorter pauses between the sub-packets than the ones having a higher latency. Depending on the application or urgency of the message, the transmitter 100 selects a pattern from the corresponding class.

The receiver may be configured such that it may detect and receive (all) different classes of hopping patterns. To this end, an at least partially parallel processing may be needed. Under the assumption that the pilot sequence in each sub-packet is the same for all hopping pattern classes, the calculation effort for the same total number of hopping patterns of the detection is not higher than if only one class of hopping patterns would be used.

In this case, the receiver 110 may initially perform a sub-packet correlation (or partial pilot sequence correlation) common for all classes (and hopping patterns). Subsequently, a correlation (or any comparable method) is separately performed for each hopping pattern 160 and 140 via the results of the sub-packet correlation in order to obtain the total result.

FIGS. 3a and 3b exemplarily show a comparison between the hopping patterns 160 and 140 from the different classes. The hopping pattern 140 of FIG. 3a represents the conventional class, which has been optimized for a high transfer reliability at the expense of the latency. The pattern 160 of FIG. 3b has a significantly lower latency and may therefore be used for time-critical applications.

If more than two classes are defined, the transmitter may select a corresponding class according to the latency needed depending on the application. However, a disadvantage of the hopping patterns with lower latency is the lower interference robustness in the transfer. Thus, packet errors occur in the transfer more often for patterns with lower latency than in patterns with higher latency (the following ideas are dedicated to solving this problem).

In embodiments, on the data transmitter-side, different classes of hopping patterns may be used, which may be selected depending on the application.

In embodiments, on the data receiver-side, an at least partially parallel detection of the different hopping patterns of the classes may be performed.

1.2. Reducing the Number of Sub-Packets

Under certain circumstances, the embodiment of section 1.1 has the disadvantage that new hopping patterns have to be designed, which additionally have to be detected by the receiver. This is particularly a problem if only a limited computing power is available at the receiver.

Thus, in embodiments, the first plurality of sub-data packets 162 may comprise fewer sub-data packets than the second plurality of sub-data packets 142, wherein sub-data packets 162 transmitted according to the first hopping pattern 160 may optionally be longer than sub-data packets 142 transmitted according to the second hopping pattern 140.

In embodiments, the sub-data packets transmitted according to the first hopping pattern 160 and/or the second hopping pattern 140 may be provided with synchronization sequences such that a temporal interval between synchronization sequences of the sub-data packets 162 transmitted with the first hopping pattern 160 and synchronization sequences of the sub-data packets 142 transmitted with the second hopping pattern 140 is the same.

Instead of reducing the pauses between the sub-packets 162, fewer sub-packets may be used and their length may be increased. This has the advantage that the same detection may be used for both (or several) classes of hopping patterns (on the condition that the intervals of the synchronization sequences remain the same). In the case of the hopping pattern class with low latency, the detection may optionally be performed only via the first hops.

Figure 4A:
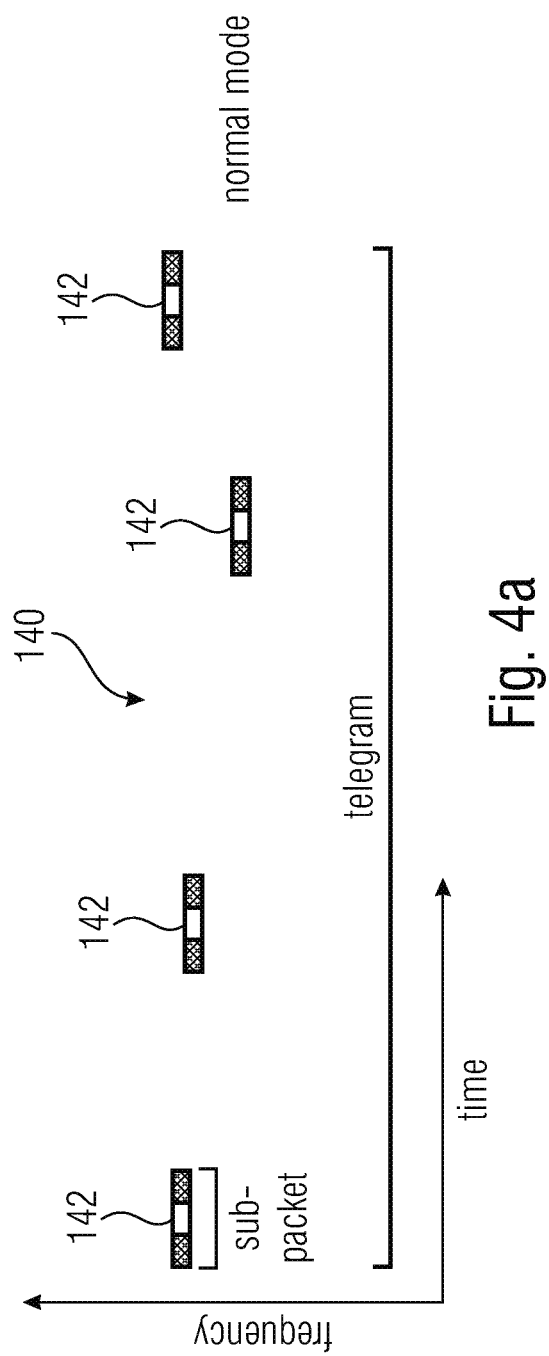
FIG. 4a shows in a diagram an exemplary occupancy of the transfer channel in the transfer of the first plurality of sub-data packets distributed in time and frequency according to the first hopping pattern.
Figure 4B:
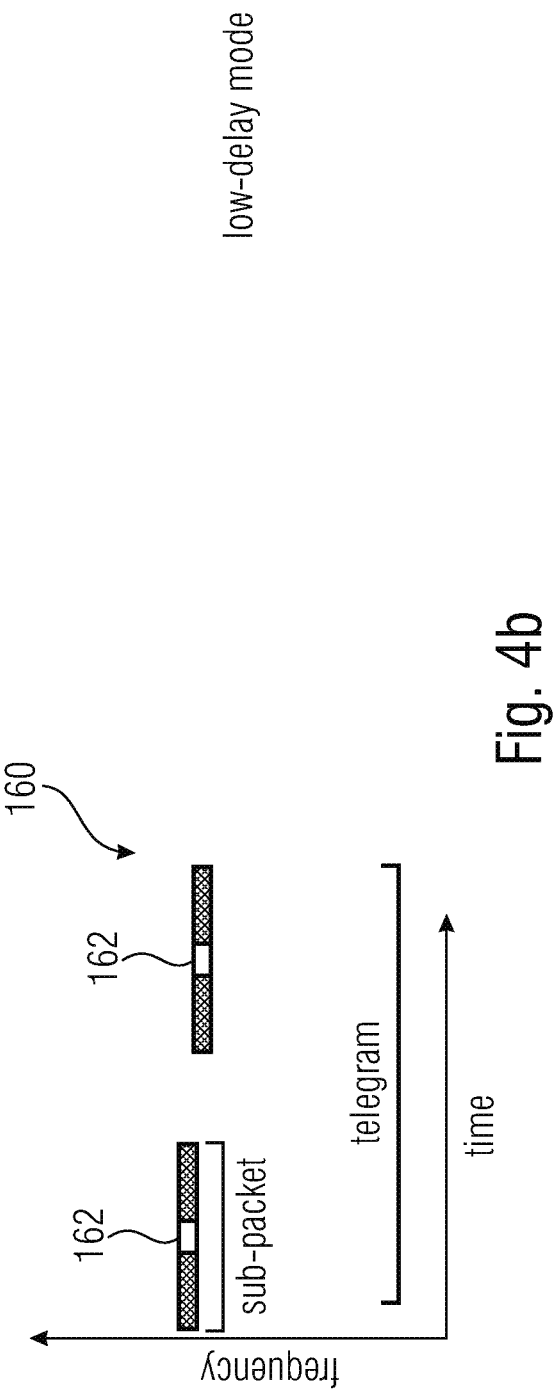
FIG. 4b shows in a diagram an exemplary occupancy of the transfer channel in the transfer of the second plurality of sub-data packets distributed in time and frequency according to the second hopping pattern.

FIG. 4a shows in a diagram an exemplary occupancy of the transfer channel in the transfer of the first plurality of sub-data packets 142 according to the first hopping pattern 140, whereas FIG. 4b shows in a diagram an exemplary occupancy of the transfer channel in the transfer of the second plurality of sub-data packets 162 according to the second hopping pattern 160. In other words, FIG. 4a and FIG. 4b show a comparison of a hopping pattern in the normal mode (with high latency) and a hopping pattern from the class of the low latency. In order to transfer the same amount of data with fewer sub-packets, the length of the sub-packets has been increased.

In embodiments, on the data transmitter-side, the length of the sub-packets may depend on the class of the hopping pattern used. According to the application, a long length of the sub-packets may be selected for a short latency.

In embodiments, on the data receiver-side, the detection of the different hopping patterns of the classes may be performed jointly with an algorithm.

1.3. Increasing the Bandwidth in the Low-Delay Mode

Under certain circumstances, the two previous embodiments of section 1.1 and 1.2 have the disadvantage that the interference robustness decreases due to reducing the pauses or the number of sub-packets.

To counteract this problem, the bandwidth of the signal may be increased. This reduces the probability that an external interferer may destroy more than one sub-packet since the interferences are also bandwidth-limited, and the increase in bandwidth increases the probability that an interferer is only partially in the same band as the telegram.

Widening the bandwidth of the transfer initially also increases the bandwidth in which the interferences can enter. With an even capacity utilization of the interferences across the entire bandwidth used, there is therefore no advantage in this scenario. However, the transfer usually takes place in the so-called ISM bands, where the maximum channel occupancy in the bands is prescribed. However, there are different maximum permitted channel occupancies for the different bands. Selecting the hopping pattern to have such a width that several (at least two) bands with different channel occupancies are used for the transfer results in an advantage in terms of interference robustness since the channel occupancy of the interferers is at different heights in the bands.

Under certain circumstances, increasing only the bandwidth of the low-delay mode has the disadvantage that, as in section 1.1, the detection for the different modes has to be performed separately, however, the interference robustness against external and internal interferences increases. If the bandwidth of the normal mode is also increased, a joint detection may still be performed using section 1.2. In this case, the internal interference robustness is the same as that when all transmitters transfer in the normal mode.

In embodiments, on the data transmitter-side, the bandwidth of the different classes of hopping patterns may be varied.

In embodiments, on the data receiver-side, the detection of the different hopping patterns of the classes may be carried out across different bandwidths.

1.4. Using a Different Data Rate or a Different Modulation Method

Similar to (or in combination with) the embodiment of section 1.3, a higher data rate or a different modulation method may be used in the transfer in the low-delay mode. Ideally, the data rate is increased in order to reduce the duration of the transfer, resulting in a longer pause between the sub-packets and therefore increasing the transfer reliability against interferences.

If the modulation type is changed, the duration of the transfer should be reduced (e.g. QPSK instead of BPSK), if possible.

The decision as to the data rate or modulation type to be used may be made by the application based on the priority and the needed latency of the message.

In embodiments, on the data transmitter-side, the data rate or the modulation type of the different classes of hopping patterns may be varied.

In embodiments, on the data receiver-side, the detection of the different hopping patterns of the classes may be carried out across different data rates and/or modulation types.

2. Combination of Normal and Low-Delay Hopping Pattern

In embodiments, the data transmitter 100 may be configured to channel-encode data and divide the same onto a plurality of sub-data packets and to transmit the plurality of sub-data packets 162 according to a hopping pattern 160. The data transmitter 100 may be configured to channel-encode the data and to divide the same onto the plurality of sub-data packets 162 such that, in a faultless transfer, only a first group 170 of sub-data packets 162 is needed to successfully decode the data, and such that, in a faulty transfer, a higher coding gain is achieved through a combination of the first group of sub-data packets and the second group of sub-data packets.

Accordingly, the data receiver 110 may be configured to receive at least the first group 170 of sub-data packets 162 and to decode a part of the channel-encoded data received with the first group 170 of sub-data packets 162 in order to obtain the data. In addition, the data receiver 110 may be configured to, if decoding the data has not been successful, combine, for achieving a higher coding gain, at least a second part of the channel-encoded data received with at least a second group 172 of sub-data packets 162 with the first part of the channel-encoded data and to decode the same in order to obtain the data.

Thus, instead of defining different classes of hopping patterns, it is also possible to transmit a message with redundancy in such a way that early decoding is possible.

2.1. Short Pauses at the Beginning of the Telegram

With the embodiment described in section 2, the latency of the transfer may be reduced, however, under certain circumstances, the latency needed for certain applications will possibly not yet be reached. In order to solve this problem, the pauses of the first sub-packets may be shortened, similar to the embodiment of section 1. However, the difference is that not all of the pauses are shortened, but only as many as are needed for early decoding.

Figure 5:
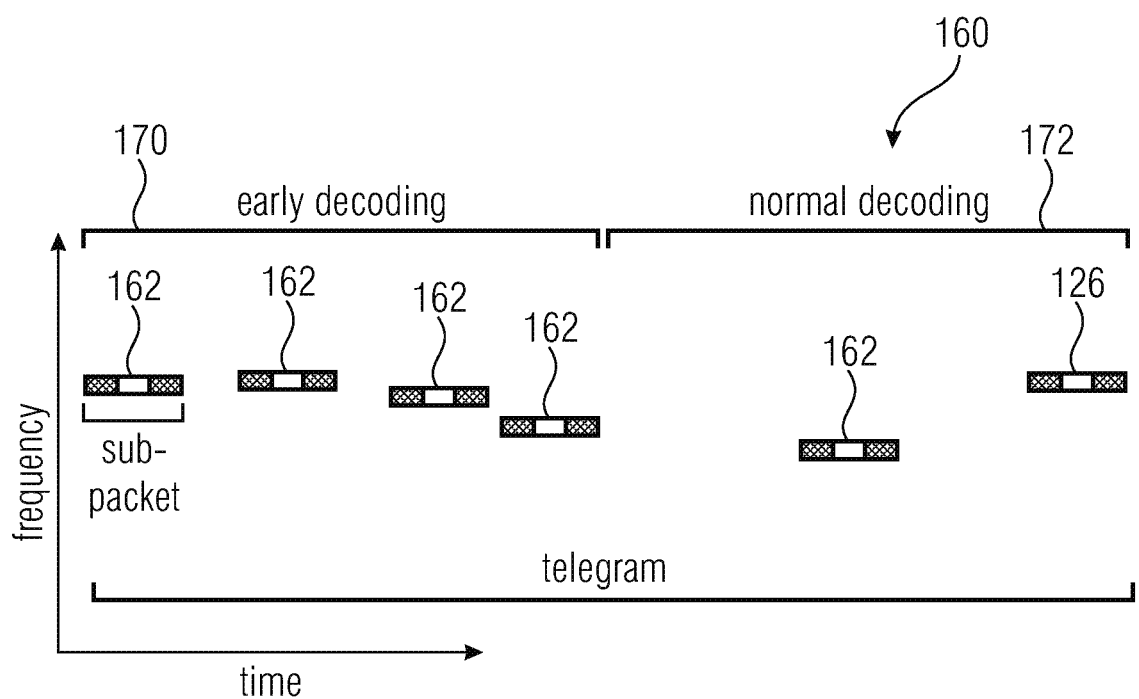
FIG. 5 shows in a diagram an exemplary occupancy of the transfer channel in the transfer of channel-encoded data by means of the plurality of sub-data packets, wherein transmission pauses between the sub-data packets of a first group of sub-data packets are smaller than transmission pauses between sub-data packets of a second group of sub-data packets.

In embodiments, the transmission pauses between the sub-data packets 162 of the first group 170 of sub-data packets 162 may therefore be smaller than transmission pauses between sub-data packets 162 of a second group 172 of sub-data packets 162 transmitted after the first group 170 of sub-data packets 162, as is shown in FIG. 5.

In detail, FIG. 5 shows in a diagram an exemplary occupancy of the transfer channel in the transfer of channel-encoded data by means of the plurality of sub-data packets 142, wherein transmission pauses between the sub-data packets 162 of a first group 170 of sub-data packets 162 are smaller than transmission pauses between sub-data packets 162 of a second group 172 of sub-data packets 162. In other words, FIG. 5 shows a combination of a normal hopping pattern and a low-delay hopping pattern.

The advantage of this method is that the delay for telegrams may be strongly reduced with a good SNR without additional effort or overhead since the first part of the message may already be decoded in advance with low delay. If the SNR is low, the transfer does not have to be repeated, but it is sufficient to receive the remaining information and to then perform normal decoding.

If the receiver has the capability to perform an estimation of the SNRs or of the reception level of the telegram, it is possible to directly decide (signal that SNR is above threshold) as to whether the telegram may be decoded early or not. In this case, it is not necessary to attempt decoding with a part of the data for each received partial packet.

In embodiments, on the data transmitter-side, the first sub-packets may have smaller pauses than the rear sub-packets.

In embodiments, on the data receiver-side (or on the decoder-side), decoding the telegram may already be attempted before receiving the full message. If this is not possible, the remaining part of the message may also be received and subsequently decoded.

2.2. Increasing Pauses with Increasing Number of Transmitted/Emitted Sub-Packets Under certain circumstances, the embodiment according to section 2.1 has the disadvantage that, after failed early decoding, there is a relatively long wait until further sub-packets are received and decoding may again be attempted.

Figure 6:
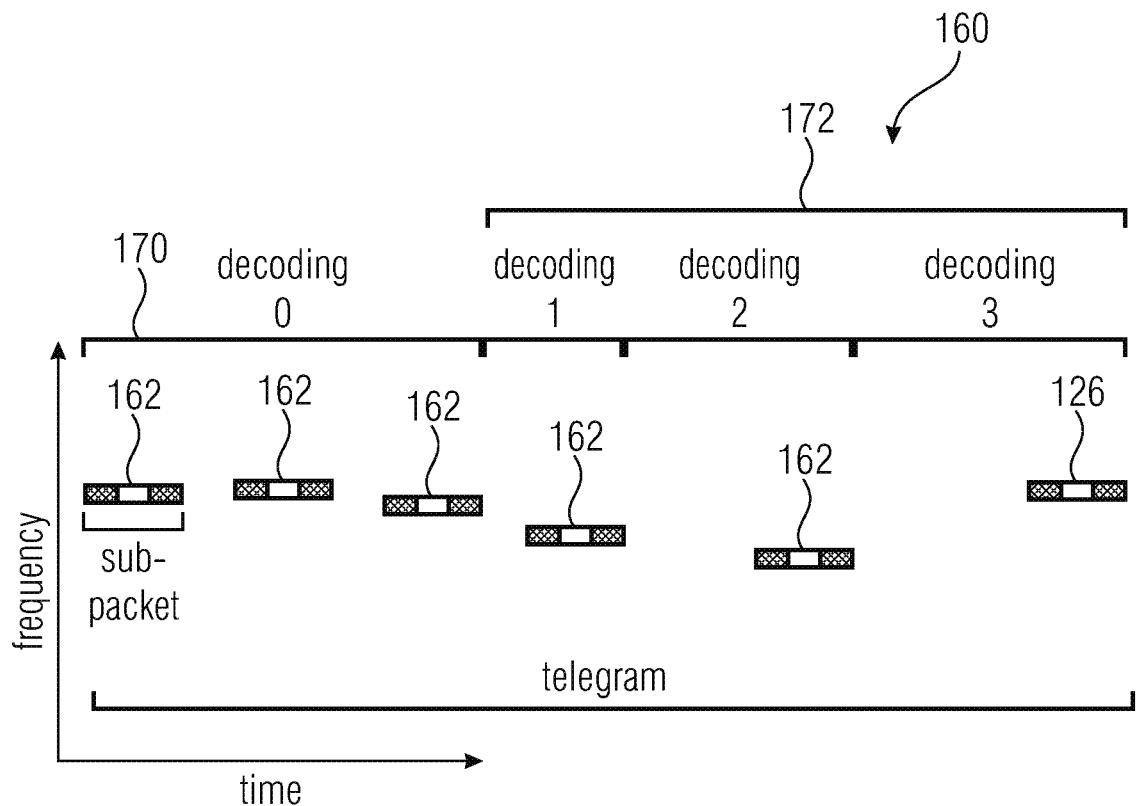
FIG. 6 shows in a diagram an exemplary occupancy of the transfer channel in the transfer of channel-encoded data by means of the plurality of sub-data packets, wherein transmission pauses between the sub-data packets of a first group of sub-data packets are smaller than transmission pauses between sub-data packets of a second group of sub-data packets, and wherein transmission pauses between the sub-data packets of the second group of sub-data packets increase with an increasing number of transmitted sub-data packets.

Therefore, in embodiments, transmission pauses between the sub-data packets of the second group 172 of sub-data packets 162 may increase within an increasing number of transmitted sub-data packets 162, as is shown in FIG. 6.

In detail, FIG. 6 shows in a diagram an exemplary occupancy of the transfer channel in the transfer of channel-encoded data by means of the plurality of sub-data packets 142, wherein transmission pauses between the sub-data packets 162 of a first group 170 of sub-data packets 162 or smaller than transmission pauses between sub-data packets 162 of a second group 172 of sub-data packets 162, and wherein transmission pauses between the sub-data packets 162 of the second group 172 of sub-data packets 162 increase with an increasing number of transmitted sub-data packets 162. In other words, FIG. 6 shows increasing pauses between the sub-packets for reception field strength-dependent decoding.

The initially mentioned problem may therefore be circumvented by successively increasing the pauses between the sub-packets with an increasing number of transmitted sub-packets.

It is important to note that the pauses do not have to be distributed in a strictly monotonously increasing manner, however, there should be a tendency as to increasing pauses.

If the receiver is not able to perform an estimation of the SNR or the reception power, decoding is attempted after each received block of new sub-packets (cf. FIG. 4, the top illustration of the block of the sub-packets). If the receiver has a SNR or reception level estimation, it may calculate after which block decoding of the telegram is possible.

In embodiments, on the data transmitter-side, the pauses of the sub-packets may increase on average with an increasing number of sub-packets. The latency of the transfer depends on the SNR or the interference level at the receiver.

In embodiments, on the data receiver-side, decoding the telegram may already be attempted before receiving the full message. If this is not possible, the remaining part of the message may also be received and then be decoded. Optionally, the receiver may estimate the SNR or the reception level of the telegram and may therefrom determine a point in time at which it makes sense to start an early decoding attempt.

3. Telegram Repetition

Under certain circumstances, the presented embodiments of sections 1 and 2 have the disadvantage that the interference susceptibility increases due to reducing the pauses between the telegrams and that this reduces the probability of transmission of the transfer. A solution for increasing the transfer reliability is the repetition of telegrams. For this, optimized concepts are presented in the following.

3.1. Low-Delay Patterns and Standard Hopping Patterns

In embodiments, the data transmitter 100 may be configured to divide data onto a plurality of sub-data packets 162 and to transmit the plurality of sub-data packets 162 using a first hopping pattern 160, wherein the data transmitter is configured to transmit the plurality of sub-data packets 162 repeatedly using a second hopping pattern 140, wherein transmission pauses between sub-data packets 162 transmitted according to the first hopping pattern 162 are smaller than transmission pauses between sub-data packets 162 transmitted according to the second hopping pattern 140.

In embodiments, the data receiver 110 may be configured to receive data divided onto a plurality of sub-data packets 162 and transferred using a first hopping pattern 160 and repeatedly using a second hopping pattern 140, wherein transmission pauses between sub-data packets 162 transferred according to the first hopping pattern 160 are smaller than transmission pauses between sub-data packets 162 transferred according to the second hopping pattern 140.

Instead of individually emitting a low-delay hopping pattern, in order to increase the transfer reliability, the same telegram may subsequently be emitted repeatedly with a different hopping pattern comprising a larger delay. FIG. 7 illustrates this principle.

In detail, FIG. 7 shows in a diagram an exemplary occupancy of the transfer channel in the transfer of channel-encoded data by means of a plurality of sub-data packets 162 using a first hopping pattern 160 and repeatedly using a second hopping pattern 140. In other words, FIG. 7 shows a combination of a low-delay emission with a standard emission as a repetition.

If multiple repetitions are used, apart from the last repetition, the hopping patterns may also have the same or a similar latency as the initial pattern (e.g. the telegram may be transmitted twice with the low-delay pattern and subsequently once with the standard pattern).

If the low-delay telegram is already correctly decoded in the receiver, the receiver may omit decoding the message of the standard telegram with higher delay.

If the message has not been received correctly, the receiver may receive the standard telegram and then decode the same. If this also does not work due to noise or interferences, it may perform a combination of the at least two emissions (e.g. maximum-ratio combining, MRC).

As an alternative to the full reception of the standard telegram, it would also be possible to only receive a part of the message of the standard telegram and to perform a partial combination with the low-delay telegram.

If the receiver were to have a SNR or reception level estimation, it would again be possible to determine in advance the (presumably) needed number of sub-packets and to then accordingly start decoding after the reception of the same.

In embodiments, on the data transmitter-side, (at least) one emission with a low-delay hopping pattern may initially be performed. Subsequently, repetitions with hopping patterns having a higher latency than the initial pattern may follow.

In embodiments, the receiver may initially try to receive the initial telegram. If this does not work, decoding the repetition or a combination of the initial emission and the repetition may be attempted.

3.2. Dividing the Telegrams onto Several Frequency Bands

Due to the shortened pauses, the use of low-delay telegrams has the disadvantage of a higher interference sensitivity. A possible solution for this problem is the parallel emission of a low-delay telegram on two different frequency bands ("dual method") (similar to increasing the bandwidth in section 1.3). In contrast to the multi-carrier methods (cf. section 5), transmission does never simultaneously occur on two frequencies in the dual method, but the sub-packets are classically emitted one after the other, same as when using a single frequency band.

As will be described in the following, this may be done in different ways.

In embodiments (case a)), the first hopping pattern may extend across two separate frequency bands, as is shown in FIG. 8.

FIG. 8 shows in a diagram an exemplary occupancy of the transfer channel in the transfer of the plurality of sub-data packets 162 using a hopping pattern 160 extending across two separate frequency bands 180 and 182. In other words, FIG. 8 shows a "dual method" according to case a), wherein sub-data packets are distributed across two separate frequency bands on which half a low-delay telegram is emitted each.

As is shown in FIG. 8, the hopping pattern may be selected such that a full low-delay telegram is distributed onto the two frequency bands in use. In contrast to using a single frequency band, this method increases the interference robustness against narrowband interferers and shortens the latency in contrast to standard TS telegrams.

In embodiments (case b)), the data may be transferred using the first hopping pattern twice in two separate frequency bands. In other words, a full low-delay telegram may be emitted on each one of the two frequency bands in use. For example, in contrast to case a), two full low-delay telegrams may be emitted instead of one. This further increases the robustness against interferences at the expense of a higher latency.

Figure 9:
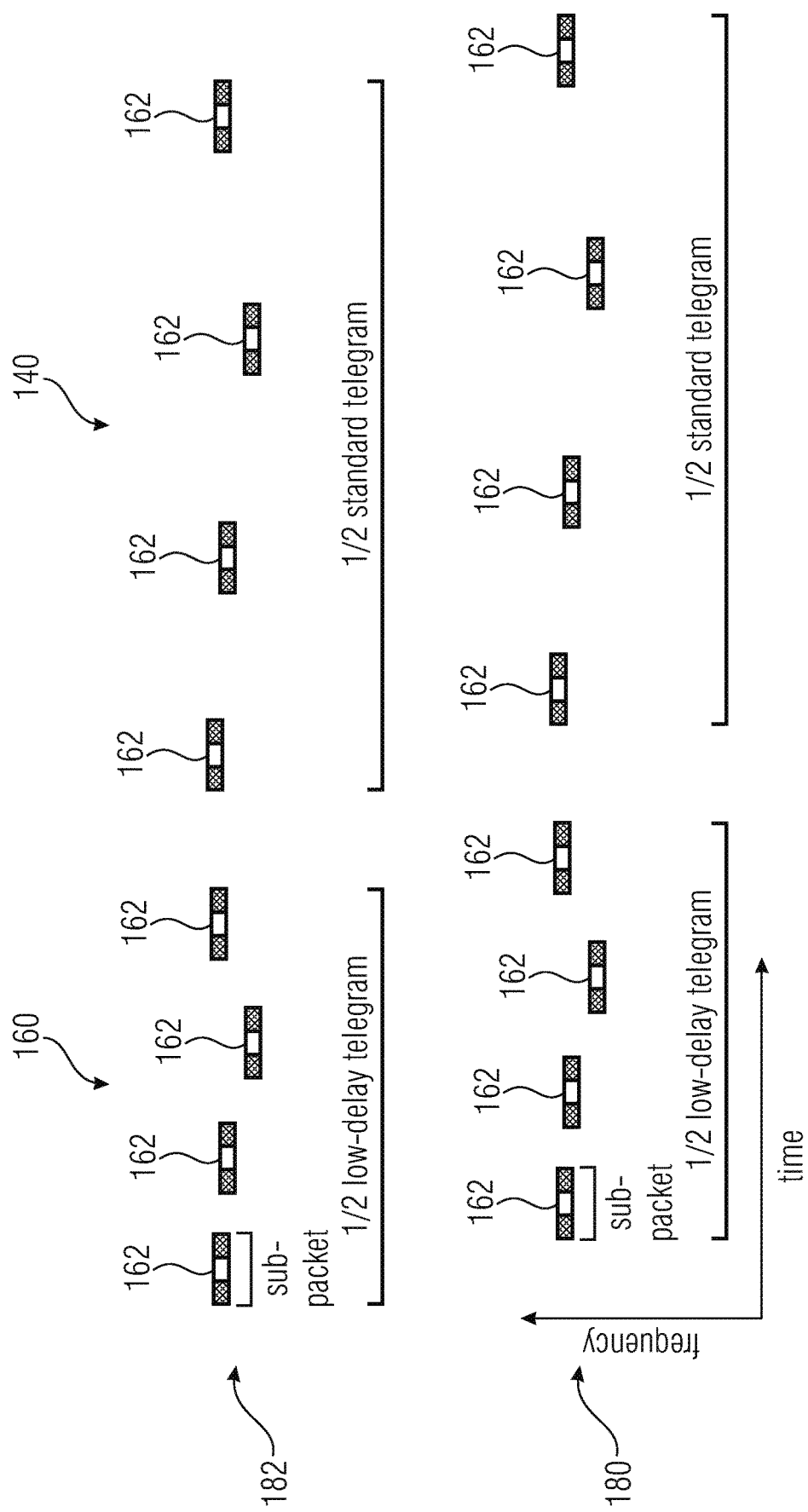
FIG. 9 shows in a diagram an exemplary occupancy of the transfer channel in the transfer of the plurality of sub-data packets using the first hopping pattern twice in two separate frequency bands and repeatedly using the second hopping pattern twice in two separate frequency bands.

In embodiments (case c)), the plurality of sub-data packets 162 may be transferred using the first hopping pattern twice in two separate frequency bands and repeatedly using the second hopping pattern twice in two separate frequency bands, as is shown in FIG. 9.

In detail, FIG. 9 shows in a diagram an exemplary occupancy of the transfer channel in the transfer of the plurality of sub-data packets 162 using the first hopping pattern 160 twice in two separate frequency bands 180 and 182 and repeatedly using the second hopping pattern 140 twice in two separate frequency bands 180 and 182. In other words, FIG. 9 shows a hopping pattern divided across two frequency bands; emitting a low-delay telegram is followed by a standard telegram.

As can be seen in FIG. 9, it is possible to combine this with the combination of the low-delay telegram and the standard TS telegram described in section 2.1 in order to further increase the robustness of the "dual method". The emission of half a low-delay telegram each on the two frequency bands is followed by a standard TS telegram whose sub-packets are also each emitted in halves on one of the two bands. That is, a total of two telegrams is emitted, a low-delay telegram and a standard TS telegram. An advantage of this is a significantly increased reception probability in the case of interferences due to the use of a standard TS telegram.

In embodiments (case d)), the highest interference robustness may be achieved through a combination of variations b) and c). A full low-delay telegram is transmitted on each of the two frequency bands, followed by a full standard TS telegram. This increases the interference robustness even against broadband interferers. An disadvantage is that the latency is not improved to such an extent as in case a) or c). In total, four full telegrams are emitted here (2 low-delay telegrams and 2 standard TS telegrams).

In embodiments, the combination of a low-delay telegram and a standard TS telegram allows a transfer with low latency (e.g. quick alarms), wherein the emission of the standard TS telegram also serves as a backup for increasing the reception probability.

In embodiments, on the data transmitter-side, the hopping pattern may be divided onto several frequency bands, e.g. two, wherein an unused gap is present between the frequency bands.

In embodiments, on the data receiver-side, the detection of the telegrams may be performed in only one of the two bands, for example. If a telegram is found in one of these two bands, the remaining sub-packets in the other band may automatically be inferred due to the fixed time/frequency interval.

3.3. Interleaving a Low-Delay Telegram in a Standard TS Telegram Hopping Pattern In embodiments, the data may be transferred in an interleaved manner using the first hopping pattern 160 and repeatedly using the second hopping pattern 140 so that at least one sub-data packet 142 transmitted according to the second hopping pattern 140 is arranged between two sub-data packets 162 transmitted according to the first hopping pattern 160, as is shown in FIG. 10.

Figure 10:
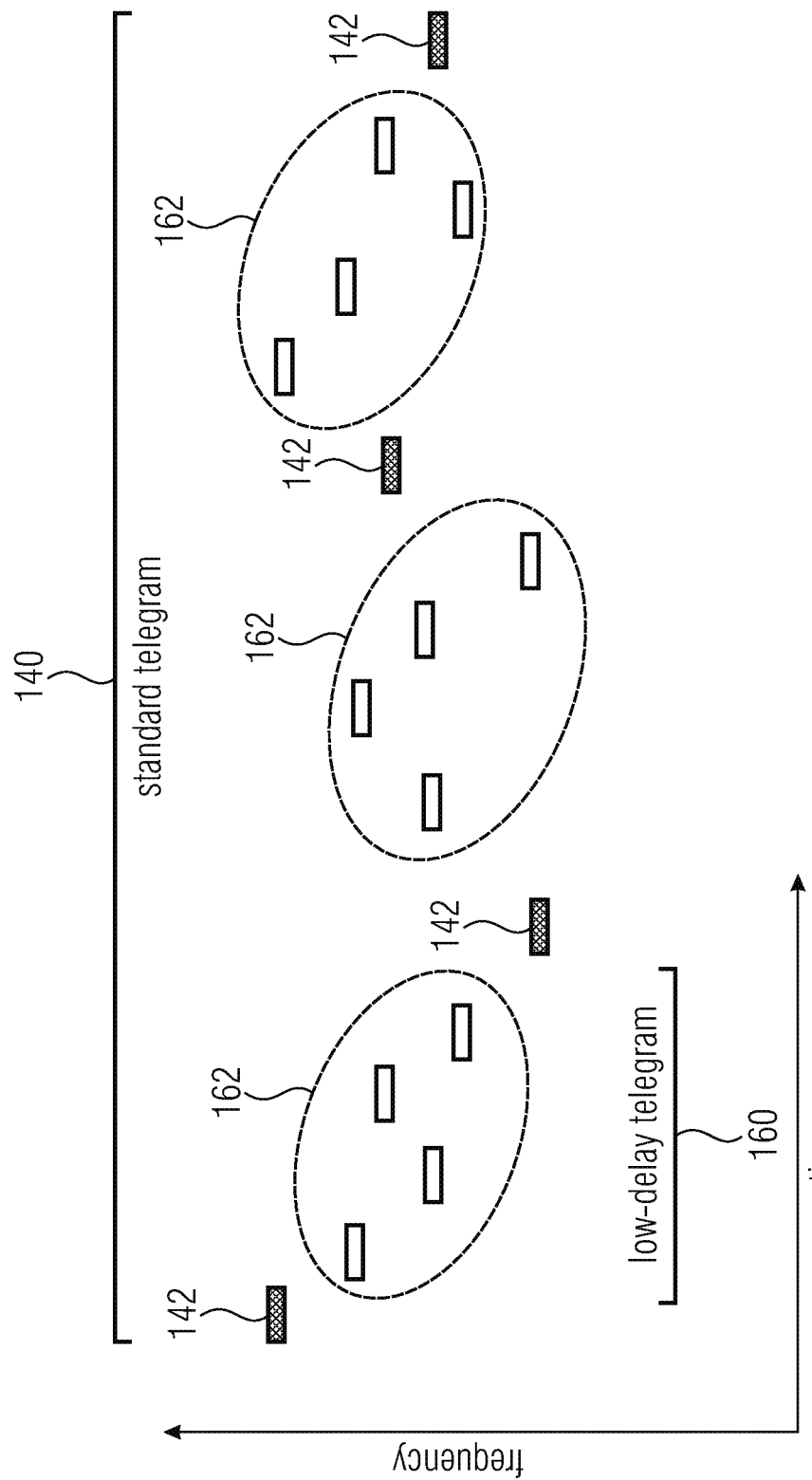
FIG. 10 shows in a diagram an exemplary occupancy of the transfer channel in the transfer of the plurality of sub-data packets using the first hopping pattern and repeatedly using the second hopping pattern, wherein sub-data packets transferred according to the first hopping pattern are arranged between sub-data packets transferred according to the second hopping pattern.

In detail, FIG. 10 shows in a diagram an exemplary occupancy of the transfer channel in the transfer of the plurality of sub-data packets 162 using the first hopping pattern 160 and repeatedly using the second hopping pattern 140, wherein sub-data packets 162 transferred according to the first hopping pattern 160 are arranged between sub-data packets 142 transferred according to the second hopping pattern 140. In other words, FIG. 10 shows low-delay telegrams interleaved in a standard telegram.

As can be seen in FIG. 10, the hopping patterns may be selected such that one or several low-delay telegrams is/are interleaved with a standard TS telegram. On the one hand, an advantage of this method is the short latency in the transfer of the message with high priority due to the low-delay telegram, on the other hand, the time saved in contrast to the consecutive emission of a low-delay telegram and the standard TS telegram, i.e. a shorter latency even if the low-delay telegram is not received (e.g. due to interferences) and forwarding the message is only possible after the full reception of the standard TS telegram.

In embodiments, on the data transmitter side, the hopping patterns may be defined such that one or several low-delay telegrams and a standard TS telegram may be interleaved in each other. That is, the pauses between the sub-packets of the standard TS telegram are large enough so that at least one sub-packet of the low-delay telegram may be introduced therein.

In embodiments, the receiver may initially receive the low-delay telegram and parts of the standard TS telegram and may then start a decoding attempt for the low-delay telegram. If this fails, the receiver may combine the low-delay telegram with the already received sub-packets of the standard TS telegram for a further decoding attempt. If this fails again, after receiving the complete standard TS telegram, it may be decoded (possibly using the sub-packets of the low-delay telegram).

4. Acknowledgements of Receipt for Critical Messages (in Bi-Directional Systems)

4.1. Shortened Time Window Until the Down Link after a Low-Delay Uplink

In embodiments, the data transmitter 100 may be configured to receive a first signal 190 temporally synchronized to the transmission of the data of the first class using the first hopping pattern 160, and wherein the data transmitter 100 may be configured to receive a second signal 192 temporally synchronized to the transmission of the data of the second class using the second hopping pattern 140, wherein a temporal interval between the first hopping pattern 160 and the first message 190 is smaller than a temporal interval between the second hopping pattern 140 and the second message.

In embodiments, the data receiver 110 may be configured to transmit a first message, temporally synchronized to the reception of the data of the first class using the first hopping pattern 160, and wherein the data receiver 110 may be configured to transmit a second message 192 temporally synchronized to the reception of the data of the second class using the second hopping pattern 140, wherein a temporal interval between the first hopping pattern 160 and the first message 190 is smaller than a temporal interval between the second hopping pattern 140 and the second message 192.

Figure 11:
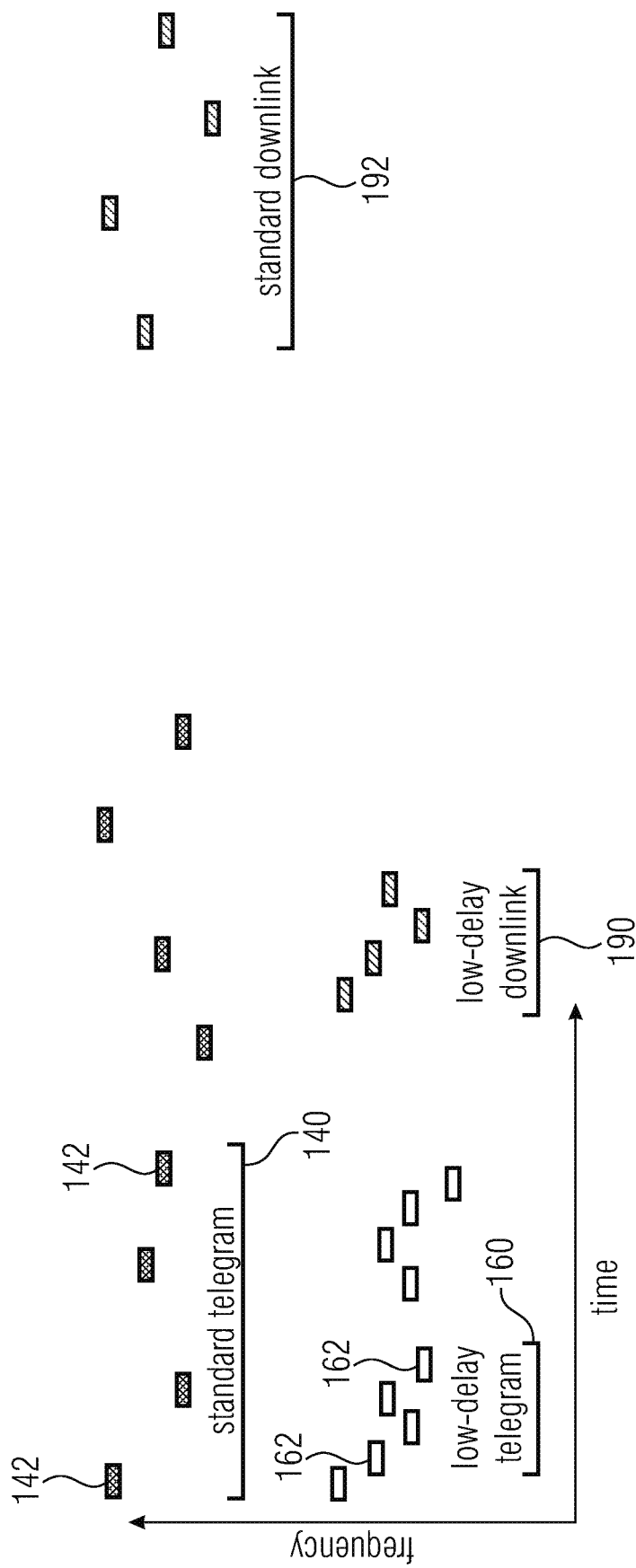
FIG. 11 shows in a diagram an exemplary occupancy of the transfer channel in a transfer of the first downlink message temporally synchronized to a transfer of the first plurality of sub-data packets according to the first hopping pattern in contrast to an occupancy of the transfer channel in a transfer of the second downlink message temporally synchronized to a transfer of the second plurality of sub-data packets according to the second hopping pattern.

For example, the first message may be a first downlink message 190 transferred divided onto a plurality of sub-data packets according to a first downlink hopping pattern, wherein the second message may be a second downlink message 192 transferred divided onto a plurality of sub-data packets according to a second downlink hopping pattern, wherein transmission pauses between the plurality of sub-data packets transferred by means of the first downlink hopping pattern are shorter than transmission pauses between the plurality of sub-data packets transferred by means of the second downlink hopping pattern, as is shown in FIG. 11.

In detail, FIG. 11 shows in a diagram an exemplary occupancy of the transfer channel in a transfer of the first downlink message 190 temporally synchronized to a transfer of the first plurality of sub-data packets 162 according to the first hopping pattern 160 in contrast to an occupancy of the transfer channel in a transfer of the second downlink message 192 temporally synchronized to a transfer of the second plurality of sub-data packets 142 according to the second hopping pattern 140. In other words, FIG. 11 shows a shortened time window between a low-delay uplink and downlink in contrast to the standard case.

A bi-directional, non-synchronized system optimized with respect to energy efficiency is usually characterized in that the start of the downlink slot is defined by a fixed time interval after the end of the uplink slot. That is, a downlink message can only be transmitted after an uplink message. The interval between the uplink and downlink message is defined or is signalized, or set, in advance.

However, it may be a requirement for critical applications to minimize the latency in both transfer directions (uplink and downlink) in order to be able to transmit a quick acknowledgement of the message (ACK).

A possible solution for this is that, responsive to receiving a low-delay telegram, the time interval until the beginning of the downlink slot is shortened in contrast to the standard case ("low-delay downlink"). In standard telegrams, the pause between the uplink and downlink typically corresponds to approximately the duration of a telegram, i.e. approximately a few seconds (due to energy efficiency/time needed to charge an energy storage of the transmitter/capacity limits of the base station). Similarly, in the case of a received low-delay telegram, the pause between the uplink and downlink may be shortened to approximately the duration of a low-delay telegram.

An advantage of this solution is that it does not only enable a low latency when transmitting the message, but also a prompt acknowledgement of the reception for the transmitter of the message.

In embodiments, on the data transmitter side, the reception of a low-delay telegram may lead to—in contrast to a standard TS telegram—a shortened interval between the low-delay uplink and the start of the downlink slot.

In embodiments, the receiver may expect the reception of the downlink already after—in contrast to the standard case—a shortened time window after emitting a low-delay telegram.

4.2. Low-Delay Uplink Requests ACK

Applications needing a low latency, i.e. time-critical applications, are also often security-critical (example:

alarms). In this case, it is a problem that the transmitter does not reliably know whether the message has been successfully transmitted.

In embodiments, the data transmitter 100 may be configured to receive from a data receiver 110, upon transmitting the data of the first class, an acknowledgement of receipt signalizing a successful reception of the data of the first class.

For example, in combination with or in addition to the embodiment of section 4.1, a bi-directional system may request that the reception of a low-delay telegram from the base station is to be confirmed with an acknowledgement of receipt (ACK). The advantage of this approach is that the transmitter reliably knows through the acknowledgement that the message has been successfully received.

In embodiments, on the data receiver-side, an ACK may be imperatively transmitted upon successfully receiving a low-delay telegram.

4.3. Low-Delay Uplink is Transmitted Until ACK has been Received

In embodiments, the data transmitter 100 may be configured to emit the data of the first class repeatedly using the first hopping pattern 160 or a different hopping pattern until the acknowledgement of receipt has been received.

In embodiments, the data receiver 110 may be configured to transmit, responsive to a successful reception of the data of the first class, an acknowledgement of receipt signaling a successful reception of the data of the first class, wherein the data receiver may be configured to emit the acknowledgement of receipt only for the data of the first class and not for the data of the second class.

A disadvantage in the use of the low-delay telegrams is their low interference robustness. In order to increase the probability to still successfully receive at least one low-delay telegram, the transmitter may emit the same until it has received an acknowledgement of receipt (ACK) from the base station. Upon receiving the ACK, the transmitter stops the emission. This method has several advantages: It increases for each individual transmission node the probability that its low-delay telegram transfer is successfully received. By stopping the emission upon receiving the ACK, occupied channel capacity is freed up. This additionally increases the reception probability of the overall system in scenarios in which several or many sensor nodes simultaneously want to transfer a low-delay telegram.

In embodiments, on the data receiver-side, an ACK may imperatively be transmitted upon successfully receiving a low-delay telegram.

In embodiments, the end node may transmit a low-delay telegram until an ACK has been received and the transfer has then been stopped.

4.4. Downlink Interleaved in Uplink

In order to increase the reception probability for a telegram, e.g. transmitted as an alarm signal, the same may continuously be transmitted until an ACK has been received (cf. embodiment according to section 4.3). In the normal case, a transmission pause has to be kept after some emissions (e.g. two) in order to be able to receive the ACK.

However, in embodiments, the data transmitter 100 may be configured to receive from the data receiver 110 the acknowledgement of receipt temporally overlapping to (1) the emission of the data of the first class using the first hopping pattern or (2) the emission of the data of the second class in the second hopping pattern, so that at least one sub-data packet transmitted according to the respective hopping pattern is arranged between two sub-data packets of a hopping pattern with which the acknowledgement of receipt of the data receiver is emitted.

In embodiments, the data receiver 110 may be configured to emit, using a hopping pattern, the acknowledgement of receipt temporally overlapping to the reception of (1) the data of the first class using the first hopping pattern or (2) the data of the second class using the second hopping pattern such that at least one sub-data packet transferred according to the first hopping pattern or second hopping pattern is arranged between two sub-data packets of the hopping pattern with which the acknowledgment of receipt is emitted.

Figure 12:
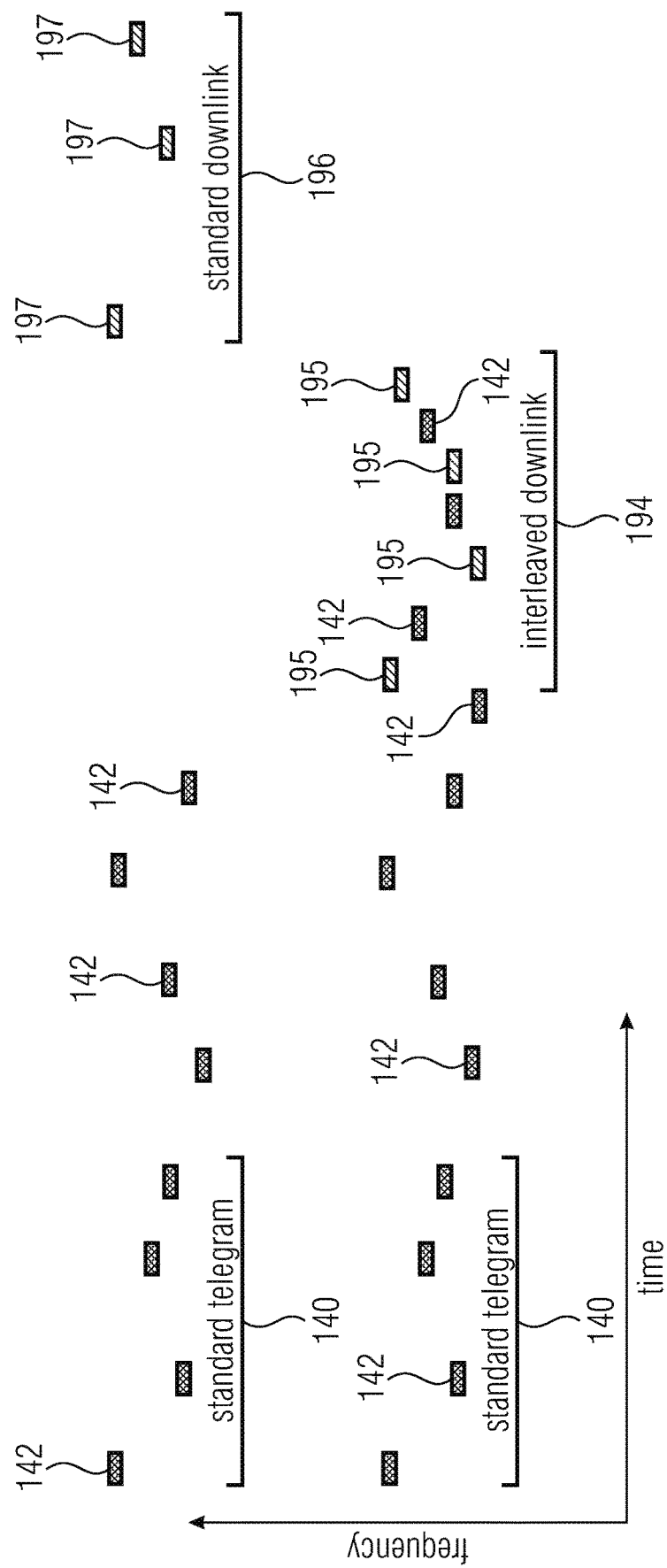
FIG. 12 shows in a diagram an exemplary occupancy of the transfer channel in a transfer of an acknowledgement of receipt divided onto a plurality of sub-data packets, temporally interleaved with the transfer of the first plurality of sub-data packets according to the second hopping pattern in contrast to an occupancy of the transfer channel in a transfer of an acknowledgement of receipt divided onto a plurality of sub-data packets temporally after the transfer of the first plurality of sub-data packets according to the second hopping pattern.

FIG. 12 shows in a diagram an exemplary occupancy of the transfer channel in a transfer of an acknowledgement of receipt 194 divided onto a plurality of sub-data packets 195, temporally interleaved with the transfer of the first plurality of sub-data packets 142 according to the second hopping pattern 140 in contrast to an occupancy of the transfer channel in a transfer of an acknowledgement of receipt 196 divided onto a plurality of sub-data packets 197 temporally after the transfer of the first plurality of sub-data packets 142 according to the second hopping pattern 140. In other words, FIG. 12 shows on its top side the standard case and on its bottom side the interleaved downlink having the advantage that an additional telegram may be emitted and the downlink may at the same time be received earlier.

In other words, after a duration corresponding to the time interval between the uplink and the downlink slot, it is alternatively also possible to interleave the downlink into the further emitted uplink hopping pattern. An advantage of this solution is that no time slot is lost for emitting the alarm and that the reception probability is therefore maximized, but the duration until the reception of the ACK is minimized at the same time in order to enable as prompt an acknowledgement of receipt of the alarm as possible.

In embodiments, on the data receiver-side, after receiving at least one standard TS telegram and the time window until the beginning of the downlink slot, the hopping pattern for a standard TS telegram in the downlink may be selected such that it may be interleaved into the further emitted uplink.

In embodiments, on the data transmitter side, the base station may transmit the downlink in parallel to the reception, wherein, on the data receiver-side, the sensor node receives the downlink in parallel to the emission of the uplink. In other words, the data transmitter and the data receiver switch between a transmission branch and a reception branch during a telegram.

4.5. Combination of Interleaved Downlink with Low-Delay Uplink

In order to be able to achieve a short latency until the successful acknowledgement, which is important for critical applications, the first emissions of a standard TS telegram may be replaced by the emission of several low-delay telegrams in order to reduce the latency, based on the previous embodiment of section 4.4. A sequence of several (e.g. two) low-delay telegrams is followed by the emission of a standard TS telegram in the uplink in order to be able to simultaneously receive the interleaved ACK in the downlink. The advantages of this are a reduced latency until the first possible reception of the telegram and an increased reliability in the case of a non-reception of the low-delay telegrams, since an additional emission occurs due to the omission of a pause for the downlink, and the reception probability is further increased due to the standard TS telegram.

Figure 13:
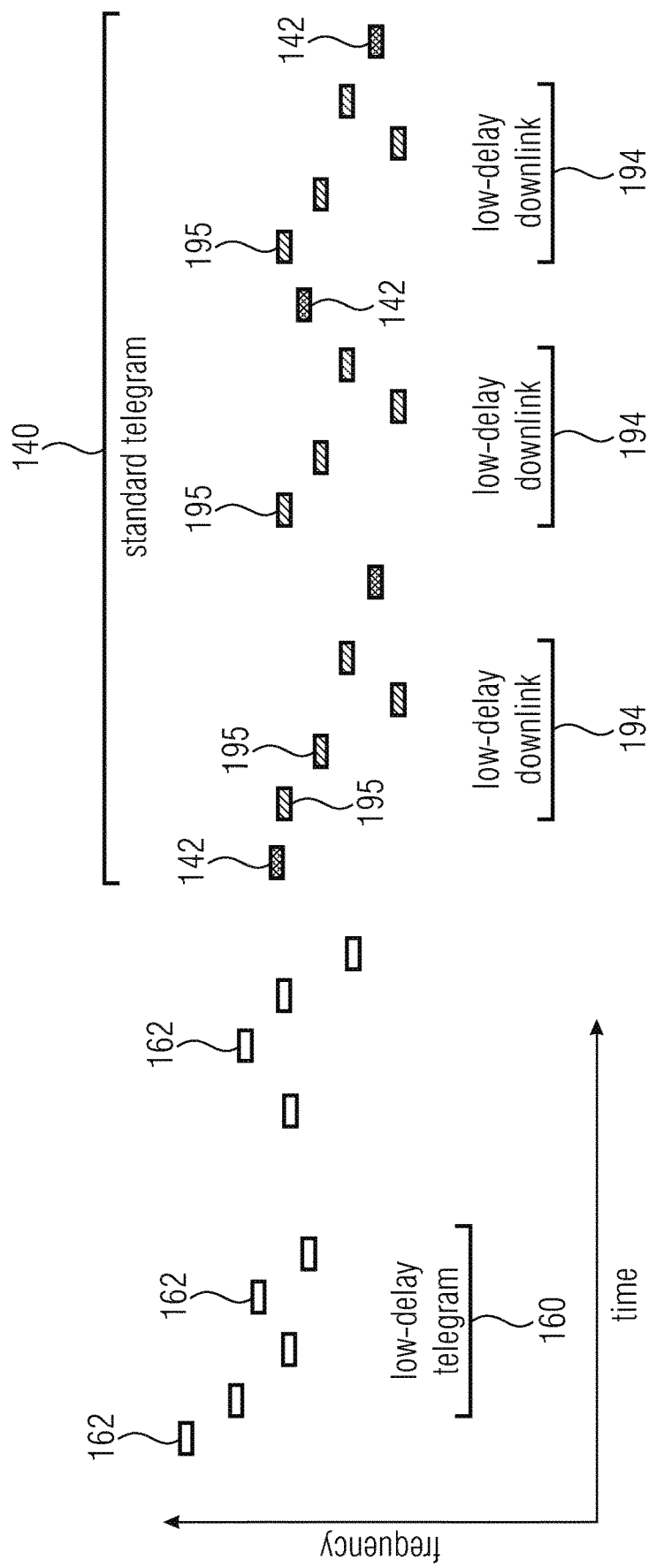
FIG. 13 shows in a diagram an exemplary occupancy of the transfer channel in the transfer of the first plurality of sub-data packets according to the first hopping pattern, the transfer of the second plurality of sub-data packets according to the second hopping pattern, and the transfer of an acknowledgement of receipt divided onto a plurality of sub-data packets, temporally interleaved with the transfer of the second plurality of sub-data packets according to the second hopping pattern.

FIG. 13 shows an occupancy of the transfer channel in the transfer of the first plurality of sub-data packets 162 according to the first hopping pattern 160, the transfer of the second plurality of sub-data packets 142 according to the second hopping pattern 140, and the transfer of an acknowledgement of receipt 194 divided onto a plurality of sub-data packets 195, temporally interleaved with the transfer of the second plurality of sub-data packets 142 according to the second hopping pattern 140. In other words, FIG. 13 shows a low-delay uplink followed by an emission of a standard telegram having interleaved into its pauses the low-delay downlink.

In embodiments, on the data transmitter-side, a standard TS telegram may be emitted after the emission of one or several (e.g. two) low-delay telegrams and, possibly, an ACK may be at the same time received in the downlink. The pauses between the sub-packets of the standard TS telegram may be used for further downlink slots.

In embodiments, on the data transmitter-side, the pauses between the sub-packets of the standard TS telegram may be used in order to receive the downlink message, i.e. the sensor node switches between the transmission branch and reception branch within a telegram.

5. Multi-Carrier Transfer

To date, the hopping patterns of the transfer were defined such that a maximum of one emission of a sub-packet takes place at any point in time of the telegram transfer. This has the advantage that almost any radio chip available on the market may be used for the emission.

However, high latencies arising due to this limitation and the pauses in the telegram splitting are disadvantageous.

5.1. Fully Overlapping Multi-Carrier Mode

In embodiments, the data transmitter 100 may be configured to transmit at least two sub-data packets 162 according to the first hopping pattern 160 on different frequencies and with a full temporal overlap.

In embodiments, the data receiver 110 may be configured to receive at least two sub-data packets 162 according to the first hopping pattern 160 on different frequencies and with a full temporal overlap.

Figure 14:
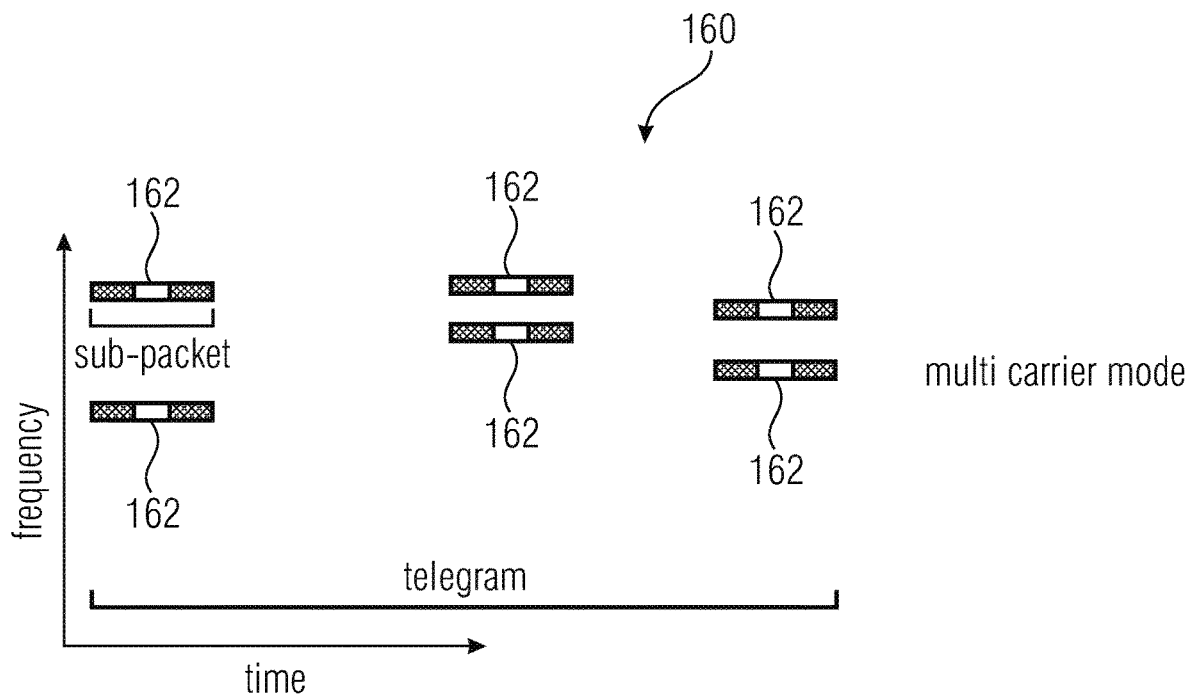
FIG. 14 shows in a diagram an exemplary occupancy of the transfer channel in the transfer of the first plurality of sub-data packets according to the first hopping pattern distributed in time and frequency such that sub-data packets fully temporally overlap on different frequencies.

FIG. 14 shows in a diagram an exemplary occupancy of the transfer channel in the transfer of the first plurality of sub-data packets 162 according to the first hopping pattern 160 such that sub-data packets 162 fully temporally overlap on different frequencies. In order words, FIG. 14 shows a multi-carrier mode with telegram splitting.

As can be seen in FIG. 14, it is possible to perform a so-called multi-carrier emission, if using special radio chips, an SDR frontend or similar transmitters having the possibility to be able to transmit in parallel on several frequencies.

In combination with telegram splitting, this means that several sub-packets are emitted in parallel at certain points in time. However, there are also times within the telegram in which no emission takes place (transmission pause).

Receivers used to date may still be used without modifications of the algorithms (adapting the hopping pattern) since a channel division is usually already implemented in the receiver.

In embodiments, on the data transmitter-side, the hopping pattern may be defined such that a parallel emission takes place at least at one point in time.

5.2. Partially Overlapping Multi-Carrier Mode

Under certain circumstances, the previous embodiment according to section 5.1 has the disadvantage of a lower interference robustness with respect to broadband interferences since this may destroy more than one sub-packet in contrast to the conventional telegram splitting. This is due to the bandwidth of the interferences since it is usually larger than the typical hopping distances of the telegram splitting.

However, due to the high symbol rate (the symbol rate is related to the bandwidth), these broadband interferences are only very short with respect to the transmission duration. Thus, it is possible to increase the interference robustness by transmitting the sub-packets with only a partial overlap.

In embodiments, the data transmitter 100 may therefore be configured to transmit at least two sub-data packets 162 according to the first hopping pattern 160 on different frequencies and with a partial temporal overlap.

In embodiments, the data receiver 110 may be configured to receive at least two sub-data packets 162 according to the first hopping pattern 160 on different frequencies and with a partial temporal overlap.

Figure 15:
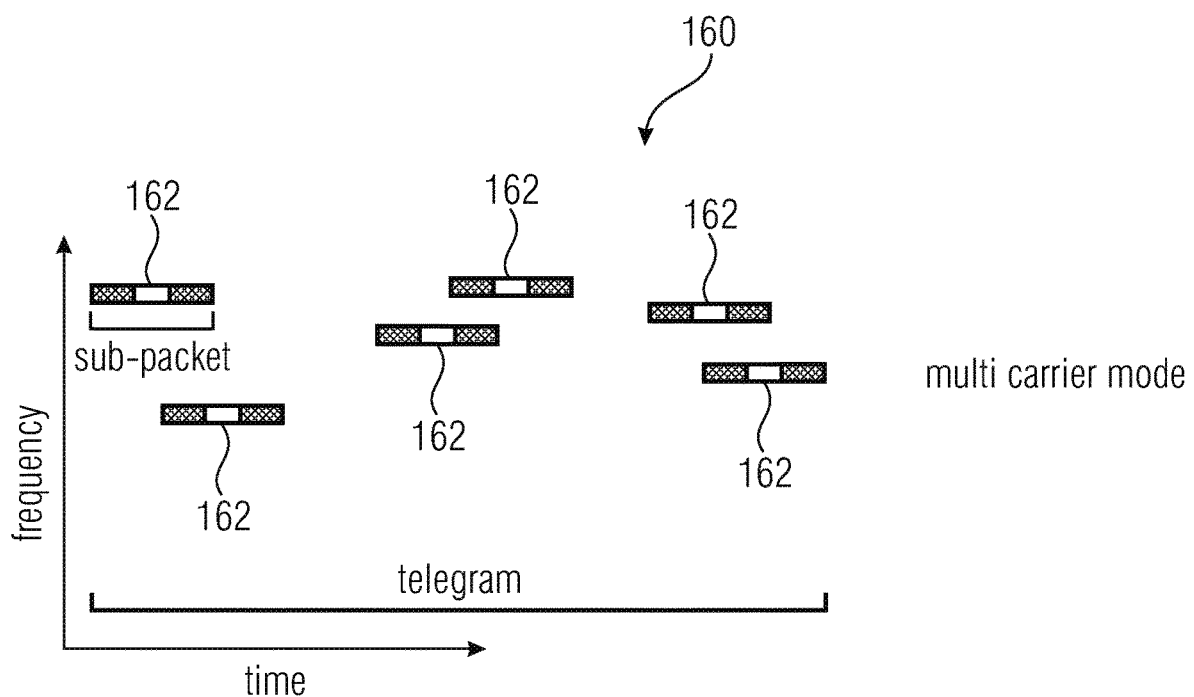
FIG. 15 shows in a diagram an exemplary occupancy of the transfer channel in the transfer of the first plurality of sub-data packets according to the first hopping pattern distributed in time and frequency such that sub-data packets 162 partially overlap on different frequencies.

FIG. 15 shows in a diagram an exemplary occupancy of the transfer channel in the transfer of the first plurality of sub-data packets 162 according to the first hopping pattern 160 distributed in time and frequency such that sub-data packets 162 partially overlap on different frequencies. In other words, FIG. 15 shows a multi-carrier mode with partial overlaps in the telegram splitting.

As can be seen in FIG. 15, due to the only partial overlap of the sub-packets, the probability of a broadband interferer destroying more than one sub-packet may be reduced to the area in which the overlapped emission takes place.

In embodiments, on the data transmitter-side, the hopping pattern may be defined such that a parallel emission takes place at least at one point in time, wherein the overlap may also only take place in a part of a sub-packet.

6. Combination of Classic Transfer and Telegram Splitting

On the condition that the transfer reliability is not significant in a low-delay message, an emission of the message may first take place as a classic telegram. Subsequently, the message may be repeated by means of telegram splitting.

In embodiments, the data transmitter 100 may be configured to emit data of a first class using a data packet 150, and wherein the data transmitter 100 may be configured to emit the data repeatedly using a plurality of sub-data packets 162, wherein the plurality of sub-data packets 162 is emitted according to a first hopping pattern 160.

In embodiments, the data receiver 110 may be configured to receive the data of the first class transferred using the one data packet 150, and wherein the data receiver 110 may be configured to receive the data of the first class transferred repeatedly using the plurality of sub-data packets 162 according to the first hopping pattern 160.

Figure 16:
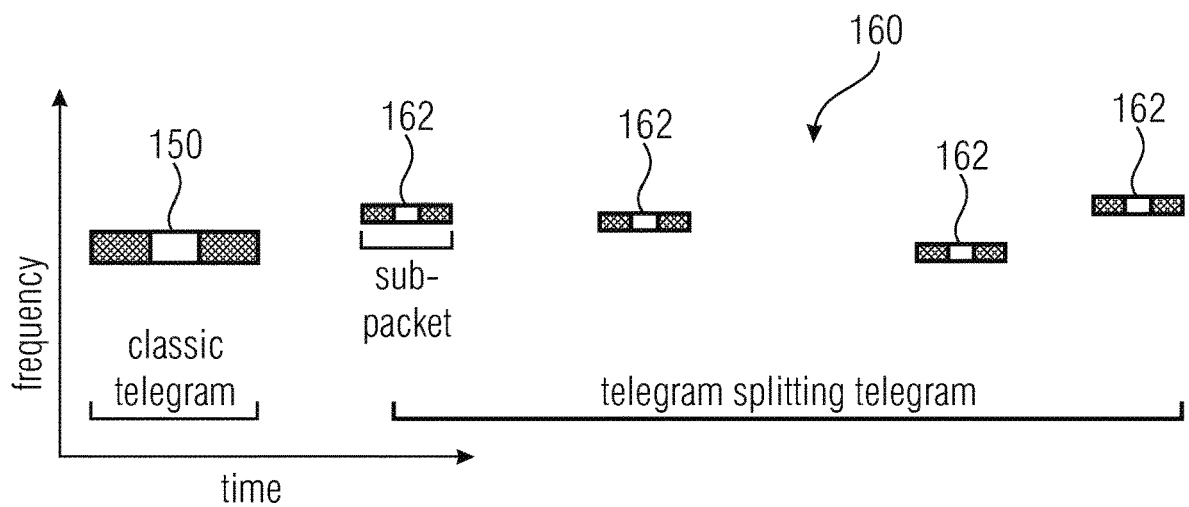
FIG. 16 shows in a diagram an exemplary occupancy of the transfer channel in the transfer of data of a first class using a data packet and repeatedly using a plurality of sub-data packets according to a first hopping pattern distributed in time and frequency.

FIG. 16 shows in a diagram an exemplary occupancy of the transfer channel in the transfer of data of a first class using a data packet and repeatedly using a plurality of sub-data packets 162 according to a first hopping pattern distributed in time and frequency. In other words, FIG. 16 shows a combination of a classic telegram and a telegram with telegram splitting.

The temporal interval and the optional frequency offset between the classic telegram and the telegram splitting telegram may be selected freely. In this case, only separate decoding of the message is possible, except if the detection may detect both telegrams and perform a successful synchronization.

Optionally, the time/frequency interval between the two emissions may also be selected to be fixed. In this case, a combination of the two emissions is possible, it is sufficient if only one of the two telegrams has been detected and is able to be used for the synchronization.

In embodiments, on the data transmitter-side, an emission may initially be performed with a classic transfer method (e.g. BPSK without pauses). Subsequently, repetitions with telegram splitting follow.

In embodiments, the receiver may have two separate processing branches. One is responsible for the detection and processing of the classic transfer method and a further one for the processing of the telegram splitting. Optionally, a combination of both transfers may be performed if time and frequency between the two emissions are known or a hypothesis test is performed.

6.1 Interleaved Emission of the Classic Transfer with Telegram Splitting

Under certain circumstances, the embodiment according to section 6 has the disadvantage that the latency strongly increases in a non-correct transfer with the help of the classic transfer method. A possibility to solve this problem is would be, e.g., to repeat the emission (e.g. twice or three times) with the help of the classic transfer method before performing the transfer with telegram splitting.

This increases the transmission probability, but still has the disadvantage that, with strongly interfered channels, there is still a comparably high failure rate for the classic transfer. Thus, it is more probably in these channels that the classic telegrams cannot be received correctly even if repeated, than the transfer with telegram splitting.

Thus, these channels still have the problem of the abruptly increasing latency during the transfer.

Thus, in embodiments, the data transmitter 100 may be configured to further emit the data of the first class repeatedly using a further data packet 151. In this case, the data transmitter 100 may be configured to emit in a temporally interleaved manner the data of the first class using the further data packet 151 and using the plurality of sub-data packets 162 so that the further data packet 151 is temporally arranged between two of the plurality of sub-data packets 162.

In embodiments, the data receiver 110 may be configured to receive the data of the first class further repeatedly using a further data packet 151. In this case, the data receiver 110 may be configured to receive in a temporally interleaved manner the data of the first class using the further data packet 151 and using the plurality of sub-data packets 162 so that the further data packet 151 is temporally arranged between two of the plurality of sub-data packets 162.

Figure 17:
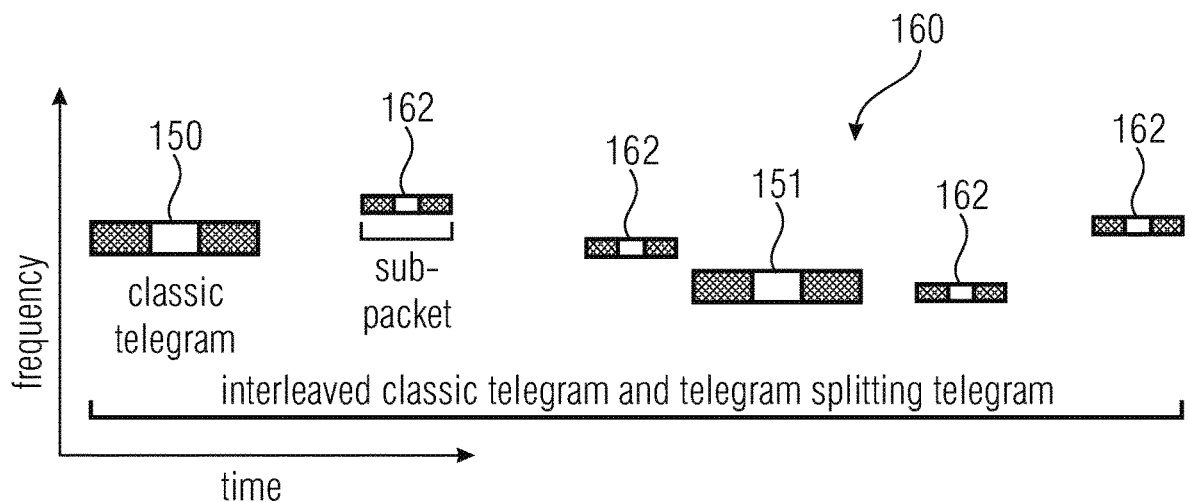
FIG. 17 shows in a diagram an occupancy of the transfer channel in the transfer of data of a first class using a data packet and repeatedly using a further data packet and repeatedly using a plurality of sub-data packets distributed in time and frequency according to a hopping pattern, wherein the further data packet and the plurality of sub-data packets are interleaved such that the further data packet is temporally arranged between two of the plurality of sub-data packets.

FIG. 17 shows in a diagram an occupancy of the transfer channel in the transfer of data of a first class using a data packet 150 and repeatedly using a further data packet 151 and repeatedly using a plurality of sub-data packets 162 distributed in time and frequency according to a hopping pattern, wherein the further data packet 151 and the plurality of sub-data packets 162 are interleaved such that the further data packet 151 is temporally arranged between two of the plurality of sub-data packets 162. In other words, FIG. 17 shows an interleaved emission of a telegram with a classic transfer method and a telegram with telegram splitting.

As can be seen in FIG. 17, the initially mentioned problem may be avoided by transferring (several times) the transfer of the telegram with the classic transfer method interleaved with the telegram splitting telegram.

To this end, the hopping pattern may be defined such that the pauses between the sub-packets are large enough so that a telegram with the classic transfer methods fits into this gap, or puncturing of the telegram splitting telegram is performed.

In embodiments, on the data transmitter-side, the (repeated) emission with a classic transfer method (e.g. BPSK without pauses) may be performed interleaved with the transfer of the telegram with telegram splitting.

In embodiments, the receiver may have two separate processing branches. One is responsible for detecting and processing the classic transfer method and a further one is responsible for processing the telegram splitting. Optionally, a combination of the two transfers may be carried out if time and frequency between the two emissions are known or a hypothesis test is performed.

6.2. Acknowledgement of Receipt in Bi-Directional Systems

In embodiments, the data transmitter may be configured to select a temporal interval between the emission of the data packet 150 and the plurality of sub-data packets 162 to have such a size that a reception of an acknowledgement of receipt 154 from a data receiver 110 in the temporal interval is possible.

In embodiments, the data receiver 110 may be configured to transmit an acknowledgement of receipt 154 in a temporal interval between the reception of the data packet 150 and the plurality of sub-data packets 150.

Figure 18:
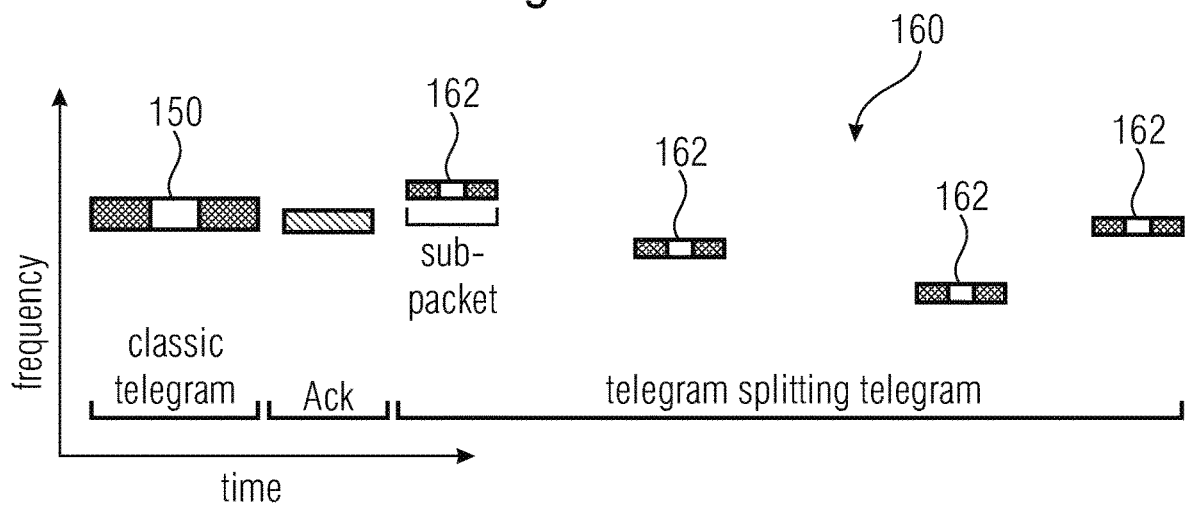
FIG. 18 shows in a diagram an exemplary occupancy of the transfer channel in the transfer of data of a first class using a data packet and repeatedly using a plurality of sub-data packets distributed in time and frequency according to a first hopping pattern, and a transfer of an acknowledgement of receipt in a temporal interval between the data packet and the plurality of sub-data packets.

FIG. 18 shows in a diagram an exemplary occupancy of the transfer channel in the transfer of data of a first class using a data packet 150 and repeatedly using a plurality of sub-data packets 162 distributed in time and frequency according to a first hopping pattern 160, and a transfer of an acknowledgement of receipt 154 in a temporal interval between the data packet 150 and the plurality of sub-data packets 162. In other words, FIG. 18 shows a combination of a classic telegram and a telegram with telegram splitting with an acknowledgement of receipt for the classic transfer method.

As can be seen in FIG. 18, in addition to the two previous embodiments of sections 6 and 6.1, the pause between the classic emission and the telegram with telegram splitting in a bidirectional system, and/or, in the embodiment according to section 6.1, the pause until the next sub-packet may be selected to have such a size that an acknowledgement of receipt may be sent back by the receiver of the message between the two emission.

If the acknowledgement of receipt is received correctly by the transmitter of the original message, the emission of the telegram splitting telegram may be omitted since the correct reception of the message at the receiver has already been confirmed.

Otherwise, if no acknowledgement of receipt of the message has been received, the emission of the telegram with telegram splitting may be carried out. In case that there is a high priority for the message, a further emission of the classic telegram may also be carried out.

The acknowledgement of receipt may be carried out in the same frequency band or in a different frequency band, e.g., in which there are less interferences.

In embodiments, on the data receiver side, if the emission with a classic transfer method has been received correctly, the receiver of the message may send back an acknowledgement of receipt to the transmitter, wherein, on the data transmitter side, the data transmitter may decide depending on the reception (or failure of reception) of the acknowledgement of receipt whether further emissions are to be carried out.

In embodiments, the receiver may have two separate processing branches. One is responsible for detecting and processing the classic transfer method and a further one is responsible for processing the telegram splitting. Optionally, a combination of the two transfers may be performed if time and frequency between the two emissions are known or a hypothesis test is performed.

7. Information Encoding in the Hopping Pattern

As previously described in section 1.2, the number of sub-packets to be transferred may be reduced in order to reduce the latency of the transfer. To this end, in section 1.2, the length of the sub-packets is increased in order to be able to transfer the same amount of data with fewer sub-packets. However, this has the disadvantage of a reduced interference robustness of the system.

In order to solve the initially mentioned problem, the information encoding of (a part of) the data may be included in the hopping pattern. This means there is no longer a pattern defined in advance that is used, but that the position of the sub-packets in frequency and/or time defines the data symbols.

In embodiments, the data transmitter 100 may therefore be configured to calculate at least a part of the first hopping pattern from the data of the first class or a channel-encoded version of the data of the first class so that at least a part of the first hopping pattern itself encodes at least a part of the data of the first class.

For example, a first group of hops of the first hopping pattern may be specified, wherein the data transmitter may calculate a second group of hops of the first hopping pattern from the data of the first class or a channel-encoded version of the data of the first class so that the second group of hops of the first hopping pattern itself encodes at least a part of the data of the first class. In this case, the data transmitter 100 may be configured to transmit the first plurality of sub-data packets according to the first group of hops and the second group of hops.

In embodiments, the data receiver 110 may be configured to decode the pattern of the second group of hops of the first hopping pattern in order to obtain at least the part of the data of the first class or the channel-encoded version of the data of the first class.

In embodiments, this may be exclusively used for the modulation of the data bits (that is, the entire information is encoded into the hopping pattern), wherein the symbols within the sub-packets then purely consist of a synchronization sequence, or the sub-packets contain, beside the synchronization sequence, further data bits mapped onto symbols according to the modulation rule. In this case, the data transfer consists of the information in the hopping pattern and the information in the symbols of the sub-packets.

In the receiver, the hopping pattern may be detected by means of a hypothesis test, and the data bits may be extracted from the determined frequencies and time intervals of the sub-packets.

For example, two carrier frequencies (fc1 and fc2) may be defined. If a "one" is to be transmitted as the data bit, the frequency fc1 is used as the carrier frequency, whereas, with a "zero" as the data bit, the frequency fc2 is used.

The assignment of frequencies and times may be done arbitrarily, however, it has to be known to the transmitter and the receiver.

Optionally, before assigning the data bits to the respective frequencies and/or time intervals, the data bits may be channel-encoded in order to be able to correct errors arising in the transfer (e.g. due to noise or interferences) or in the receiver during the estimation. Through this channel-encoding, it is possible also use this method in interference channels and at a low SNR where the temporal position and/or the frequency cannot be determined for all sub-packets.

In embodiments, on the data transmitter-side, the position of the sub-packets in time and/or frequency may depend on (a part of) the information to be transferred.

In embodiments, the receiver may determine the time and/or frequency intervals between the sub-packets by means of a hypothesis test (e.g. a correlation with the synchronization sequence in the sub-packet) in order to be able to extract the transferred information therefrom.

7.1. Simplified Detection with the Help of a Defined Reference

Under certain circumstances, the embodiment according to Section 6 has the disadvantage that in non-synchronized systems the receiver has no information as to where and when the telegram starts. Due to encoding the information onto the hopping pattern, it is no longer simply possible to perform a telegram detection since the positions of the sub-packets vary in time and/or frequency.

Thus, the receiver has to continuously search for a telegram, wherein it has to examine all possibilities of the hopping pattern. If only limited computing power is available, it is usually not possible to search through all combinations of the transfer.

In embodiments, the data transmitter 100 may therefore be configured to transmit the first plurality of sub-data packets 162 distributed according to the first hopping pattern 160, temporally synchronized to a synchronization signal for synchronization in a data receiver.

In embodiments, the data receiver 110 may be configured to detect, in a reception data stream using the synchronization signal, the first plurality of sub-data packets 162 transferred distributed according to the first hopping pattern 160, wherein the data receiver may be configured to itself decode the first hopping pattern in order to obtain at least the part of the data of the first class or the channel-encoded version of the data of the first class.

Figure 19A:
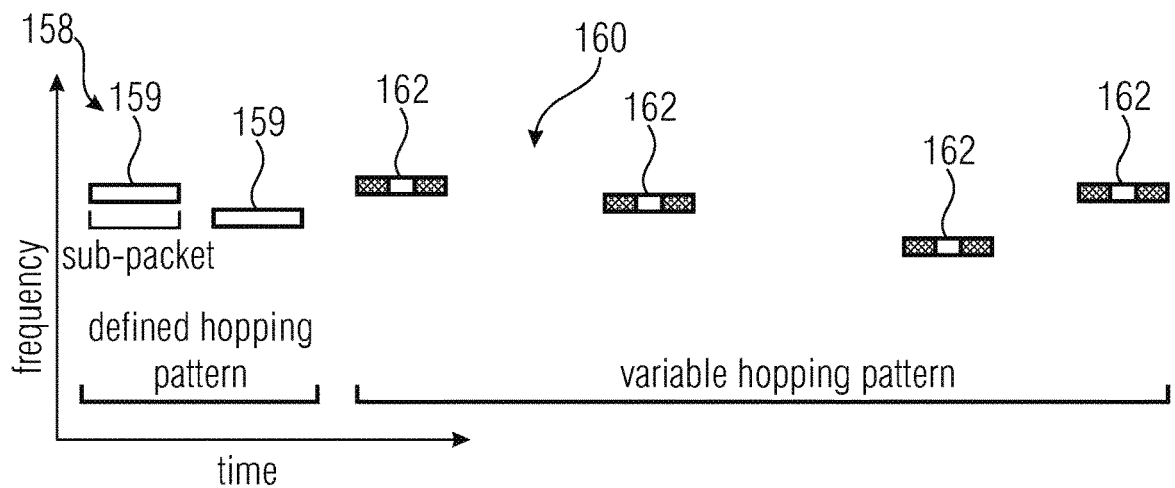
FIG. 19a shows in a diagram an exemplary occupancy of the transfer channel in the transfer of the first plurality of sub-data packets distributed in time and frequency according to the first hopping pattern, temporally synchronized to a synchronization signal.

FIG. 19 shows in a diagram an exemplary occupancy of the transfer channel in the transfer of the first plurality of sub-data packets 162 distributed in time and frequency according to the first hopping pattern 160, temporally synchronized to a synchronization signal 158. For example, the synchronization signal 158 may comprise two (or more) sub-data packets 159 with synchronization sequences for synchronization of the sub-data packets 159 in a data receiver 110, wherein the two (or more) sub-data packets 159 are transferred according to a fixed (non-variable, or specified) hopping pattern. In other words, FIG. 19 shows a combination of a fixed and a variable hopping pattern.

In embodiments, before the actual transfer, one/several synchronization bursts (this is at least one sub-packet) may be transmitted with a fixed hopping pattern (cf. FIG. 11, lower drawing). The receiver may use this part of the transfer for the telegram detection.

In embodiments, the data transmitter 100 may alternatively also be configured to transmit the first plurality of sub-data packets 162 according to a first group 163_1 of hops and a second group 163_2 of hops of the first hopping pattern 160, wherein the first group 163_1 of hops is specified, and wherein the data transmitter 100 is configured to calculate the second group 163_2 of hops from the data of the first class or a channel-encoded version of the data of the first class so that the second group 163_1 of hops of the first hopping pattern itself encodes at least a part of the data of the first class.

Figure 19B:
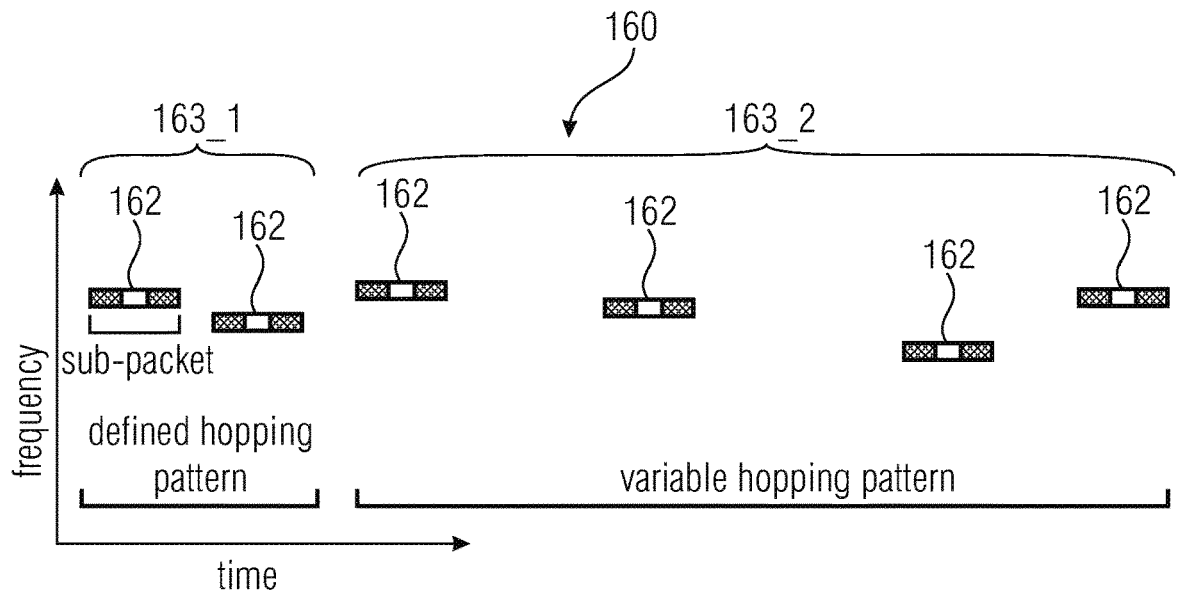
FIG. 19b shows in a diagram an exemplary occupancy of the transfer channel in the transfer of the first plurality of sub-data packets according to a hopping pattern with a first group of hops and a second group of hops, wherein the first group of hops is specified, and wherein the second group of hops is calculated from the data of the first class or a channel-encoded version of the data of the first class.

FIG. 19*b* shows in a diagram an exemplary occupancy of the transfer channel in the transfer of the first plurality of sub-data packets 162 according to a hopping pattern with a first group 163_1 of hops and a second group 163_2 of hops, wherein the first group 163_1 of hops is specified, and wherein the second group 163_2 of hops is calculated from the data of the first class or a channel-encoded version of the data of the first class. In other words, FIG. 19*b* shows a combination of a fixed and a variable hopping pattern.

In embodiments, it is also possible to transmit a part 163_1 of the actual sub-packets (they contain a pilot sequence and data) with a fixed hopping pattern.

The point in time of the transfer following the previously transmitted information with the fixed hopping pattern is defined and known to the receiver. It would also be possible to send the data of the variable hopping pattern before or between the fixed hopping pattern. Thus, the reference used for the detection would be at the end or in the middle of the telegram.

The length, data rate, modulation method, bandwidth and further parameters of the emission with the fixed hopping pattern may deviate from the emission with the information in the hopping pattern.

In embodiments, on the data transmitter-side, sub-packets may be transmitted with a fixed hopping pattern before the emission of the sub-packets in which the position in time and/or frequency depends on (a part) of the information to be transferred.

In embodiments, the receiver may determine, by means of the sub-packets with the fixed hopping pattern, whether and when a transfer has taken place. If a transfer has been detected, the receiver determines on the basis of this detection the time and/or frequency intervals between the sub-packets in order to be able to extract therefrom the transferred information.

8. Entire Information in Each Sub-Packet

In embodiments, the data-transmitter 100 may be configured to divide the data of the first class onto the first plurality of sub-data packets 162 such that, in a faultless transfer, each sub-data packet 162 for itself may be decoded on the receiver side in order to obtain the data of the first class, and such that, in a faulty transfer, a higher coding gain is achieved through a combination of at least two of the sub-data packets 162.

In embodiments, the data receiver 110 may be configured to receive at least a first sub-data packet of the first plurality of sub-data packets 162, and to decode the first sub-data packet in order to obtain the data of the first class, and, if decoding the data of the first class using the first sub-data packet has not been successful, to combine, for achieving a higher coding gain, the first sub-data packet with at least one second sub-data packet of the plurality of sub-data packets 162 and to decode the same in order to obtain the data of the first class.

Figure 20:
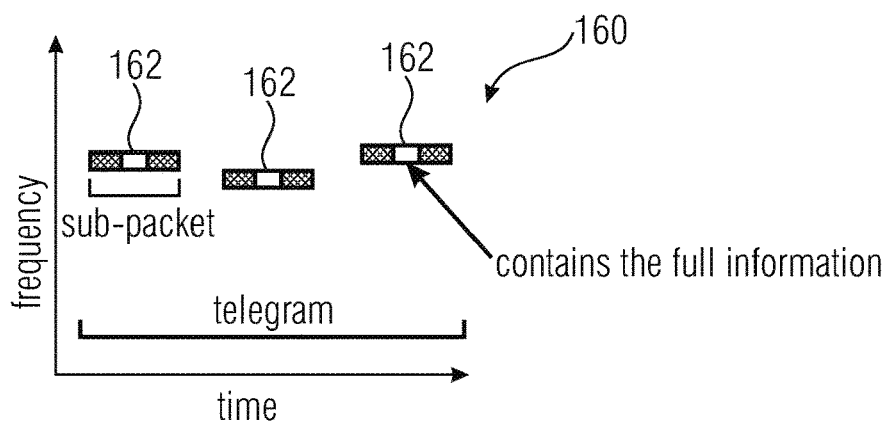
FIG. 20 shows in a diagram an exemplary occupancy of the transfer channel in the transfer of the first plurality of sub-data packets distributed in time and frequency according to the first hopping pattern, wherein, in a faultless transfer, each sub-data packet for itself may be decoded at the receiver side.

FIG. 20 shows in a diagram an exemplary occupancy of the transfer channel in the transfer of the first plurality of sub-data packets 162 according to the first hopping pattern 162, wherein, in a faultless transfer, each sub-data packet 162 is for itself may be decoded at the receiver side. In other words, FIG. 20 shows a transfer with the entire information on each sub-packet.

In embodiments, instead of dividing the entire information onto several sub-packets, it is also possible to transfer all information in each sub-packet in order to reduce the latency. Thus, with an interference-free channel and sufficient SNR (SNR=signal-to-noise), it is possible to decode the information already after receiving one sub-packet.

The emissions of the following sub-packets may either be repetitions or may be encoded together with the sub-packets such that each sub-packet carries all information. This means that each sub-packet at least has a code rate of one. For example, a code of the rate ⅓ is used if three sub-packets are sent.

Optionally, it is also possible to further increase the code rate, e.g., a code of the rate ¼ could be used with three sub-packets. In this case, each sub-packet has the code rate ¾, which has the advantage that the next sub-packet does not always have to be waited for in case of "small" interferences.

In embodiments, on the data transmitter-side, each sub-packet may contain the full information of the telegram.

In embodiments, the receiver may already try to decode the message after receiving the first sub-packet.

9. Special Interleaving for Decoding as Early as Possible

In embodiments, the data transmitter 100 may be configured to channel-encode the data of the first class and transmit the same using the first hopping pattern 160, wherein the data transmitter is configured to distribute the channel-encoded data of the first class onto the first plurality of sub-data packets 162 such that, in a faultless transfer, only a first group 163_1 of sub-data packets 162 is needed to successfully decode the data of the first class, and such that, in a faulty transfer, a higher coding gain is achieved through a combination of the first group 163_1 of sub-data packets 162 and a second group 163_2 of sub-data packets 162 (and optionally a third group 163_3 of sub-data packets 162), wherein the first group 163_1 of sub-data packets 162 is transmitted temporally before the second group 163_2 of sub-data packets 162 (and the third group 163_3 of sub-data packets 162).

In embodiments, the data receiver may be configured to decode a first part of the channel-encoded data received with the first group 163_1 of sub-data packets 162 in order to obtain the data of the first class, and, if decoding the data of the first class has not been successfully, to combine, for achieving a higher coding gain, at least a second part of the channel-encoded data received with at least a second group 162_2 of sub-data packets 162 with the first part of the channel-encoded data and to decode the same in order to obtain the data of the first class.

Figure 21:
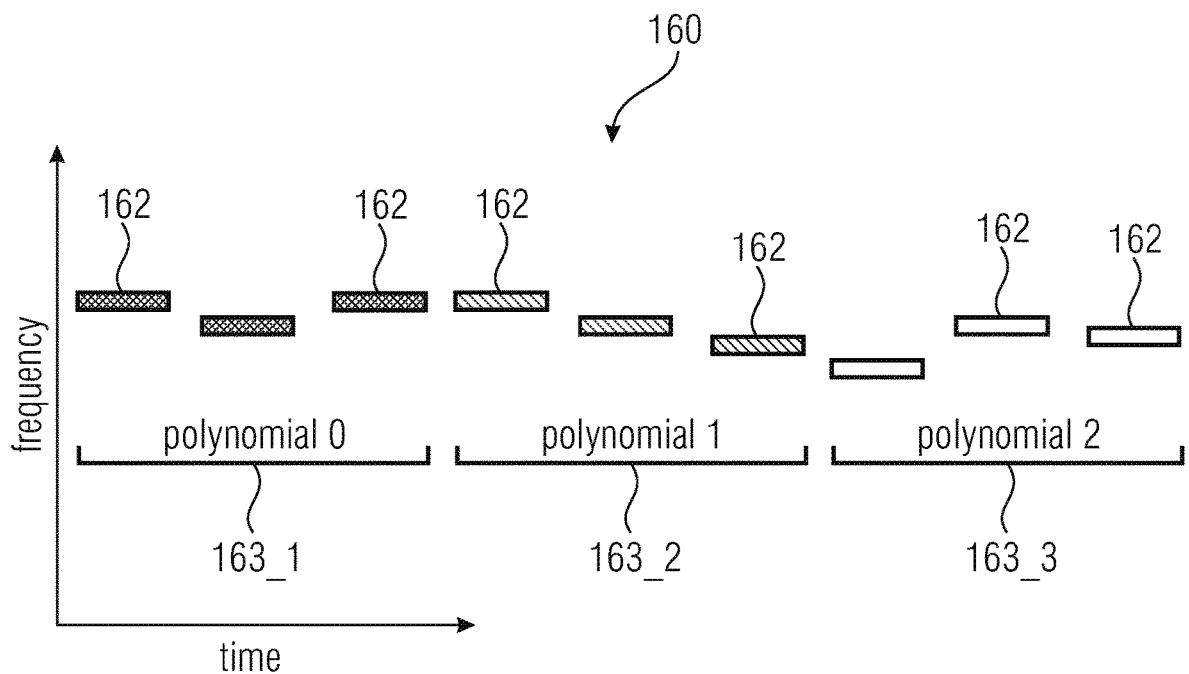
FIG. 21 shows in a diagram an exemplary occupancy of the transfer channel in the transfer of the first plurality of sub-data packets distributed in time and frequency according to the first hopping pattern, wherein the channel-encoded data of the first class is distributed onto the plurality of sub-data packets such that, in a faultless transfer, each group of sub-data packets may be decoded taken for itself in order to obtain the data of the first class.

FIG. 21 shows in a diagram an exemplary occupancy of the transfer channel in the transfer of the first plurality of sub-data packets 162 distributed in time and frequency according to the first hopping pattern 160, wherein the channel-encoded data of the first class is distributed onto the first plurality of sub-data packets 162 such that, in a faultless transfer, each group 163_1 to 163_3 of sub-data packets 162 is decoded taken for itself in order to obtain the data of the first class. In other words, FIG. 21 shows a special division of the channel-encoded data onto the sub-packets in telegram splitting in order to enable decoding as early as possible.

Thus, instead of (or in combination with) the reduction of the pauses of section 1 or the telegram repetition of section 3, a special interleaver structure may also be selected to reduce the latency time in the transfer. It is the object to perform the division of the data as intelligently as possible so that a first try of decoding the data may take place at the earliest possible point in time.

Through this, the information does not have to be transferred multiple times and, in contrast to the known transfer using telegram splitting, there is no difference in the performance of the system (when considering the total transfer).

In the following, this object is described in more detail using the example of a convolutional code with the code rate ⅓, however, it analogously also applies to other channel codes.

In a convolutional code of the code rate ⅓ (without puncturing), three polynomials are used in the encoding. The output of these three polynomials is distributed after the encoding onto the sub-packets as follows: The bits of the first polynomial are mapped onto the first sub-packets (first group 163_1 of sub-data packets), whereas the bits of the second polynomial are mapped onto the center sub-packets (second group 163_2 of sub-data packets), whereas the bits of the third polynomial are mapped onto the last sub-packets (third group 163_3 of sub-data packets).

Through this special division, it is already possible for the receiver to start a decoding attempt after receiving ⅓ of the sub-packets, as per the example. If this attempt fails, it may receive further data and start new decoding attempts accordingly.

In embodiments, on the data transmitter-side, the interleaver may be designed such that the minimally needed information for a decoding attempt may be introduced as early as possible into the packet and be transferred.

In embodiments, the receiver may already try to decode the message after receiving all the data of polynomial 0. If this does not work, further information is received. If the receiver has an estimation of the reception parameters, it may alternatively calculate the point in time starting from which decoding seems reasonable.

9.1. Combination of the Polynomials

For example, in the embodiment according to section 9, if the first sub-packet of polynomial 0 and the first sub-packet of polynomial 1 are interfered with, early decoding of the telegram after receiving polynomial 1 is usually not possible, polynomial 2 has to be received as well. In order to improve the latency, the $2^{nd}$ and third polynomial in the example of section 9 may be interleaved. Such a structure can be seen in FIG. 22.

Figure 22:
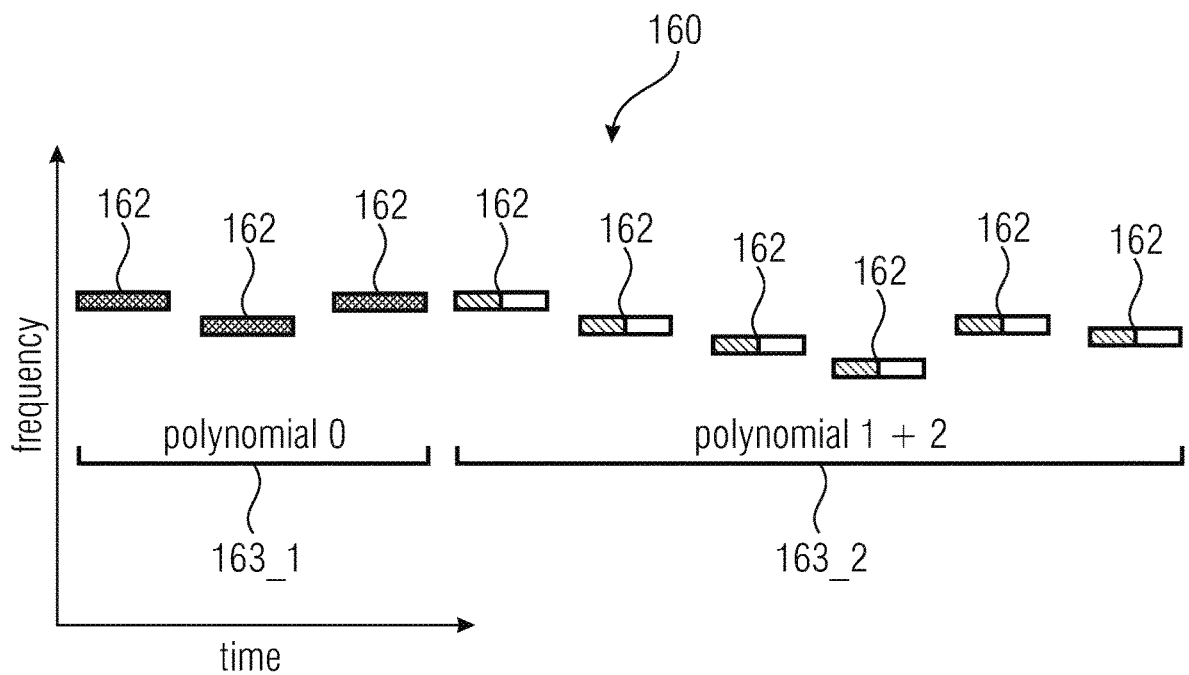
FIG. 22 shows in a diagram an exemplary occupancy of the transfer channel in the transfer of the first plurality of sub-data packets distributed in time and frequency according to the first hopping pattern, wherein the channel-encoded data of the first class is distributed onto the first plurality of sub-data packets such that a first group of sub-data packets comprises channel-encoded data according to a first encoding polynomial (polynomial 0), and such that a second group of sub-data packets comprises channel-encoded data according to multiple encoding polynomials (polynomial 1 and polynomial 2)

In detail, FIG. 22 shows in a diagram an exemplary occupancy of the transfer channel in the transfer of the first plurality of sub-data packets 162 distributed in time and frequency according to the first hopping pattern 160, wherein the channel-encoded data of the first class distributed onto the first plurality of sub-data packets 162 such that a first group 163_1 of sub-data packets 162 comprises channel-encoded data according to a first encoding polynomial (polynomial 0), and such that a second group 163_2 of sub-data packets 162 comprises channel-encoded data according to multiple encoding polynomials (polynomial 1 and polynomial 2). In other words, FIG. 22 shows a special division of the channel-encoded data onto the sub-packets in telegram splitting in order to enable decoding as early as possible, wherein the first polynomial is initially used and the two further polynomials follow in an interleaved manner.

Due to the fact that the polynomial 0 is still fully introduced into the first sub-packets, the minimal latency is still given, however, in the case of interferences such as in the introducing example, it may be sufficient to only receive half (or even fewer) of the sub-packets of the two remaining polynomials.

In embodiments, on the data transmitter-side, the interleaver may be designed such that the minimally needed information for a decoding attempt is introduced into the packet as early as possible, the remaining being interleaved.

In embodiments, the receiver may already try to decode the message after receiving all data of the polynomial 0. If this does not work, further information is received.

9.2. Decision on Decoding Attempt with the Help of Mutual Information

In the two previous embodiments according to sections 9 and 9.1, the encoding attempt was performed regardless of the channel characteristics. This means that, even with poor channel characteristics, a decoding attempt is started after receiving polynomial 0, which is usually unsuccessful.

In embodiments, the data receiver 110 may be configured to determine, based on an estimation, mutual information as to whether the first group 163_1 of sub-data packets 162 is sufficient to successfully decode the data of the first class, or whether a combination of the first group 163_1 of the sub-data packets and the second group 163_2 of sub-data packets 162 is needed to successfully decode the data of the first class, wherein the data receiver may be configured to decode the first group 163_1 of sub-data packets 162 in order to obtain data of the first class, if the estimation of the mutual information indicated that the first group 163_1 of sub-data packets 162 is sufficient to successfully decode the data of the first class, and wherein the data receiver 110 may be configured to combine the first group 163_1 of sub-data packets 162 and the second group 163_2 of sub-data packets 162 and to decode the same if the estimation of the mutual information indicated that a combination of the first group 163_1 of sub-data packets 162 and the second group 163_2 of sub-data packets 162 is needed to successfully decode the data of the first class.

In embodiments, the data receiver 110, provided that it comprises methods for estimating the mutual information of the LLRs (e.g. from the SNR), may calculate the point in time of a possible correct decoding.

Thus, blindly performing decoding attempts until the data has been correctly decoded is no longer needed and the computing power in the receiver may therefore be reduced.

In embodiments, the receiver may calculate with the help of the mutual information the point in time at which decoding the telegram seems reasonable.

10. Short Message with Low Latency and Subsequent Details

In embodiments, the data transmitter 100 may be configured to divide the data of the first class onto the first plurality of sub-data packets 162 such that a first group 163_1 of sub-data packets 162 comprises core information of the data of the first class and a second group 163_2 of sub-data packets 162 comprises extension information of the data of the first class, wherein the first group 163_1 of sub-data packets 162 is transmitted temporally before the second group 163_2 of sub-data packets 162.

In embodiments, the data receiver 110 may be configured to initially receive the first group 163_1 of sub-data packets 162 and to then receive the second group 163_2 of sub-data packets 162 in order to obtain the core information before the extension information.

Figure 23:
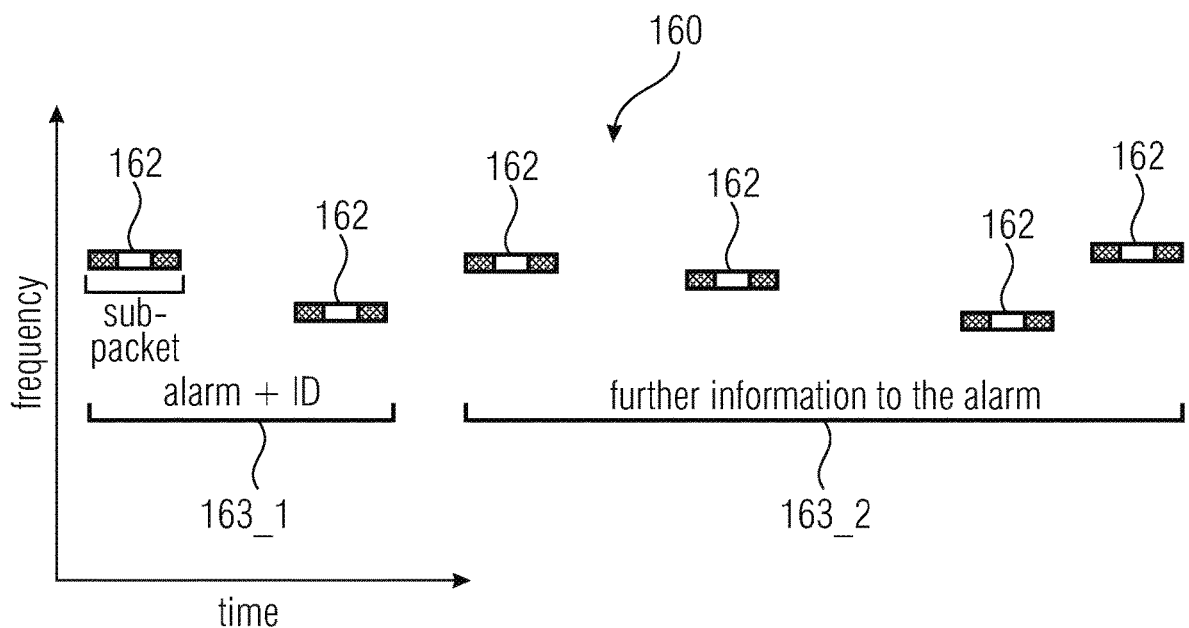
FIG. 23 shows in a diagram an exemplary occupancy of the transfer channel in the transfer of the first plurality of sub-data packets distributed in time and frequency according to the first hopping pattern, wherein a first group of sub-data packets comprises core information and a second group of sub-data packets comprises extension information, wherein the first group of sub-data packets is transferred temporally before the second group of sub-data packets.

FIG. 23 shows in a diagram an exemplary occupancy of a transfer channel in the transfer of the first plurality of sub-data packets 162 distributed in time and frequency according to the first hopping pattern 160, wherein a first group 163_1 of sub-data packets 162 comprises core information and a second group 163_2 of sub-data packets 162 comprises extension information, wherein the first group 163_1 of sub-data packets 162 is transferred temporally before the second group 163_2 of sub-data packets 162. In other words, FIG. 23 shows that an early alarm is possible since only a part of the information is initially needed.

In embodiments, many applications initially only need the information that there is an event and the information as to which device has transmitted the event. Further information about the event (e.g. exceeded temperature in a factory or cause of a triggered alarm) will only be needed later on. For example, personnel may in many cases start to move to the location of the event without knowing the exact cause. The exact cause may then be provided during the trip.

This results in the possibility of sending only the most important information about the event (event+ID) in advance with a short delay. Due to the reduced number of data to be transferred, comparatively few sub-packets are needed, as a result of which the pauses between the sub-packets may be in the region of the conventional durations. This achieves approximately the same interference robustness (at a low latency) for the transfer with high priority as for a normal telegram with more information. Through this, usually no further telegram repetition is needed in order to achieve the desired interference robustness.

In embodiments, on the data transmitter-side, the telegram may be structured such that only the information needed for reporting an event is introduced into the front part of the message. Additional information about the event follows in the rear part.

In embodiments, on the data receiver-side, the event is already forwarded after partially decoding the event and its needed information, and the latency may therefore be reduced. If the full telegram has been received, the further data is also made available.

10.1. Allocating Hopping Patterns

In embodiments, the data transmitter 100 may be configured to calculate at least a first group of hops of the first hopping pattern 162 using address information of the data transmitter 100 or information derived therefrom so that the first hopping pattern 162 itself identifies the data transmitter. A second group 163_2 of hops of the hopping pattern 162 may be specified.

In embodiments, the data transmitter 100 may further be configured to transmit encoded or encrypted information about the first hopping pattern to a data receiver 110 in advance.

In embodiments, the data receiver 110 may be configured to identify the data transmitter based on the first hopping pattern 160, e.g. via previously received encoded or encrypted information about the first hopping pattern.

Figure 24:
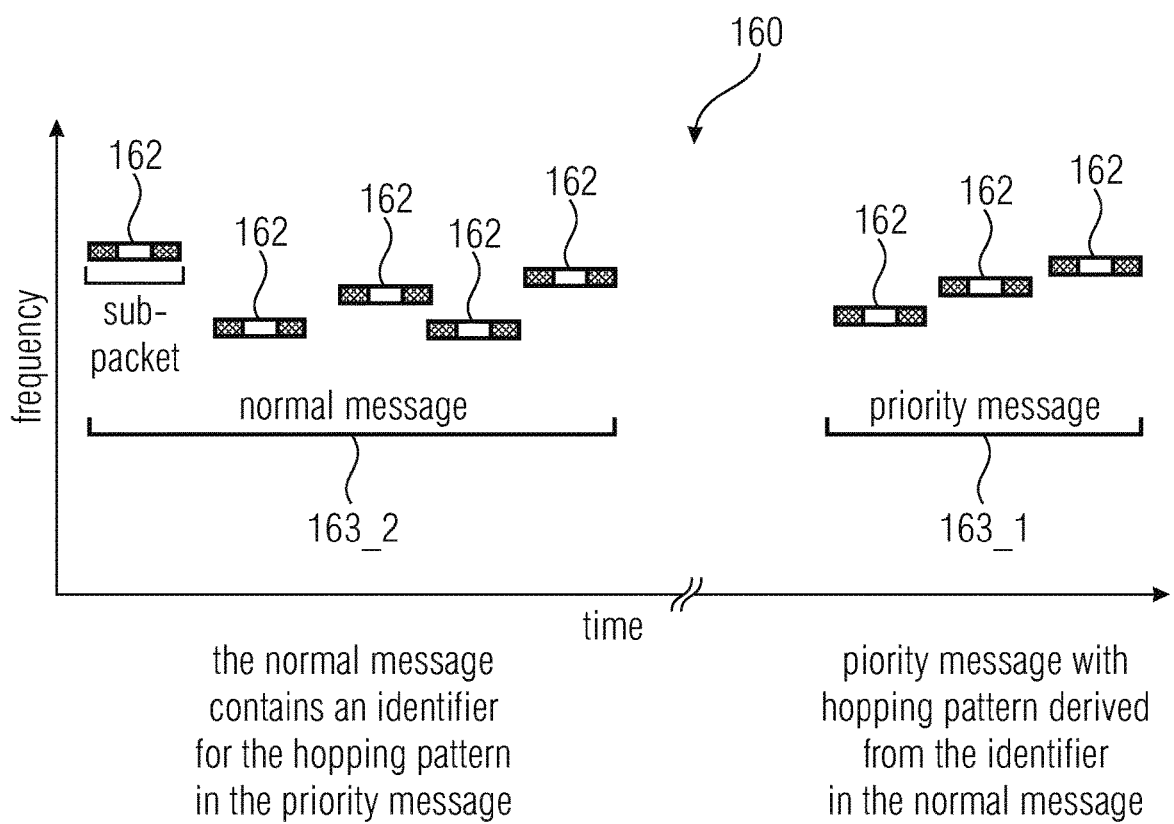
FIG. 24 shows in a diagram an exemplary occupancy of the transfer channel in the transfer of the first plurality of sub-data packets distributed in time and frequency according to the first hopping pattern, wherein a first group of hops of the hopping pattern identifies the data transmitter.

FIG. 24 shows in a diagram an exemplary occupancy of the transfer channel in the transfer of the first plurality of sub-data packets 162 distributed in time and frequency according to the first hopping pattern 160, wherein a first group 163_1 of hops of the hopping pattern 162 identifies the data transmitter.

Instead of fully encoding the information into the sub-packets, a part of the message with a high priority may be introduced into the hopping pattern in embodiments. The use of the ID of the sensor node is the most reasonable approach here, since it is constant for several emissions and the base station therefore only has to look for this pattern.

Thus, for the different sensor nodes, there are different hopping patterns that have to be known to the base station when emitting the message with high priority. Due to this fact, when emitting a message with high priority, the ID of the sensor node is encoded into the hopping pattern and does not have to be explicitly transferred.

In order to avoid attacks onto the system, it is reasonable if the hopping patterns between the node and the base station are secret. Since the hopping pattern is unknown, it is therefore not possible for strangers to trigger a false alarm.

In order to disclose the hopping pattern to the base station, a so-called identifier for the hopping pattern may be transmitted in a normal message (with encryption) in advance. The hopping pattern used may be calculated from this identifier.

In order to maintain the security, it is additionally possible to adapt the hopping pattern from time to time in order to avoid replay attacks.

In order to obtain the low latency in the transfer of the message with high priority, the hopping pattern for reporting the message with high priority has fewer hops than a normal telegram.

In embodiments, the sensor node may communicate a hopping pattern to the base station by means of an identifier which only the sensor node uses as signaling for messages with high priority. Thus, no explicit transfer of the ID has to be performed.

In embodiments, in addition to the normal hopping patterns, the receiver may perform a detection of the sensor nodes hopping patterns for messages with high priority that it knows. If such a pattern is detected, the actual ID may be linked to the hopping pattern.

10.2. Allocating Short IDs

In embodiments, the data transmitter 100 may be configured to obtain, from a base station of the communication network, short address information that is shorter than address information unambiguously identifying the data transmitter 100 within a communication network and to use the same when emitting with the first hopping pattern. For example, the data transmitter 100 may be configured to calculate at least a group of hops of the first hopping pattern 162 from the short address information so that the first hopping pattern 162 itself identifies the data transmitter.

In embodiments, the data receiver 110 may be configured to identify the data transmitter 100 based on the short address information. For example, the data receiver 110 may be configured to identify the data transmitter 100 based on the first hopping pattern which may be at least partially calculated from the short address information.

In embodiments, the data receiver (e.g. a base station) may be configured to assign to the data transmitter 100 the short address information that is shorter than address information unambiguously identifying the data transmitter within a communication network.

In a sensor network, there are typically up to several million sensor nodes which have to be served by several base stations. Due to this high number of devices, a certain length is needed for unambiguously assigning the devices by means of an ID (e.g., IP-v6).

However, these comparatively long IDs are difficult to combine with the concept of section 10.

However, since the number of sensor nodes per base station is lower and not all of the devices have to transmit messages with high priority, a short ID may be provided to these devices by the base station.

This short ID is then used in the transfer of the message with high priority. In the base station, the actual ID is re-mapped from the short ID.

The short IDs may repeat in a sensor network; however, it is important that all of the sensor nodes within a base station have an unambiguous short ID.

In embodiments, on the data transmitter-side, short IDs may be used for the transfer of messages with high priority, e.g., wherein a base station allocates the short IDs to connected devices.

In embodiments, the receiver may re-map the short IDs onto the original IDs.

10.3. Allocating Short IDs to Groups

In embodiments, the short address information may be assigned to a group of data transmitters 100, wherein the group of data transmitters is arranged in a spatially related area.

For example, the data receiver 110 may be configured to assign the short address information to the group of data transmitters 110, wherein the group of data transmitters is arranged in a spatially related area.

It is often the case that several event generators are installed close together (e.g. in a building). In this case, in order to plan counter-measures, it is usually not immediately necessary to know the exact event generator. It often sufficient to know the building in order to send personnel to the crisis location.

For this reason, it is also possible to allocate so-called group short IDs. That is, multiple transmitters within a base station are provided with the same short ID. This initially makes an exact assignment of a short ID to an original ID in the base station impossible.

For example, the full ID could be introduced into the rear part of the message or could be transmitted as a separate message.

In embodiments, on the data transmitter-side, short IDs may be used for the transfer of messages with high priority, wherein the base station may allocate the short IDs to the connected sensor nodes, wherein the IDs may also be assigned multiple times according to affiliation of the sensor nodes.

In embodiments, upon receiving a short ID, the receiver may initially only forward the affiliation of the short ID. After receiving the full ID, the same may also be output.

10.4. Abbreviations for Messages with High Priority

In embodiments, the data of the first class may be short information derived from a sensor value and being shorter than the sensor value.

In embodiments, the data receiver 110 may be configured to associate, upon receiving the data of the first class comprising short information, the short information with a known sensor value.

In a message with high priority, the information may mostly be limited to a few possible events. For example, in alarms, there is only a very low number of possibilities for an alarm.

For example, it is therefore not necessary to transfer the entire sensor value of the smoke detector for an alarm, it is sufficient to transmit the alarm notification that a smoke detector has been activated.

In general, not every base station will have to process all types of different messages with high priority (events), since not all types of sensor nodes will communicate with the individual base station.

Here, it is useful for the base station to know the different types of messages with high priority that is has to receive.

From this set of message types, the base station may assign to each event an abbreviation (similar to a short ID), however, not for the ID but for the message content, and to transmit the same to the corresponding sensor nodes.

The combination of the short messages and the corresponding message types may vary between the base stations, i.e., a short message may have different meanings in different base stations.

This allows the amount of data to be transferred in events with high priority to be greatly reduced and to therefore reduce the number of sub-packets to be transferred, resulting in a lower latency of the transfer.

If further information is needed in addition to the message type at a later point in time, it could be attached according to section 10 or be sent in an additional telegram.

In embodiments, a class of different message types with high priority may be defined for each base station. Short messages that are communicated to the corresponding sensor nodes may be assigned to the different events within this class.

In embodiments, upon receiving a short message, the receiver may determine the type of the short message with the help of the defined class and forward the same.

10.5. Abbreviation of Frequently Transmitted Message Parts

In embodiments, the data of the first class may be short information derived from a sensor value and being shorter than the sensor value, wherein the data transmitter may be configured to transmit in advance to a data receiver the short information and a sensor value associated to the short information or a group of sensor values associated to the short information.

In embodiments, the data receiver 110 may be configured to receive in advance from the data transmitter the short information and a sensor value associated to the short information or a group of sensor values associated to the short information, wherein the data receiver 110 may be configured to, upon receiving the data of the first class comprising short information, to associate the short information with a known sensor value or a group of sensor values.

In other words, similar to section 9.3, abbreviations for recurring or frequently transmitted message parts may also be used in messages without high priority or in the subsequent details of a message with high priority.

To this end, the base station has to be provided in advance with information as to which message parts with which content occur more frequently. For example, these may be sensor values from a sensor, where only the lower byte of a 4-byte ADC value is modulated after digitization of the data. Thus, in this example, the recurring message would be the sensor value's 3 MSBs (most significant bytes) that would be zero.

If the base station has no prior knowledge about recurring message parts of the sensor nodes connected to it, measurement and analysis of the reception data may be performed in order to detect recurring parts.

If a recurring message part has been detected, it may either be transferred onto a shorter message by means of a table or arithmetic encoding or Huffman coding or another method may be used to reduce the number of messages.

In embodiments, a class of different recurring message parts may be defined for each base station (or even globally). The different events within this class are assigned with short messages (by means of a table or encoding) which are communicated to the corresponding sensor nodes.

In embodiments, upon receiving a short message, the receiver may transform the short message into the actual message with the help of the defined class and forward the same.

11. Special hopping patterns or pilot sequences

11.1. Special hopping patterns for priority messages

In embodiments, the first hopping pattern may be assigned to the data transmitter by a data receiver (e.g. a base station) 110 according to a frequency of use and/or priority.

Due to the very high number of sensor nodes (several thousand sensor nodes) in a sensor network, interferences mainly/frequently lead to self-interferences between the sensor nodes.

In telegram splitting, self-interference is a problem if two transmitters begin to transmit with the same hopping pattern within the duration of a sub-packet, since this results in a total overlap of the sub-packets.

If a message is to be transmitted with a low delay and high priority, it is best to use a different hopping pattern for this than for the normal transfers.

However, since normally only a certain number of patterns may be detected at the receiver, it is not possible to provide each sensor node with its own hopping pattern for the alarm. Therefore, several nodes have to share the special hopping patterns.

Usually, the base station knows which nodes communicate with it and how often these nodes transmit a message with high priority. Thus, it is useful if the base station assigns the available hopping patterns for messages with high priority to the corresponding sensor nodes depending on the priorities and the frequency of use.

In embodiments, the base station may assign to the sensor nodes special hopping patterns that may be used for a message with high priority.

11.2. Stair Hopping Pattern for Priority Messages

Through the definition of further hopping patterns in section 11.1, the receiver has to perform a detection for these hopping patterns as well. If the computing power of the receiver is configured such that the normal hopping patterns almost need the full computing power of the receiver, hopping patterns for messages with high priority cannot be added, unless all hopping patterns of the normal modes are no longer supported. However, this results in a performance collapse for the normal telegrams.

In order to solve this problem, hopping patterns that may be detected with a very low calculation effort may be used for the messages with high priority.

Figure 25:
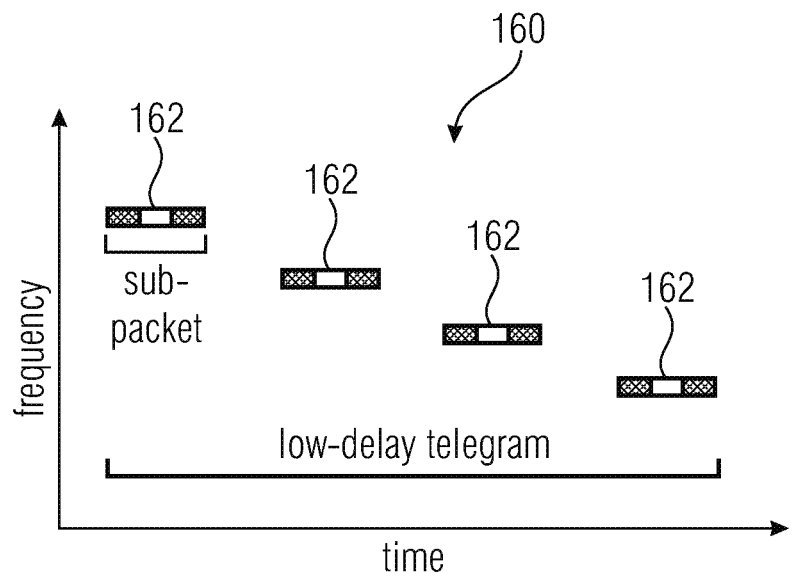
FIG. 25 shows in a diagram an exemplary occupancy of the transfer channel in the transfer of the first plurality of sub-data packets distributed in time and frequency according to the first hopping pattern such that sub-data packets transmitted according to the first hopping pattern comprise the same time interval and frequency interval with respect to each other.

In embodiments, the first hopping pattern 160 may be generated such that sub-data packets 162 transmitted according to the first hopping pattern 160 comprise the same time interval and frequency interval with respect to each other, as is shown in FIG. 25.

In detail, FIG. 25 shows in a diagram an exemplary occupancy of the transfer channel in the transfer of the first plurality of sub-data packets 162 distributed in time and frequency according to the first hopping pattern 160 such that sub-data packets 162 transmitted according to the first hopping pattern 160 comprise the same time interval and frequency interval with respect to each other. In other words, FIG. 25 shows an emission of a telegram with a stair hopping pattern.

As can be seen in FIG. 25, a so-called stair hopping pattern which may be detected with a very low calculation effort is useful. In a stair hopping pattern, the frequencies of the successive sub-packets are selected such that the difference between two sub-packets is the same. The pauses between the sub-packets may optionally (in order to further reduce the calculation effort) be equidistant (i.e. all pauses are of equal length).

At the receiver, such a telegram (just like with a normal telegram) arrives with a frequency offset caused by quartz tolerances. When detecting a telegram with a normal hopping pattern, a detection has to be performed across all possible frequency deviations since the frequency intervals between the sub-packets are not the same.

Figure 26:
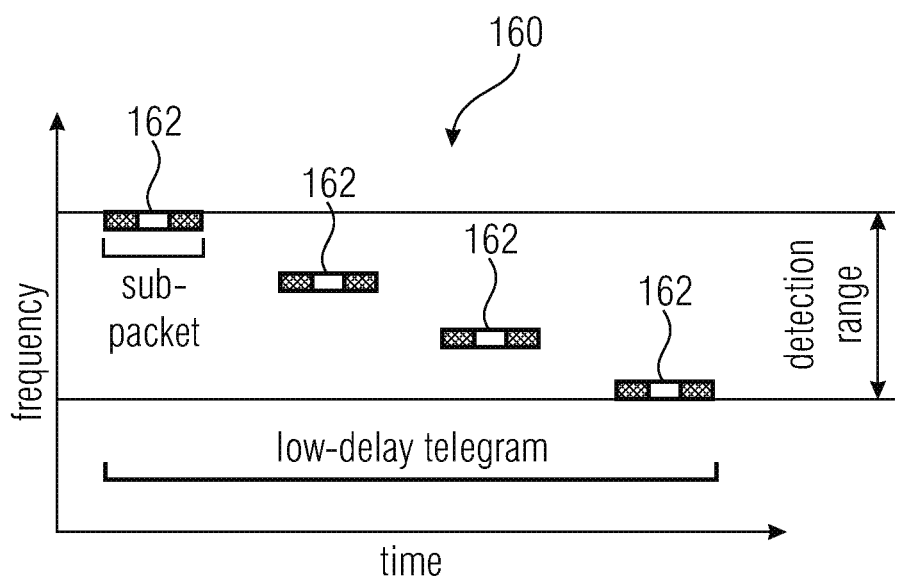
FIG. 26 shows in a diagram an exemplary occupancy of the transfer channel in the transfer of the first plurality of sub-data packets distributed in time and frequency according to the first hopping pattern.

In the case of the stair hopping pattern, it is sufficient to search through a smaller range since the full telegram has been shifted through the frequency shift, and the relative frequency intervals between the sub-packets are still constant. FIG. 26 shows a telegram at the receiver, said telegram having been received without a frequency offset, it is entirely in the detection range. In addition, FIG. 27 further shows two telegrams which arrive at the receiver with a positive and negative frequency offset, respectively. The telegrams are now only partially in the detection range.

For the detection, a correlation is initially performed across the individual sub-packets (or a type of the correlation) on all possible frequencies within the detection range. The results of this partial correlation are then added according to the hopping pattern of the telegram.

This is exactly where the advantage of the stair hopping pattern becomes apparent, since the frequency intervals between the sub-packets are equidistant. In case of a frequency offset, a detection of the telegram is carried out on the remaining sub-packets within the detection range.

However, this results in the fact that the receiver no longer necessarily detects the start of the telegram, but any location in the telegram that depends on the frequency offset.

Thus, when detecting a telegram, a further determination of the start time of the telegram has to be performed subsequently.

A further advantage of selecting the hopping pattern as a stair function is that each frequency may only be occupied once and that the bandwidth of the signal is therefore maximized. This results in a better interference robustness against external interferences from other systems.

However, this approach also has a disadvantage, i.e., the reduced capacity of the system, since the self-interference robustness decreases. However, this is not a problem if normal messages and low-delay messages with high priority use different hopping patterns.

In embodiments, (on the data transmitter-side) the hopping pattern 162 may be selected such that all frequency intervals between two sub-packets are equidistant and such that the pauses are optionally also of the same length.

In embodiments, (on the data receiver-side) the detection range for the stair hopping patterns may be smaller than for normal hopping patterns. A further analysis of the exact starting time is performed after a detection of a stair hopping pattern.

11.3. Special Pilot Sequences for Priority Messages

So-called short IDs, with which it is possible to transmit a message with high priority with a low latency by reducing the amount of data, were defined in section 10.2.

A further approach to reduce the amount of data is to encode the short ID or a part of the full ID or any part of the message into the pilot sequence. If only a few possibilities (such as for the different types of messages with high priority) are stored, it is possible to perform in the receiver a search of the sequences and to therefore extract the information transferred in the pilot sequence by means of a hypothesis test.

In embodiments, the data transmitter 100 may be configured to calculate at least a part of a synchronization sequence for the synchronization of the first plurality of sub-data packets 162 in a data receiver 110 from at least a part of the data of the first class, the first class, address information of the data transmitter 100 or short address information of the data transmitter 100.

For example, the short ID may have a length of 2 bits, which may signalize four different priority types. In order to modulate these four different types into the pilot sequence, four different sequences may have to be present.

It is possible to develop four sequences that are as orthogonal as possible and that may be detected and recognized by the receiver. However, this involves the parallel detection of the four pilot sequences.

If the pilot sequence is split into several parts (e.g. at least four) and the addition is performed incoherently between the parts of the pilot sequence (cf. WO 2017/167366), a phase offset on the symbols may be used in order to signalize the information in the pilot sequence, instead of using several sequences that are as orthogonal as possible. In this case, the detection of the four sequences would be carried out together, however, an analysis of the phase information of the pilot sequence parts (or phase information between the pilot sequence parts) has to be performed in the decoder.

Similar to section 7.1, it would also be possible to not modify all of the synchronization sequences, and to use the remaining part of the synchronization sequence (which is still constant) for the synchronization.

In embodiments, on the data transmitter-side, the pilot sequence may depend on a message type or a part of the data of a message with high priority.

In embodiments, the receiver may determine the transmitted pilot sequence by means of a hypothesis test and may use this to extract the type or a part of the data of a message with high priority.

12. Adapting the Data Rate in the Telegram 12.1. Abruptly Adapting the Data Rate In embodiments, the data transmitter 100 may be configured to channel-encode the data of the first class and to transmit the same using the first hopping pattern 160, wherein the data transmitter 100 may be configured to distribute the channel-encoded data of the first class onto the first plurality of sub-data packets 162 such that, in a faultless transfer, only a first group of sub-data packets is needed to successfully decode the data of the first class, and such that, in a faulty transfer, a higher coding gain is achieved through a combination of the first group of sub-data packets and the second group of sub-data packets, wherein the data transmitter 100 may be configured to transmit the first group of sub-data packets with a different data rate than a second group of sub-data packets.

In embodiments, the data receiver 110 may be configured to decode a first part of the channel-encoded data received with the first group of sub-data packets 162 in order to obtain the data of the first class and, if decoding the data of the first class has not been successful, to combine, for achieving a higher coding gain, at least a second part of the channel-encoded data received with at least a second group of sub-data packets 162 with the first part of the channel-encoded data and to decode the same in order to obtain the data of the first class.

In embodiments, instead of adapting the data rate or the modulation method of the full telegram of section 1.4, it is also possible to adapt the data rate during a telegram. That is, a higher data rate is usually selected at the beginning of the message in order to be able to transfer as quickly as possible the minimum needed information for early decoding. After this minimum needed information has been transferred, the data rate may be reduced, thus, all further sub-packets have a longer transfer duration and therefore also a higher latency.

Optionally, prior to the variation of the data rate, a few additional redundancy sub-packets may be attached, which may be used by the receiver in case of interferences.

Thus, a decoding attempt on the sub-packets may also be successful with a higher data rate if few sub-packets are not usable due to interferences.

In contrast to section 1.4, this approach has the advantage that the link-budget of the transfer is increased with an increasing latency with the help of the reduced data rate. Thus, transmitters reaching the receiver with a SNR in the limit range cannot be received with the approach in section 1.4, but can be received when adapting the data rate (however, a high latency has to be accepted).

In some cases, a detection of the transfer with the high data rate may not be possible or fails (e.g. due to interferences or noise). In this case, the detection occurs only on the sub-packets of the emission with the lower data rate. It is therefore useful to select encoding and interleaving such that each of the two parts may be decoded for itself, however, the combination of the two may also be used for decoding.

Optionally, after the variation of the data rate, a few additional redundancy sub-packets may be attached, which may be used by the receiver in the case of interferences.

In embodiments, (on the data transmitter-side) the data rate may change within a telegram. In this case, the change is selected such that early decoding is possible as soon as all or a part of sub-packets have been received with the higher data rate.

In embodiments, the receiver may try to decode the telegram after receiving all or a part of the sub-packets with the higher data rate. If this fails, the further sub-packets are received with the lower data rate.

12.2. Successively Adapting the Data Rate

In embodiments, the data transmitter 100 may be configured to channel-encode the data of the first class and to divide the same onto the first plurality of sub-data packets 162, wherein the data transmitter 100 may be configured to successively increase or decrease a data rate with which the sub-data packets 162 are transmitted.

In embodiments, instead of abruptly adapting the data rate, the data rate may be successively adapted (e.g. linearly increased) within a telegram. That is, the data rate decreases (or increases) with an increasing number of transmitted sub-packets.

Similar to section 2.2, this has the advantage that the receiver 110 may decide, based on reception parameters, as to when decoding seems reasonable. In principle, this is also possible in the previous approach, however, the latency is not optimized as to this scenario.

For example, in the embodiment of section 12.1, if one more sub-packet is needed than the sub-packets emitted with the higher data rate, the latency increases, since the sub-packets now follow with the lower data rate, having a longer transfer duration.

If the data rate is successively increased, in the above-mentioned example, the latency is also increased, however, not as much as with abruptly adapting the data rate.

In embodiments, on the data transmitter-side, the data rate may change within a telegram, wherein there are several different data rates within the telegram. For example, the data rate may be selected to linearly decrease.

In embodiments, the receiver may decide, based on reception parameters (SNR, interferences), how many sub-packets are needed for early decoding, and receives the according number of sub-packets. In this case, the data rate is successively adapted according to the method selected in the transmitter.

13. Successively Adapting the Sub-Packet Lengths

In embodiments, a length of the sub-data packets of the first plurality of sub-data packets 162 may decrease or increase with an increasing number of transmitted sub-data packets.

FIG. 28 shows in a diagram an exemplary occupancy of the transfer channel in the transfer of the first plurality of sub-data packets 162 distributed in time and frequency according to the first hopping pattern 160, wherein a length of the sub-data packets decreases with an increasing number of transmitted sub-data packets.

In other words, similarly to successively varying the data rates (cf. section 12.2), in embodiments, the length of the sub-packets may also be varied via the number of transmitted sub-packets. That is, the length of the sub-packets increases or decreases with the number of transmitted sub-packets.

The majority (or all of the information) of the data to be transferred is already introduced in the first sub-packet (or in the first 2, 3, 4, . . . ). Thus, starting from the $2^{nd}$, or $3^{rd}$ sub-packet, redundancy occurs.

Accordingly, the receiver may start a decoding attempt after the $2^{nd}$ or $3^{rd}$ received sub-packet and may decide, based on the reception parameter (SNR, level of interference), as to when a first decoding attempt seems reasonable.

Through this approach, similar to section 2, the latency depends on the reception parameters. Thus, nodes with better reception parameters have a lower latency than nodes with poor reception parameters.

In embodiments, on the data transmitter-side, the length of the sub-packets may change within a telegram, wherein the length depends on the number of already transmitted sub-packets.

In embodiments, the receiver may start a decoding attempt as soon as all needed information has been received, and otherwise decides, based on reception parameters (SNR, interferences), as to how many sub-packets are needed for early decoding, and accordingly receives this number of sub-packets.

14. Adapting the Transmission Power

Under certain circumstances, the above-described embodiments have the disadvantage that a reduction of the latency may usually only be achieved if the reception parameters (SBR, level of interference) of the telegram are good.

However, typical telegram networks are configured such that there are some sensor nodes that are at the reception limit (poor SNR and/or strong interferences). Reducing the latency is possible for these nodes with the previous concepts, however, not in the same range as for the transmitter with good reception parameters.

In order to solve this problem, the base station may assign to the sensor nodes based on the reception parameters different transmission powers which are either used for all emissions or only apply for telegrams with high priority. Thus, it is also possible for sensor nodes with poor reception parameters to transfer a message with low latency, if needed.

In embodiments, the transmission power of the individual nodes may be specified by the base station and may there be determined based on the reception parameters.

15. Generating Hopping Patterns

In the following, embodiments of a method for generating hopping patterns are described in more detail. In detail, FIG. 29 shows a method for generating hopping patterns for a single (i.e. one time) transfer of data by means of a hopping pattern, whereas FIG. 30 shows a method for generating hopping patterns for a repeated transfer of data by means of two hopping patterns.

Figure 29:
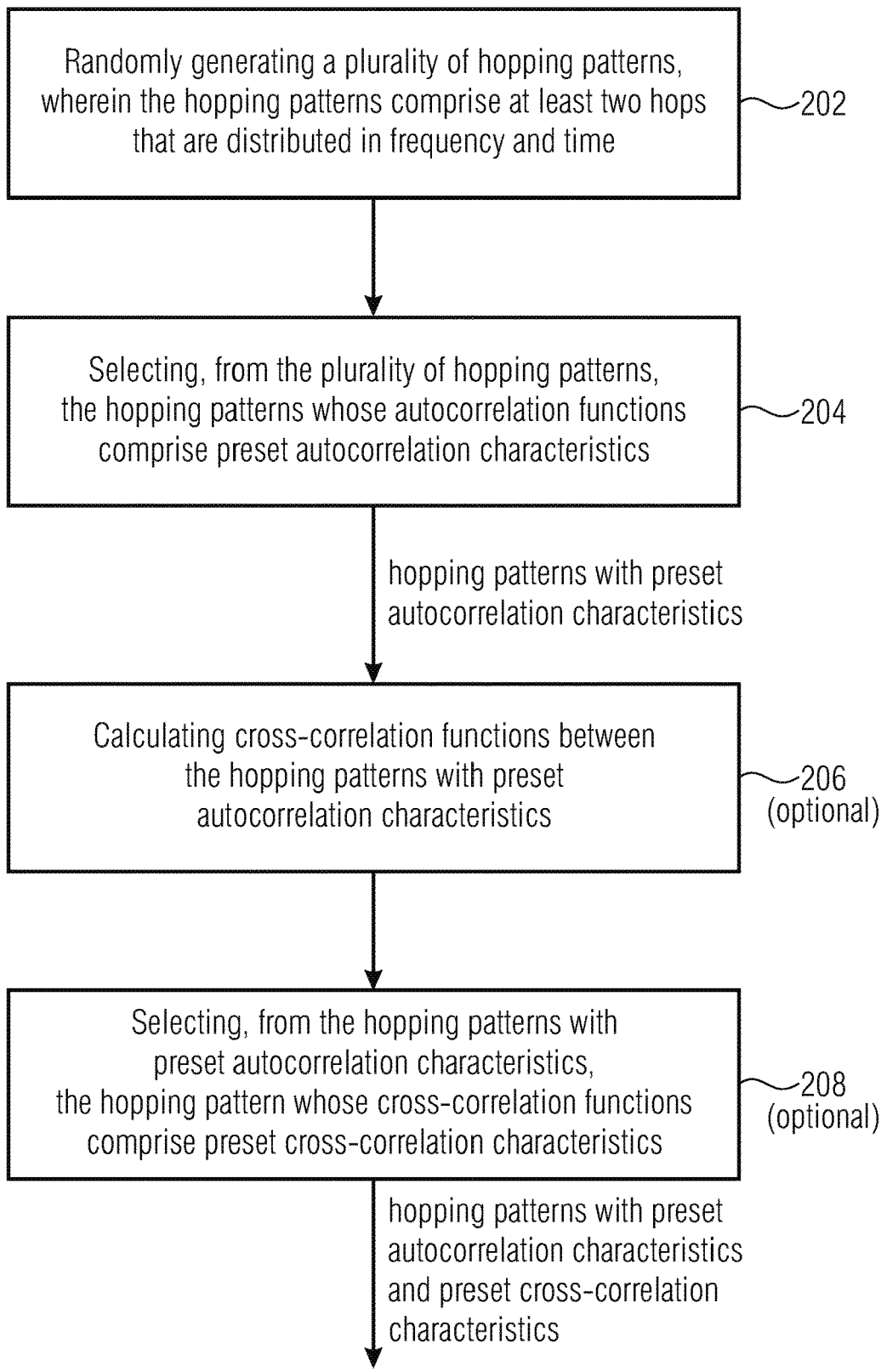
FIG. 29 shows a flow diagram of a method for generating a set of hopping patterns according to an embodiment.
Figure 30:
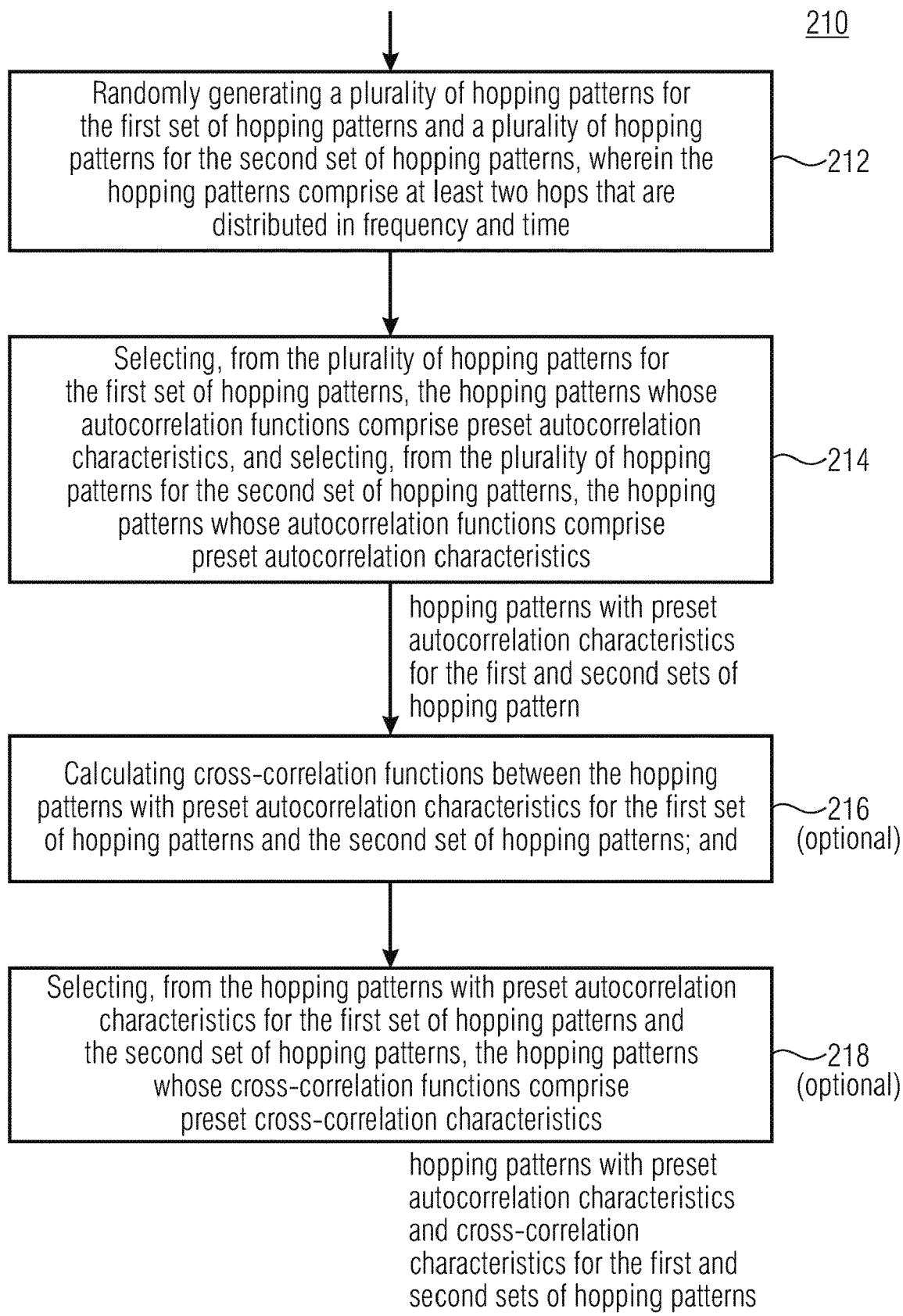
FIG. 30 shows a flow diagram of a method for generating two sets of hopping patterns according to an embodiment.

FIG. 29 shows a flow diagram of a method 200 for generating a set of hopping patterns according to an embodiment. The method 200 includes a step 202 of randomly generating a plurality of hopping patterns, wherein the hopping patterns comprises at least two hops distributed in time and frequency. The method 200 further includes a step 204 of selecting, from the plurality of hopping patterns, the hopping patterns whose autocorrelation functions comprise specific autocorrelation characteristics in order to obtain hopping patterns with specified autocorrelation characteristics.

In embodiments, the hopping patterns whose autocorrelation function side maximums do not exceed a specified minimum amplitude threshold value may fulfil the specified autocorrelation characteristics. For example, the amplitude threshold value may be equal to a number of hops of a cluster of a plurality of clusters into which the hopping pattern is subdivided. For example, a cluster may be a number of hops comprising the same temporal interval and/or frequency interval with respect to each other.

In embodiments, the hopping patterns whose sub-total formed across a specified number of largest amplitude values of the respective autocorrelation function is smaller than a specified threshold value may fulfil a specified autocorrelation characteristic. Here, the threshold value may be selected such that at least two hopping patterns (or a specified number of hopping patterns) fulfil the specified autocorrelation characteristics.

As can be seen in FIG. 29, the method 200 may further comprise a step 206 of calculating cross-correlation functions between the hopping patterns with specified autocorrelation characteristics. Furthermore, the method 200 may comprise a step 208 of selecting, from the hopping patterns having specified autocorrelation characteristics, the hopping patterns whose cross-correlation functions comprise specified cross-correlation characteristics in order to obtain a hopping pattern with specified autocorrelation characteristics and specified cross-correlation characteristics.

In embodiments, the hopping patterns whose sub-totals formed across a specified number of largest amplitude values of the respective cross-correlation function are the smallest may fulfil the specified cross-correlation characteristics.

FIG. 30 shows a flow diagram of a method 210 for generating a first set of hopping patterns and a second set of hopping patterns. The method 210 includes randomly generating 212 a plurality of hopping patterns for the first set of hopping patterns and a plurality of hopping patterns for the second set of hopping patterns, wherein the hopping patterns comprise at least two hops that are distributed in frequency and in time, wherein the hopping patterns for the first set of hopping patterns and the hopping patterns for the second set of hopping patterns are different. In addition, the method 210 includes selecting 214, from the plurality of hopping patterns for the first set of hopping patterns, the hopping patterns whose autocorrelation functions comprise preset autocorrelation characteristics in order to obtain hopping patterns with preset autocorrelation characteristics for the first set of hopping patterns, and selecting, from the plurality of hopping patterns for the second set of hopping patterns, the hopping patterns whose autocorrelation functions comprise preset autocorrelation characteristics in order to obtain hopping patterns with preset autocorrelation characteristics for the second set of hopping patterns.

In embodiments, a time interval of the hops of the hopping patterns for the second set of hopping patterns may be at least as large as a temporal length of one of the hops of the hopping patterns for the first set of hopping patterns.

For example, in order to be able to interleave as many repetitions as possible, the shortest time interval between two sub-data packets (or bursts) may be maximized. This would be (T_Frame−N*T_Burst)/(N−1), i.e. an equidistant temporal distribution of the bursts (within the clusters and between the clusters). Obviously, since this regularity would not be optimal for the design process, a slight jitter may be introduced.

In embodiments, the preset autocorrelation characteristics may be fulfilled by the hopping patterns whose autocorrelation functions secondary maximums do not exceed a preset minimum amplitude threshold value. For example, the amplitude threshold value may be equal to a number of hops of a cluster of a plurality of clusters into which the hopping pattern is divided. For example, a cluster may be a number of hops having the same time and/or frequency interval relative to each other.

In embodiments, the preset autocorrelation characteristics may be fulfilled by the hopping patterns whose subtotal formed across a preset number of largest amplitude values of the respective autocorrelation function is smaller than a preset threshold value. Here, the threshold value may be selected such that at least two hopping patterns (or a preset number of hopping patterns) fulfil the preset autocorrelation characteristics.

As can be seen in FIG. 30, the method 210 may further comprise calculating 216 cross-correlation functions between the hopping patterns with preset autocorrelation characteristics for the first set of hopping patterns and cross-correlation functions between the hopping patterns with preset autocorrelation characteristics for the second set of hopping patterns. Furthermore, the method may comprise selecting 218, from the hopping patterns with preset autocorrelation characteristics for the first set of hopping patterns, the hopping patterns whose cross-correlation functions comprise preset cross-correlation characteristics in order to obtain hopping patterns with preset autocorrelation characteristics and preset cross-correlation characteristics for the first set of hopping patterns, and, from the hopping patterns with preset autocorrelation characteristics for the second set of hopping patterns, the hopping patterns whose cross-correlation functions comprise preset cross-correlation characteristics in order to obtain hopping patterns with preset autocorrelation characteristics and preset cross-correlation characteristics for the second set of hopping patterns.

In embodiments, the preset cross-correlation characteristics may be fulfilled by the hopping patterns whose subtotals formed across a preset number of largest amplitude values of the respective cross-correlation function are the smallest.

15.1 Generating Hopping Patterns for TSMA

For example, hopping patterns generated with the method shown in FIG. 29 or FIG. 30 may be employed in a system for the unidirectional or bidirectional data transmission from many sensor nodes to a base station using the so-called "telegram splitting multiple access (TSMA)" method.

In TSMA, the transmission of a message is subdivided into a multitude of short bursts (=hops, or sub-data packets) 142 between which there are transmission-free time intervals of different lengths each. Here, the bursts 142 may be distributed across time and also across available frequencies according to a real and a pseudo-random principle.

This approach of telegram splitting provides a particularly large robustness against interferences of other sensor nodes, regardless of whether they come from their own or external systems. In particular, the interference robustness in the own sensor nodes is achieved by distributing the various user signal bursts as uniformly as possible across the time domain and also the frequency domain.

This random-like distribution may be achieved by various means, for example, (1) by unavoidable tolerable deviations of the crystal reference oscillator with respect to the frequency, (2) arbitrary granularity in the time domain results through the random asynchronous channel access, and (3) by different burst arrangements of the different sensor nodes to different hopping patterns.

In order to achieve a further increase of the failure probability in the data transfer, time/frequency diversity may be used when transmitting the payload data. The sub-data packets (bursts) may be transmitted at least twice in a temporally offset manner in, e.g., hopping patterns that are as different as possible and, e.g., in frequency bands that are as different as possible. Since only one transmitter in the sensor node is available for the transfer of the signal, certain restrictions with respect to the temporal burst arrangement in the hopping pattern result for the interleaved repetition. The interleaved arrangement of the first and second transmissions in the case of repetitions will be explained in more detail below.

The divers-redundant signals may be combined on the receiver side in all possible ways, e.g. maximal-ratio combining (MRC), equal-gain combining, scanning/switching combining or selection combining. However, when designing such diverse-redundant hopping patterns, the combiner is to detect in as simple a way as possible that a repetition has been transmitted instead of a first transmission.

The design and the optimization of such hopping patterns are described in detail in the following.

Figure 31A:
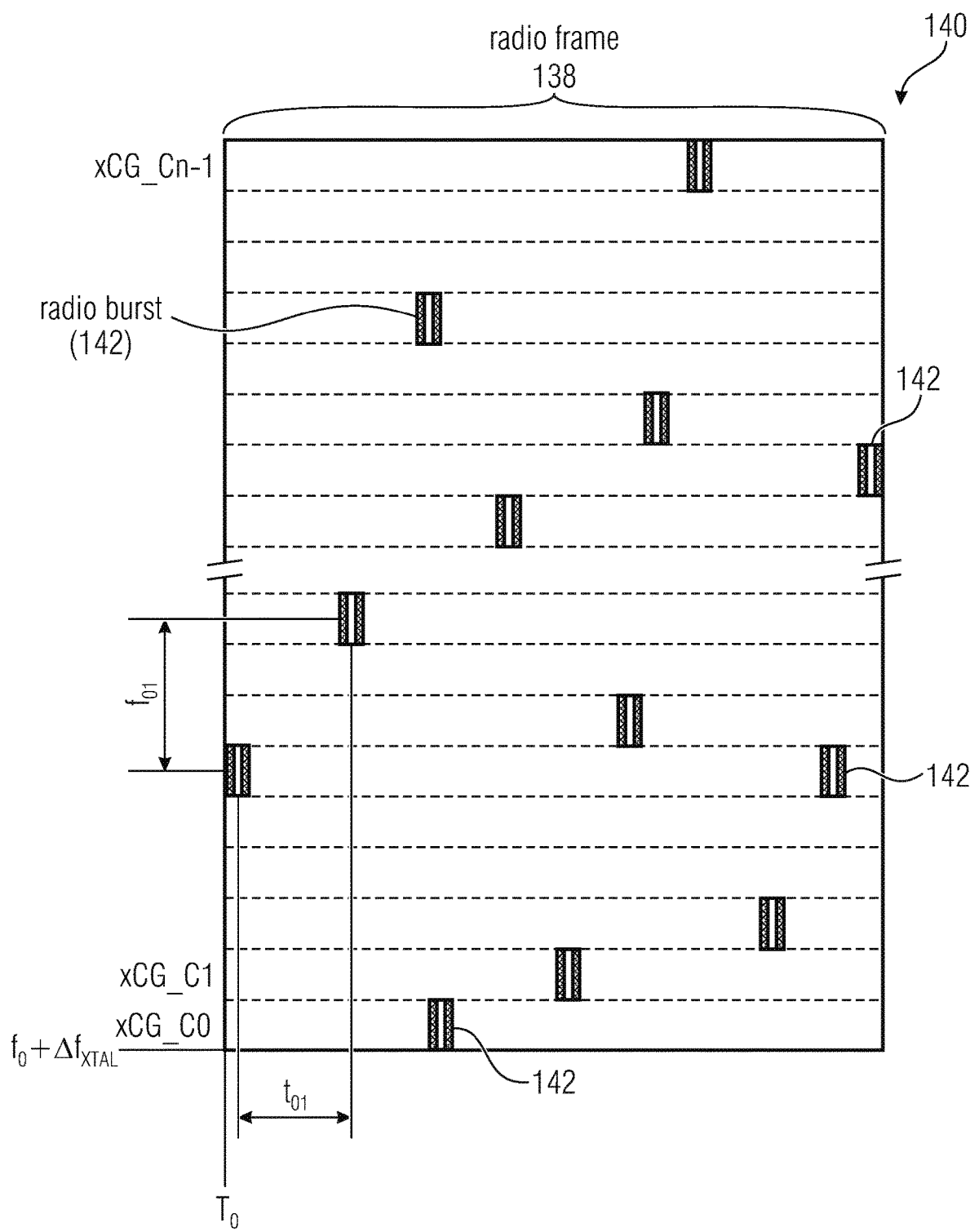
FIG. 31a shows in a diagram a structure of a frame with a TSMA hopping pattern.

In the transmission method TSMA, individual bursts of a data packet 120 (in the following also referred to as frame), as is illustrated in FIG. 31aa, are distributed across time and also across the frequencies.

In detail, FIG. 31a shows in a diagram a structure of a frame 120 having a TSMA hopping pattern 140. In this case, the ordinate describes the frequency, or channels (frequency channels), and the abscissa describes the time.

The start time $T_0$ of a frame 120 with the total duration $T_{frame}$ is selected by the sensor node 100 randomly due to the asynchronous transmission. The duration $T_{burst}$ of a burst 142 may vary, but is assumed to be constant in the following without restriction of the general validity, whereas the time intervals $t_{n,(n+1)}$, which each designate the distance of two neighboring burst centers (here of the two bursts having the indices n and n+1), are random quantities that are all within a specifiable range $T_{A\_min} \leq t_{n,(n+1)} \leq T_{A\_max}$ for $n \in \{1, 2, \ldots, N-1\}$. N is the number of the bursts 142 within a frame 120. For the frequencies used for the transmission, it is assumed that they are present in form of discrete frequency channels which are within a specifiable frequency channel grid. The frequency separation $f_{n,(n+1)}$ between 2 bursts 142 is a multiple of the carrier distance $B_C$ used in TSMA, and is therefore independent of the symbol rate $S_R$. ($S_R \leq B_C$) used. The relative starting frequency of a frame is to be denoted with $f_0$.

The number of the available frequency channels is given with L and N≤L applies. In this respect, there are usually more or exactly as many frequency channels as are needed by the N bursts 142 and, therefore, each of the N bursts 142 is located in a different frequency channel within a frame 120. The frequencies used by the N bursts do not have to be connected, but may be arbitrarily distributed within the L present frequencies.

In the following, the arrangement of the N bursts 142 in time and frequency is referred to as TSMA pattern (TSMA hopping pattern). If this hopping pattern is known to the receiver, it may synchronize with respect to the same based on the pilot sequences located in some or in every burst 142 and it may subsequently decode the reception data.

The following system assumptions and limitations may be considered with respect to the design of one or several TSMA patterns.

Figure 32:
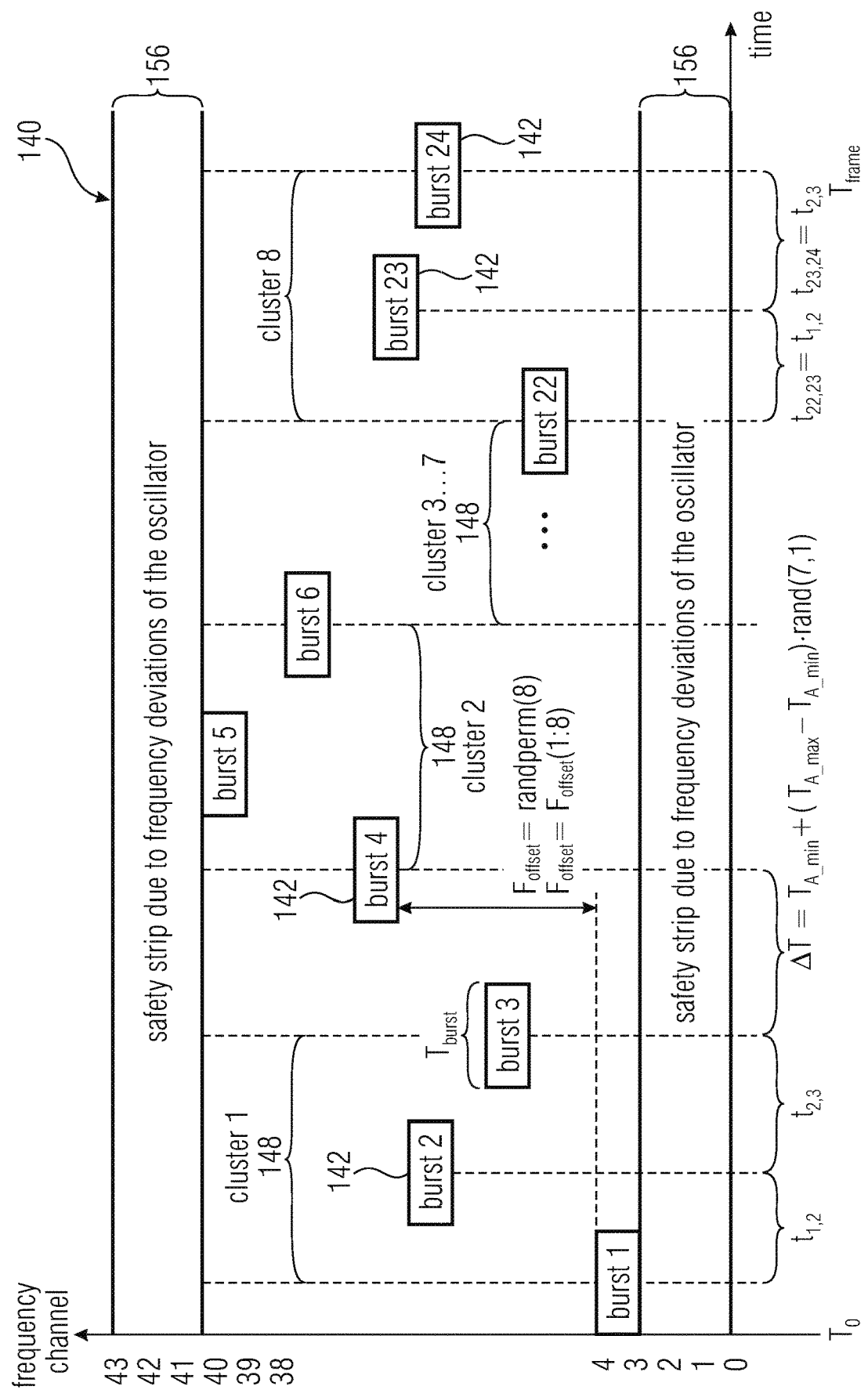
FIG. 32 shows in a diagram a schematic view of a structure of a TSMA hopping pattern.

(1) The frequency deviation of the oscillator from its nominal frequency may be considered. Depending on the system parameters and hardware requirements, the frequency deviation may be a multiple of the carrier distance $B_c$. Since this frequency offset may have both positive and negative values, a guard strip 156 of S frequency channels in which there is no burst (cf. FIG. 32) may be provided accordingly at both edges of the frequency range that is considered for use. In this respect, the degree of freedom for the individual bursts of the hopping pattern is reduced to (L−2·S) frequencies, wherein N≤(L−2·S) still applies. (2) Due to the temporarily asynchronous transfer, the receiver 110 does not know when a transmitter 100 transmits and the receiver also does not know which transmitter transmits with which hopping pattern. In this respect, the detection of a signal would go along with a considerable additional effort if the pattern arrangement, i. e. the grouping of the N bursts 142 within the time range $T_{frame}$ and across the (L−2·S) frequencies, would be completely random. In this respect, for example, C subsequent bursts 142 that are relative, e. g. identical, to each other with respect to their time and frequency intervals may be combined to a so-called cluster 148. Thus, a hopping pattern 140 consists of N/C clusters 148 with C bursts 142 each. C may advantageously be selected such that it is an integer divider of N. Thus, N/C|N⇔∃k∈ℤ :k·N/C=N applies. Details are discussed as shown in FIG. 32. However, it should already be mentioned here that a hopping pattern construction consisting of N/C clusters 148 that are entirely identical in their internal structure has certain disadvantages with respect to their correlation characteristics (occurrence of strongly pronounced side maximums with an amplitude of N/C each in the 2D autocorrelation function). All first bursts 142 in the N/C clusters comprise repetition patterns that are identical in a frequency-offset manner (and possibly in a time-offset manner). Accordingly, it happens that N/C bursts 142 simultaneously interfere with each other. However, this disadvantage may be accepted in view of the simplifications that may be achieved in the receiver as a result. A cluster size of C=1 (and therefore no cluster at all) is the most advantageous with respect to the correlation characteristics. (3) Due to the telegram splitting, the duration $T_{burst}$ of a burst 142 is relatively short as compared to the transfer time $T_{Frame}$ of the entire frame 120. If a certain minimum time $T_{A\_min}$ is allowed to elapse after the transmission of the first burst 142, this may have certain advantages with regard to the current consumption of the battery-powered sensor nodes (regeneration time of the battery after a comparatively energy-intensive transmission process). This minimum distance $T_{A\_min}$ should also be adhered to within the cluster and between the clusters as a design guideline.

The above-mentioned points 1) to 3) may be used as a basis for the design of hopping patterns for data (payload data) transmitted one time (=once or non-repeatedly).

Figure 31B:
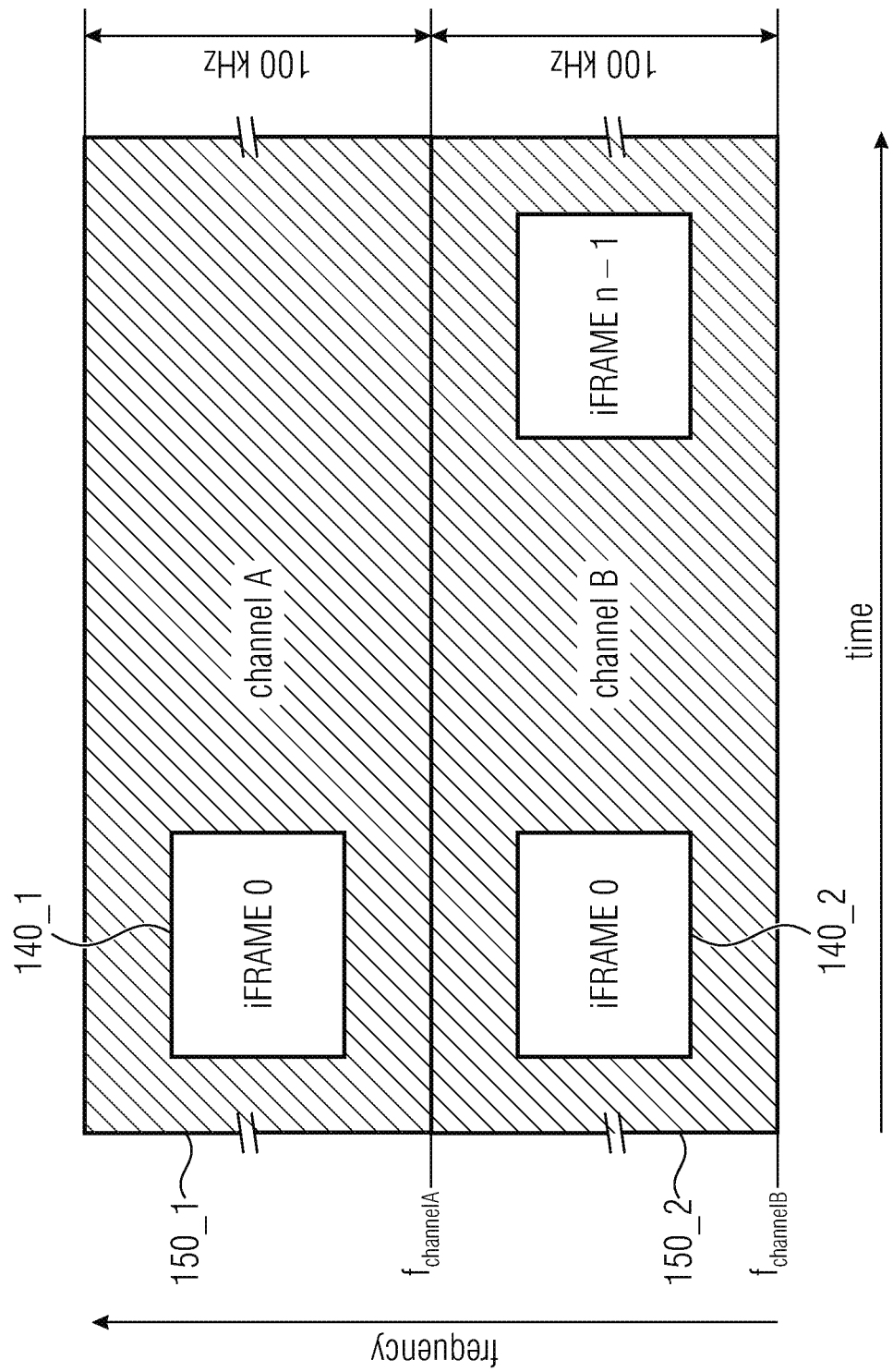
FIG. 31b shows in a diagram an occupancy of two frequency channels and in the repeated transfer of data by means of a first hopping pattern and a second hopping pattern.

In order to further increase the failure probability in the data transfer, time/frequency diversity in the form of interleaved repetitions may optionally be used when transmitting the payload data. In this case, the bursts (=hops or sub-data packets) 142 of the two hopping patterns to be repeated may be temporally interleaved, e.g. frame by frame, as is indicated in FIG. 31*b*. In order for the transmission time required for the two repetitions to remain as short as possible, an alternating interleaved arrangement may be used, where the bursts of the first/second transmissions alternate.

The following describes which further requirements exist for the hopping patterns to be newly designed. The new hopping patterns for repeatedly transmitted data may optionally match the hopping patterns for data transmitted once, i.e. have a lowest possible cross-correlation.

(4) Selection of the frequency hopping pattern. The TSMA hopping patterns should be robust a) against external interferences from other systems (neither the bandwidth nor the duration of the interference is known here) and b) against interferences from its own system. Optionally, it may be c) be made easy as possible for the receiver to differentiate between transmissions with and without repetition, in particular when using maximal-ratio combining. The aspects a) and c) do not depend on the design process and may be determined in advance. For example, improved or even maximum interference robustness against external interferences may be achieved by putting the two frames to be repeated into two different frequency bands (with their respective L frequency channels). The larger the frequency distance (cf. FIG. 31*b*), the lower the lower the probability that an external interferer can simultaneously interfere with both frames. In detail, FIG. 31*b* shows in a diagram an occupancy of two frequency channels 150_1 and 150_2 in the repeated transfer of data by means of a first hopping pattern 140_1 and a second hopping pattern 140_2. Here, the ordinate describes the frequency and the abscissa describes the time. In other words, FIG. 31*b* shows an interleaved frame transfer with a repetition when using two different frequency bands.

For example, the receiver (data receiver) may differentiate between transmissions with and without repetition based on the hopping pattern if different hopping patterns are used for the two transmission types. Without restricting the general applicability, the hopping patterns shown in section 3.2 may be used for transfers without repetition, and the hopping patterns shown in section 3.3 may be used for transfers with repetition, for example. In principle, a different (new) hopping pattern may be used in the first transfer in the repetition mode as compared to the second transfer. However, it has been shown that the use of a single hopping pattern is sufficient for all transmissions in the repetition mode when using corresponding, below-described measures. In addition, this measure also makes it easier for the receiver to simultaneously detect the individual bursts in the same patterns in the repetition mode.

The following explains how an improved or even maximum robustness against interferences from the own system may be achieved when using the same hopping patterns in the first and second transmissions in the case of repetitions (point 4b)). According to an embodiment, since different hopping patterns are used for the single transmission (e.g. the hopping patterns from section 3.2) than for the first and second transmissions in the case of the repetition (e.g. the hopping patterns from section 3.2), a full interference with the hopping patterns in the case of the repetition (the overlapping of all N bursts of a frame) is not possible. A later example shows based on the cross-correlation that, in the worst case, a maximum of C burst (of a cluster) may meet. If the hopping patterns to be used for the case of the repetition also have (slightly) different time intervals between the bursts in the cluster, the average number of hits may again be reduced. In the following, the interference immunity of transmitters that use the same hopping pattern in the repetition mode is considered. If two transmitters with identical hopping patterns were to start at the same time $T_0$ (cf. FIG. 31*b*) in the same frequency band, without any countermeasures, all 2N bursts in both frames of the repetition mode would be completely superimposed. Such a situation may be almost entirely prevented by means of parameter variation. For example, diversity may be achieved by introducing a variable, multi-staged time offset $T_W$ (cf. FIG. 2), or by the random start of the first burst in one of the two frequency bands A or B. Additionally, for example a random positive or negative frequency offset (e.g. in multiples of the carrier distance $B_C$) may also be applied to the TSMA pattern. According to the specifications in [ETSI TS 103 357 V0.0.5 (2017 March), "ERM-Short Range Devices—Low Throughput Networks; Protocols for Interfaces A, B and C", Chapter 7 "Telegram splitting ultra-narrow band (TS-UNB) family, March 2017], an additional specification of eight different repetition hopping patterns would result in a residual probability of 0.2% that two hopping patterns would be completely cancel each other out at a randomly equal $T_0$. A random coincidence of the transmissions of two data transmitters at $T_0$ depends on the duty cycle and the burst duration and is usually already in the low PTT range.

In the following, restrictions in the time domain behavior are described. As time restrictions, the subdivision of the frame into N/C clusters with C bursts each was introduced under point 2), wherein the individual bursts of the clusters have the same time intervals relative to their neighboring bursts. In point 3), a minimum time $T_{A\_min}$ between the bursts was introduced due to the current economy that should not be undercut. Generally, it may be stated that the smaller the frequency band available for the N bursts with its (L−2·S) possible frequencies to be occupied, the more important the pseudo-random principle of the time intervals $t_{n,(n+1)}$ between the clusters. To what extent this random principle may be maintained due to the variable, multi-stage time offset $T_W$ (cf. FIG. 31b) requested in point 4) for the repetition hopping patterns has to be clarified. The fact that the same hopping pattern is to be used in the repetition case may be regarded as positive with respect to the pseudo-random principle in any case.

Taking into account the above-mentioned restrictions, the structure of a TSMA pattern 140 shown in FIG. 32 arises.

In detail, FIG. 32 shows in a diagram a schematic view of a structure of a TSMA hopping pattern 140. In this case, the ordinate describes the frequency in frequency channels, and the abscissa describes the time. In other words, FIG. 9 shows a structure of the TSMA hopping pattern 140 with a cluster arrangement and frequency occupancy.

For better comprehensibility, the values in FIG. 9 are purely exemplary supplemented with concrete figures as far as needed: L=44, S=4, N=24, C=3. Due to the frequency deviation of the oscillator from its nominal frequency, S=4 frequency bands each are blocked for the burst occupancy, leaving 36 frequency bands for the 24 bursts or the 8 clusters.

This results in the following degrees of freedom with respect to the frequency channel occupancy. Since the 3 bursts in the 8 clusters each have a same frequency interval relative to each other, at least 8 further frequency bands may be reserved, leaving a maximum swing of 28 frequency bands for the base assignment of the 3 bursts. For example, any relative assignment with 3 different frequency bands may be performed. As is the case in the base assignments (1,28,14) or (1,24,12), for example, a largest possible frequency swing in neighboring bursts proves to be advantageous with regard to the later optimizations. The assignment of the individual clusters with respect to each other may also take place randomly. For example, in the base assignments (1,28,14), the order of the numbers {1,2,3,4,5,6,7,8} may be arbitrarily permuted with each other (Matlab command: randperm(8)) and these 8 different values each be added to a base assignment in order to obtain the frequency assignment of the bursts in the 8 clusters. In the base assignments (1,24,12), even a permutation of 12 start values (Matlab command: randperm(12)) is possible. and the first 8 values may again be added with the corresponding base assignment (1,24,12). If two groups of hopping patterns are to be designed, e.g. two groups of 8 hopping patterns with and without repetition, the use of two base assignments with a different frequency sweep is recommended. In this case, complete clusters may not be collided between the groups.

This results in the following degrees of freedom with respect to the time intervals. Here, the 2 time intervals between the 3 bursts of the clusters as well as the 7 time intervals between the 8 clusters have to be determined. A certain minimum time $T_{A\_min}$ should not be undercut. An upper time limit $T_{A\_max}$ results from the specification of the frame duration $T_{frame}$. The determination of the random time intervals may also be performed by throwing a dice (Matlab command: $\Delta T = T_{A\_min} + (T_{A\_max} - T_{A\_min}) \cdot \text{rand}(7,1)$). Here, the use of different burst time intervals in the clusters is also recommended if a design of two different hopping pattern groups is planned. With respect to the time intervals between the clusters, in the repetition hopping patterns, one may check to what extent the shift by means of the multi-stage time offset $T_W$ leads to no burst overlaps and to what extent $T_{A\_min}$ is adhered to between all interleaved bursts. If this is not the case, time scaling may be performed again. It is also to be noted that, in the above Matlab command, equidistant time intervals $\Delta T$ may be achieved when setting $T_{A\_max} = T_{A\_min}$ to be equal.

In the "Telegram Splitting Multiple Access (TSMA)" method, the message is split into many small bursts 142 both in the time direction and the frequency direction according to the hopping pattern 140. Due to the asynchronous transmission and the different frequency departures of the individual sensor nodes 100, the bursts 142 are smeared across time and also across the available frequency spectrum. If all sensor nodes 100 have the same hopping pattern, with increasing number of participants, bursts of different participants (in the worst case fully) overlap in time more and more frequently and therefore interfere with each other. The more bursts 142 within a frame 120 are disturbed by bursts of other participants, the higher the probability that the receiver-side error correction fails and that transmission errors occur.

Embodiments provide a set of hopping patterns which ideally minimize the packet error rate (frame or packet error rate, FER, PER) of the radio transmission system. This is done under the assumption that all radio participants use the same set of hopping patterns. Although, with respect to the arrangement of the radio frequencies in a hopping pattern, only a finite (albeit usually relatively large) number of permutations is possible by introducing discrete radio channels, the temporal arrangement of the bursts 142 leads to an extremely large number of permutation possibilities, i.e. hopping patterns, due to a continuous time axis. Thus, a "full search" across all possible hopping patterns is almost impossible. The method underlying the invention is therefore based on a Monte Carlo approach which selects, from a very large number of (pseudo) randomly generated hopping patterns, a set with the best characteristics as to an expected minimum error rate using suitable design criteria. The number of hopping patterns in this set amounts to $P_{selection}$.

In order to create suitable hopping patterns 140, a matrix that is ideally strictly monotonously related to the expected packet error rate, i.e. whose minimization ideally also minimizes the packet error rate, is needed. In embodiments, the two-dimensional (2D) autocorrelation and/or cross-correlation of the hopping pattern may be considered as a design criterium.

The 2D-autocorrelation (ACF) $\theta_{x,x}$ of the matrix X of the hopping pattern 140, which spans the area across the duration $T_{frame}$ sampled with multiples of $T_A$ and the occupied frequency spectrum with the L frequency bands, may be specified as follows:

$$\theta_{x,x}(f, t) = \sum_{l=0}^{L-1} \sum_{m=0}^{M-1} x_{l,m} \cdot x_{l+f,m+t}$$

wherein L is the number of lines of the matrix X and $M=T_{frame}/T_A$ is the number of columns of the matrix X. If a burst is located at the respective position x(l,m) of the matrix X, an entry takes place at this location in X with x(l,m)=1, otherwise x(l,m)=0. The indexed elements of X outside the occupied range are also zero:

$x(l,m)=0, l<0$ or $l≥L$ or $m<0$ or $m≥M$

Since the oscillator frequency error per participant may amount by definition to a maximum deviation of S frequency channels, the frequency index f in the ACF extends from −2S to +2S. On the other hand, the time index t runs from $-T_{frame}$ to $T_{frame}$ in steps of $T_{frame}/T_A$. Die ACF dimension of $\theta_{x,x}$ is therefore (4S+1)×(2M+1).

In the time and frequency information matrix X, if desired, the influence of neighboring channel interferences may also be taken into account. This is important if the reception filters in the receiver 110 do not have any particular selectivity with respect to neighboring channel interferences. For this, a matrix vector $m_{Met}$=(cochannel, $1^{st}$ neighboring channel, $2^{nd}$ neighboring channel, . . . ) that inserts the corresponding information into the matrix X may be introduced. For example, if a matrix with $m_{Met}$=(1, 0.5, 0.1) is specified, in X, there is a 1 at the point x(l,m) where the presence of a burst is assumed there is a 0.5 at the two positions of the neighboring frequencies x(l−1,m) and x(l+1,m). Accordingly, further on the outside, at x(l−2,m) and x(l+2,m) there is the value 0.1 for the $2^{nd}$ neighboring channel. This indexing may be done at all positions where a burst is located in X.

Figure 33A:
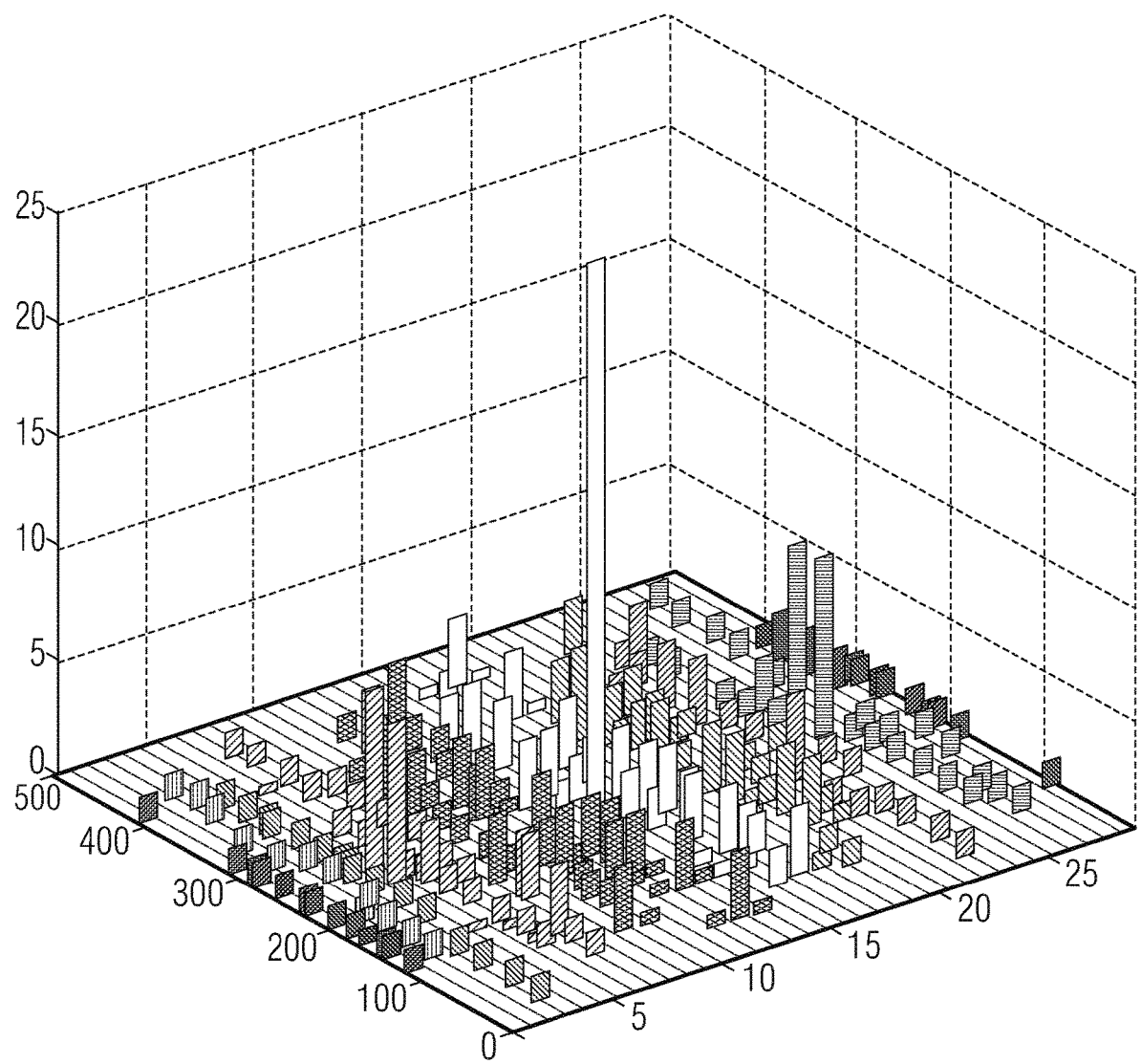
FIG. 33a shows in a diagram main and side maximums of an autocorrelation function of a hopping pattern comprising specified autocorrelation characteristics, applied across frequency and time.
Figure 33B:
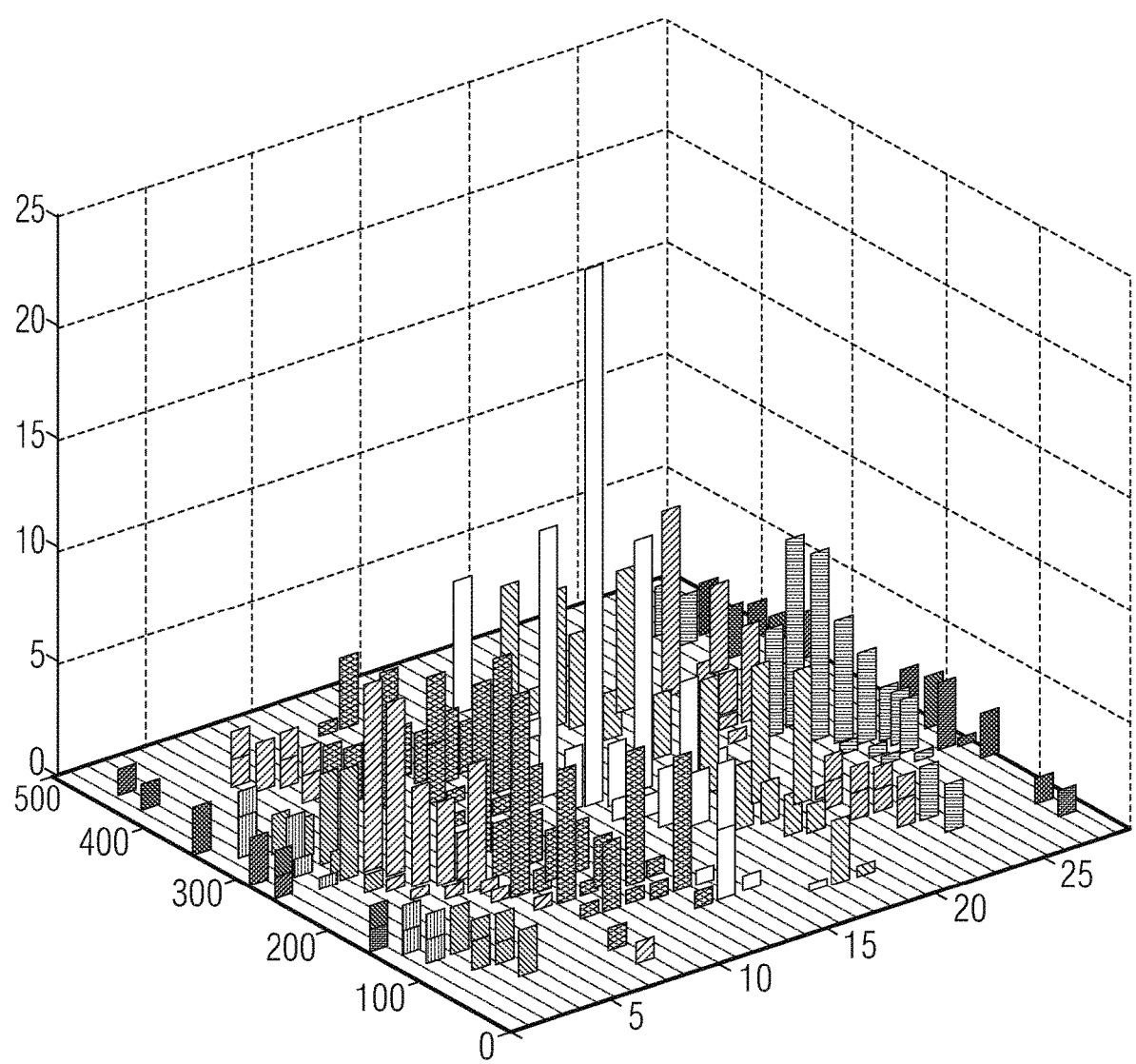
FIG. 33b shows in a diagram main and side maximums of an autocorrelation function of a hopping pattern not comprising specified autocorrelation characteristics, applied across frequency and time.

FIGS. 33a and 33b show two ACF examples. In FIG. 33a, beside the unavoidable main maximum at t=f=0 (since the non-shifted sequence is most similar with itself, the 2D-ACF has the highest value for the sequence non-shifted in both dimensions (time and frequency), in this case N burst collisions) and the 2 or 4 possible side maximums with the amplitudes of N/C each due to the cluster formation, there are only values that are smaller than or equal to a threshold value $N_{threshold}$. The lower this threshold, the fewer bursts are disturbed in a frame, while the probability of a transmission error is reduced. On the other hand, FIG. 33b shows a more unfavorable hopping pattern in which the threshold value is, e.g. significantly, exceeded in some places. This increases the probability of transmission errors.

In the following, the individual design steps are described in detail.

In a first design step, $P_{optimum}$ candidates of the hopping patterns whose ACF side maximums do not exceed a specified minimum amplitude threshold value $N_{threshold}≥C$ (C is the cluster size) may be generated. The generation of candidates of the hopping patterns is done in the context of a Monte Carlo simulation in which hopping patterns having random time and frequency patterns (in the context of the mentioned edge conditions, see above) are generated. If $N_{threshold}>C$ applies for the threshold value, the number of values exceeding the value C should be as small as possible.

For this, the (4S+1)×(2M+1) elements of the 2D autocorrelation $\theta_{x,x}$ may be sorted in ascending order in a vector $V_{sort}$. Since the total sum remains approximately constant across all ACF elements for all hopping patterns and most ACF elements have values of 0, 1 or C (full cluster collision), only the values larger than C are of interest, if available. In this regard, it is sufficient to only consider the last $v_{ACF}$ elements of $V_{sort}$, i.e. $V_{sort}$(end-$v_{ACF}$+1:end). As a criterion (specified autocorrelation characteristic), it may therefore be determined that the sum $SUM_{ACF}$ of these $v_{ACF}$ elements is not to exceed a threshold value of $S_{sum\_ACF\_threshold}=(v_{ACF}-1)\cdot C+N$, if possible. If not enough different hopping patterns are found for this, the value of $S_{sum\_ACF\_threshold}$ may be incrementally increased by 1 until a sufficient number of $P_{optimum}$ of hopping patterns is available. Particularly, if neighboring channel interferences are included into the calculation of the 2D-ACF by means of the matrix vector $m_{Met}$, the sum threshold value $S_{sum\_ACF\_threshold}$ may significantly increase.

If different sets of hopping patterns 140 are to be searched for, the first design step may be repeated with a new parameter set. For example, there may be the desire to generate several sets of hopping patterns with different oscillator deviations and optimize them together. Different oscillator deviations may cause different guard strips S, resulting in a change of the degree of freedom of the possible burst occupancy. In this respect, some parameters within the ACF calculation also change. Or a new hopping pattern set that enables multiple repetitions using a multi-stage time offset $T_W$ is to be generated. Here, the requirements change with respect to the time behavior. If a burst-wise alternating interleaved arrangement of the hopping patterns is intended, the shortest distance between two original bursts of a hopping pattern may be determined and specified, which then sets the time offset $T_W$. In this case, the time offset $T_W$ is to be selected to be significantly larger than the minimum time $T_{A\_min}$.

The first design step, i.e. finding $P^1_{optimum}$ candidates of a set of hopping patterns, is performed fully independently from finding $P^2_{optimum}$ candidates of a different pattern set. In this respect, all parameter specifications in the patterns (cluster, frequency pattern, time intervals, etc.) and the design parameters ($N_{threshold}$, $V_{sort}$, number of lines and columns of the 2D-ACF $\theta_{x,x}$, etc.) may be arbitrarily changed. A combination of all design candidates is only performed in the second design step, i.e. the calculation of the cross-correlation.

Figure 34A:
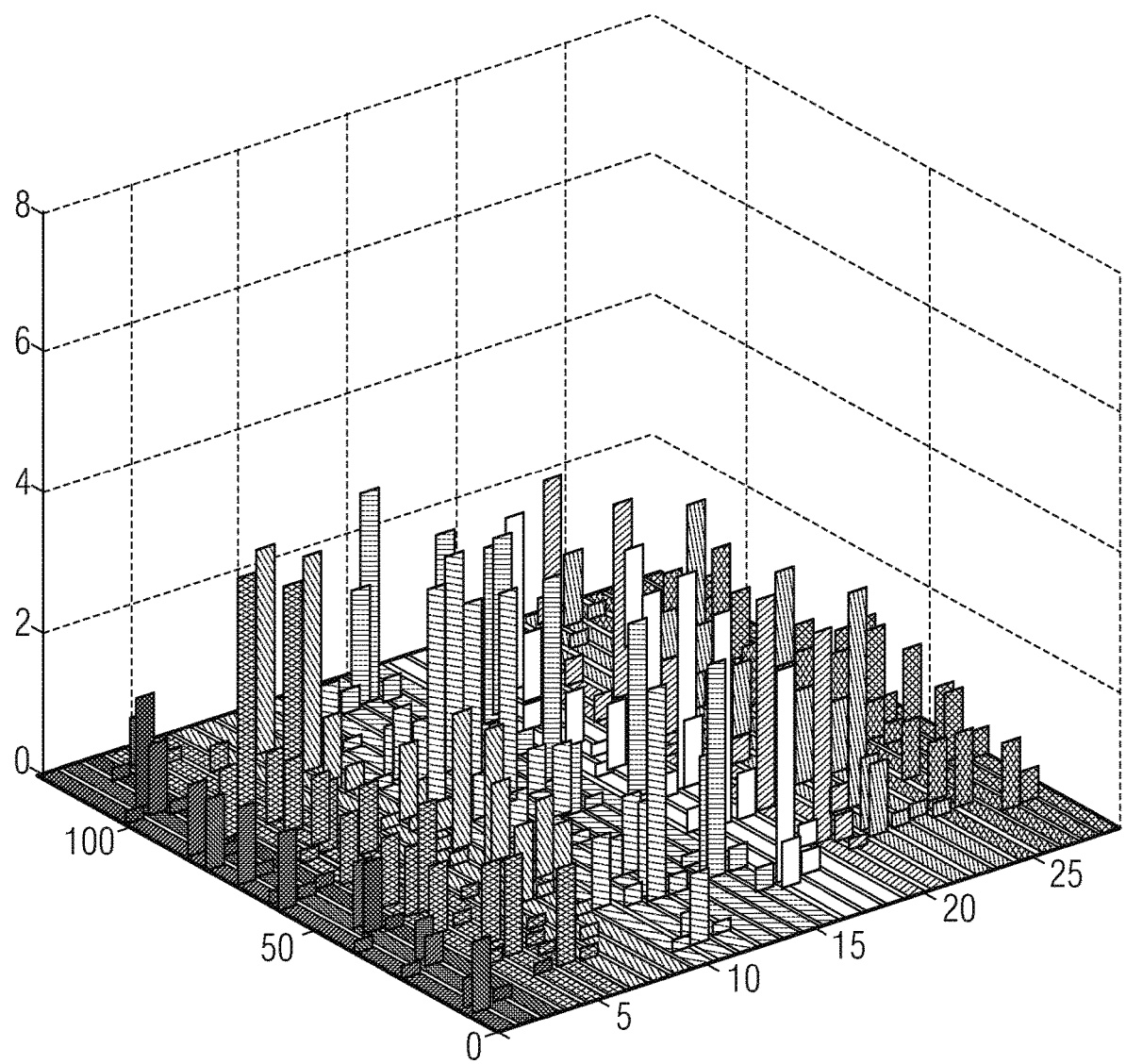
FIG. 34a shows in a diagram main and side maximums of a cross-correlation function of two hopping patterns comprising specified cross-correlation characteristics, applied across frequency and time.
Figure 34B:
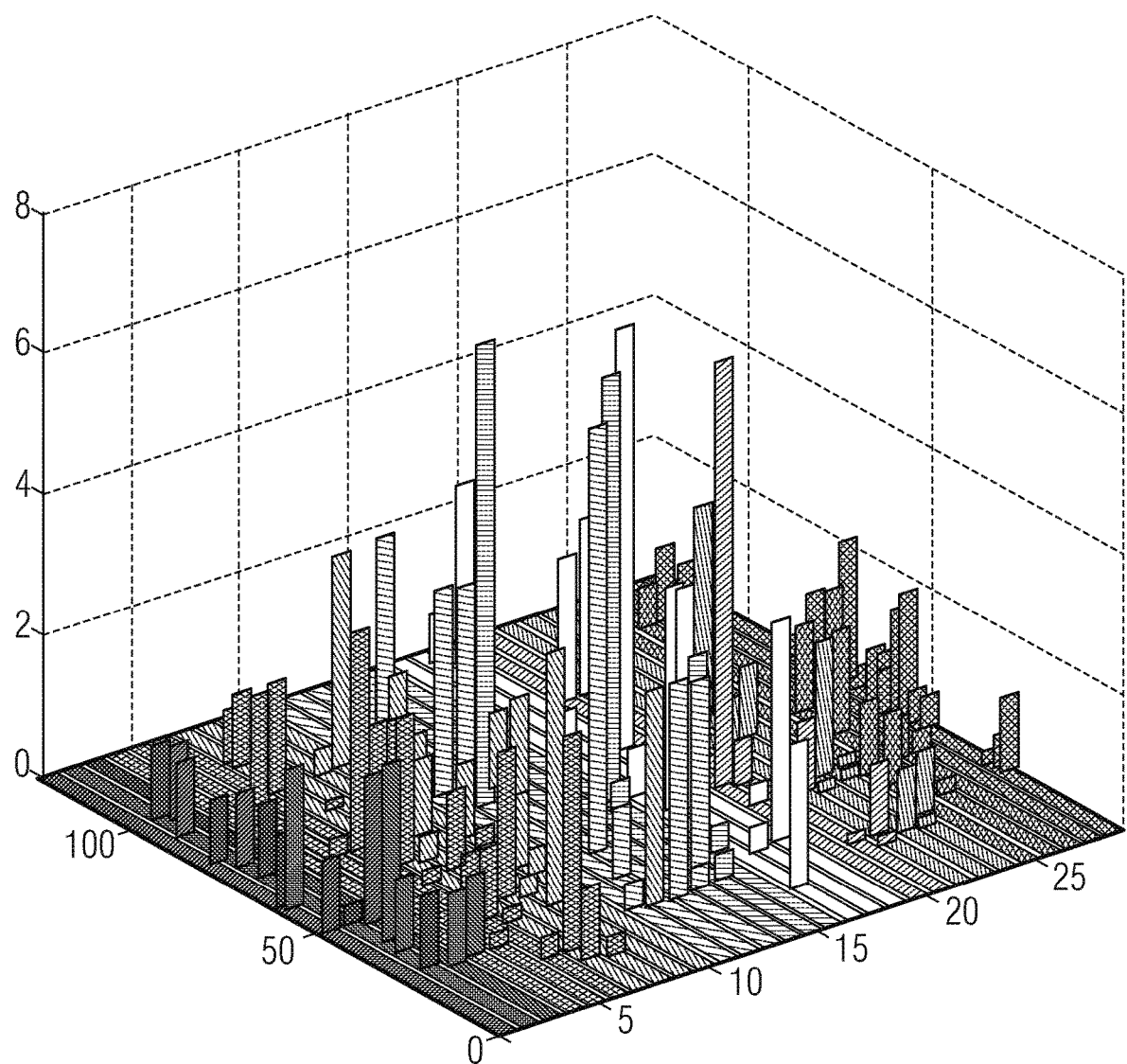
FIG. 34b shows in a diagram main and side maximums of a cross-correlation function of two hopping patterns not comprising specified cross-correlation characteristics, applied across frequency and time.

If a given number $P_{selection}$ of different hopping patterns is searched for, each individual hopping pattern pair should be as orthogonal to each other as possible, and the individual 2D cross-correlation matrices (2D-CCF)

$$\theta_{x,y}(f, t) = \sum_{l=0}^{L-1} \sum_{m=0}^{M-1} x_{l,m} \cdot y_{l+f,m+t}$$

of the two hopping patterns with the matrices X and Y should comprise the lowest possible maximum values since high maximum values potentially correspond to a large number of colliding bursts in a single frame in the radio transmission. The time index of the $\theta_{x,y}$ continues in an unvaried manner in steps of $T_{frame}/T_A$ from $-T_{frame}$ to $T_{frame}$. The CCF frequency index f, on the other hand, extends in general from $-(S_x+S_y)$ to $+(S_x+S_y)$ since the two considered hopping patterns may comprise different deviations in their frequency error behavior (oscillator frequency deviations). FIGS. 34a and 34b again show two 2D-CCF examples, a favorable case (FIG. 34a) and an unfavorable case (FIG. 34b).

In a second design step, starting from the $P_{optimum}$ previously selected hopping pattern candidates with their associated 2D autocorrelation sequences $\theta_{x,x}$, all $(P_{optimum}-1) \times (P_{optimum})$ possible, generally different cross-correlation sequences $\theta_{x,y}$ may be calculated. In each 2D-CCF, the values of $\theta_{x,y}$ may subsequently be again sorted in ascending order (analogously to the process in 2D-ACF), the sum of the last $v_{CCF}$ elements may be calculated, i.e. $SUM_{CCF}$=sum $(V_{sort}(end-v_{CCF}+1:end))$ and be stored in a quadratic $(P_{optimum} \times P_{optimum})$ matrix $O_{vCCF}$.

If the 2D-autocorrelation sequences $\theta_{x,x}$ of different sets of hopping patterns were calculated in the first design step, the different candidate sets ($P^1_{optimum}$ and $P^2_{optimum}$) are processed in sequence, and a square matrix $O_{vCCF}$ of the dimension $((P^1_{optimum}+P^2_{optimum}) \times (P^1_{optimum}+P^2_{optimum}))$ having all cross-correlation sequences $\theta_{x,y}$ of all possible combinations is created as a result.

In a third step, the $P_{selection}$ different hopping patterns 140 that comprise the most favorable 2D-CCF characteristics with respect to each other since they correlate with a comparably low maximum number of colliding bursts in a frame are to be searched for. For this, the characteristics of $((P_{selection}-1) \cdot P_{selection})/2$ different 2D-CCF may be evaluated based on the stored sums $SUM_{CCF}$ in the matrix $O_{vCCF}$. The $P_{selection}$ different hopping patterns whose total sum across the $((P_{selection}-1) \cdot P_{selection})/2$ different subtotals $SUM_{CCF}$ from $O_{vCCF}$ is a minimum result in the optimum $P_{selection}$ hopping patterns. Since, in the context of an extensive Monte Carlo simulation, $P_{selection} \ll P_{optimum}$ is the aim, according to the binomial coefficient "$P_{optimum}$ over $P_{selection}$", there are different combination possibilities, an extent that usually does not have to be fully processed. In this respect, $P_{selection}$ hopping patterns may be newly and randomly selected from the $P_{optimum}$ present hopping patterns (Matlab commands: F=randperm(1:$P_{optimum}$) and Pattern$_{section}$=F(1:$P_{selection}$)) and the total sum TS may be calculated from the different subtotals $SUM_{CCF}$. With a correspondingly large sample size, there is a local minimum of the total sum, which then delivers the desired set of $P_{selection}$ hopping patterns.

If the 2D-autocorrelation sequences $\theta_{x,x}$ of different sets of hopping patterns were calculated in the first design step, a random permutable selection of $P^1_{selection}$ from the $P^1_{optimum}$ present hopping patterns of set 1, as well as a random permuted selection of $P^2_{selection}$ from the $P^2_{optimum}$ present hopping patterns of set 2. Through this hopping pattern set [$P^1_{selection}$, $P_{selection}$], the total TS is calculated from the different subtotals $SUM_{CCF}$ and the set with the local minimum is subsequently selected.

Figure 35:
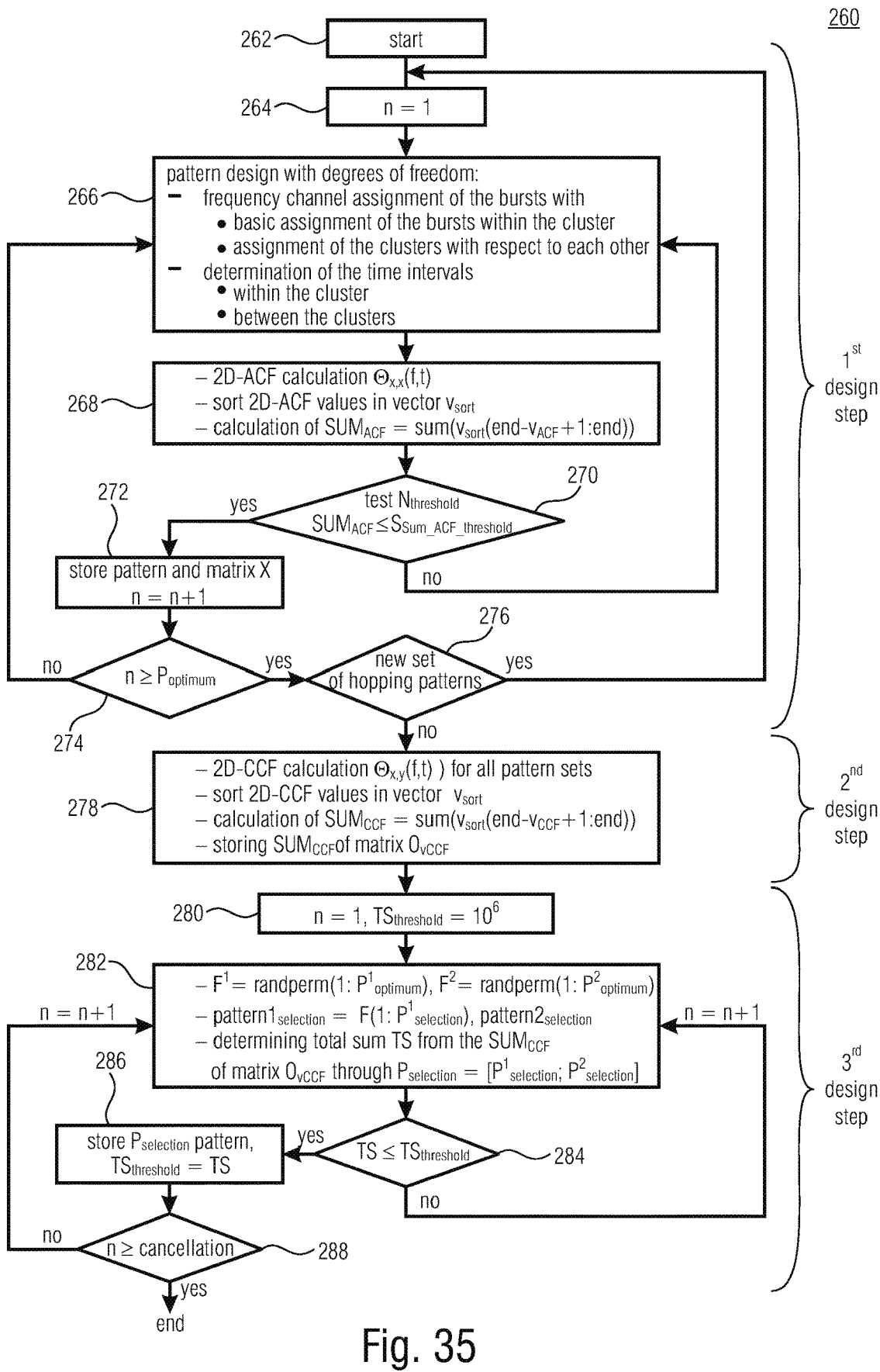
FIG. 35 shows a flow diagram of a method for generating hopping patterns according to an embodiment.

The full design process and the degrees of freedom when determining the hopping patterns are again illustrated in FIG. 35. The possibility to optimize several sets of hopping patterns at the same time is considered, but only indicated.

In detail, FIG. 35 shows a flow diagram of a method 260 for generating hopping patterns according to an embodiment.

In a first step 262, the method 260 is started.

In a second step 264, n is set to be equal one, wherein n is a running variable.

In a third step 266, a hopping pattern may be randomly generated. Here, the above-mentioned degrees of freedom with respect to the frequency channel occupancy may be considered, e.g. a frequency channel assignment of the bursts with a base assignment of the bursts within the cluster and an assignment of the clusters with respect to each other. Furthermore, the above-mentioned degrees of freedom with respect to the time intervals may be considered, e.g. a determination of the time intervals within the cluster and between the clusters.

In a fourth step 268, the autocorrelation function of the randomly generated hopping pattern may be calculated. For example, a 2D-ACF calculation $\partial_{x,x(f,t)}$ may be carried out. Furthermore, the 2D-ACF values may be sorted in a vector $v_{sort}$. Furthermore, a subtotal may be formed across a specified number of largest amplitude values of the autocorrelation function, $SUM_{ACF}$=sum($v_{sort}$(end-$v_{ACF}$+1:end)).

In a fifth step 270, it may be determined whether the randomly generated hopping pattern comprises the specified autocorrelation characteristics. For example, it may be determined whether the ACF side maximums of the hopping pattern do not exceed a specified minimum amplitude threshold value $N_{threshold} \geq C$ (C is the cluster size), in detail, it may be determined whether the sum $SUM_{ACF}$ of these $v_{ACF}$ elements (subtotal) does not exceed the sum threshold value of $S_{sum\_ACF\_threshold}$ of, e.g., $(v_{ACF}-1) \cdot C+N$.

If the hopping pattern does not comprise the specified autocorrelation characteristics, the third step is repeated. If the hopping pattern comprises the specified autocorrelation characteristics, the method is continued.

In a sixth step 272, the hopping pattern (with the specified autocorrelation characteristics) and the matrix X may be stored. Furthermore, the index n may be increased by one, n=n+1.

In a seventh step 274, it may be checked whether an optimum number $P_{optimum}$ of hopping patterns is available.

If no optimum number $P_{optimum}$ of hopping patterns is available, the third step 266 is repeated. If an optimum number $P_{optimum}$ of hopping patterns is available, the method is continued.

In an eighth step 276, it is determined whether a new set of hopping patterns is to be generated. If this is the case, the second step 264 is repeated. If this is not the case, the method is continued. Furthermore, it may be determined whether a further set of hopping patterns is to be optionally generated for another parameter set, e.g. another oscillator offset or another cluster design having varied time intervals or frequency hops.

In a ninth step 278, the cross-correlation functions between the hopping patterns with specified autocorrelation characteristics are calculated. For example, a 2D-CCF calculation $\theta_{x,y}$(f,t) for all hopping pattern sets may be carried out, the 2D-CCF values may be stored in a vector $v_{sort}$, the subtotals $SUM_{CCF}$=sum($v_{sort}$(end-$v_{CCF}$+1:end)) may be calculated, and the subtotals $SUM_{CCF}$ may be stored in a matrix $O_{vCCF}$.

In a tenth step 280, n may be set to be equal one and $TS_{threshold}$ may be set to a large threshold, e. g. $10^6$.

In an eleventh step 282, $P^1_{selection}$ hopping patterns are newly and randomly selected from the $P^1_{optimum}$ present first hopping patterns, and $P^2_{selection}$ hopping patterns are newly and randomly selected from the $P^2_{optimum}$ present second hopping patterns. For this, $P^1_{optimum}$ different numbers are randomly selected in a random sequence, $F^1$=randperm(1:

$P^1_{optimum}$), by throwing a dice and $P^2_{optimum}$ different numbers are randomly selected in a random sequence, $F^2=\text{randperm}(1:P^2_{optimum})$, by throwing a dice. From this, the first $P^1_{selection}$ may be selected, pattern $\text{Pattern1}_{selection}=F(1:P^1_{selection})$, and the first $P^2_{selection}$ may be selected, $\text{Pattern2}_{selection}=F(1:P^2_{selection})$. Based on $\text{Pattern1}_{selection}$ and $\text{Pattern2}_{selection}$, the total TS may be calculated from the individual subtotals $\text{SUM}_{CCF}$ that are in the matrix $O_{vCCF}$, via $P_{selection}=[P^1_{selection}; P^2_{selection}]$.

In a twelfth step 282, it may be determined whether $TS \leq TS_{threshold}$. If $TS \leq TS_{threshold}$ is not satisfied, n is increased by one, n=n+1, and the eleventh step 282 is repeated. If $TS \leq TS_{threshold}$, the threshold $TS_{threshold}$ is overwritten with TS, and the method is continued.

In a thirteenth step 286 the selected hopping pattern may be stored.

In a fourteenth step 288, it may be determined whether n≤cancellation. If n≤cancellation is not satisfied, n is increased by one, n=n+1, and the eleventh step 282 is repeated. If n cancellation is satisfied, the method is completed.

15.2. Generating Hopping Patterns for Low-Delay TSMA

In section 15.1, different groups of TSMA (hopping) patterns were designed, which have favorable 2D autocorrelation characteristics or 2D cross-correlation characteristics amongst themselves. Each pattern consisted of N bursts with a duration $T_{Burst}$ each. The N bursts were arranged almost arbitrarily in the time direction and/or frequency direction. In order to simplify the detection of the patterns for the receiver, C successive bursts were combined in a so-called cluster, wherein said bursts were identical relative to each other as to their time intervals and frequency intervals. The following applied: $N/C|N \Leftrightarrow \exists k \in \mathbb{Z} : N/C=N$. The overall duration of a hopping pattern was $T_{Frame}$, which was significantly larger than the actual duration of the N Bursts with $N \cdot T_{Burst}$, since a random transmission pause was introduced between two neighboring bursts with a temporal interval of $\Delta T$ ($T_{A\_min} \leq \Delta T \leq T_{A\_max}$) so that the battery could recover. The default values for the minimum interval $T_{A\_min}$ and the maximum interval $T_{A\_max}$ were in force within the cluster and for the temporal intervals between the clusters.

Since the temporal interval $\Delta T$ between two bursts was significantly larger than the actual burst duration $T_{Burst}$, interleaved repetitions were allowed in section 15.1. In this case, the bursts of the two patterns to be repeated are temporally interleaved frame-by-frame in one another. In order for the transmission time $T_{Frame}+T_{Rep}$ to be as low as possible for both repetitions, alternatingly interleaving was adopted, where the bursts of the first and second emissions alternate.

Until now, all patterns had in common that a duration of $T_{Frame}$ was needed for the emission of the N bursts.

However, there are IoT applications in which a data packet is to be transferred in a significantly shorter time as with the previous frame duration $T_{Frame}$, the so-called low-delay mode. For this, a single new pattern (first hopping pattern 160) is to be designed, the so-called low-delay pattern. The cluster structure with the N/C clusters is to be maintained, and one of the base clusters may be used. The only requirement that is abandoned is that C consecutive bursts are combined to a so-called cluster.

The problem is solved by interleaving as many clusters in each other as possible. If the interval $\Delta T \geq T_{A\_min}$ is not sufficient to interleave all N/C clusters within a base cluster, a new base cluster is attached in which the remaining clusters are again interleaved in each other. Through this, the new temporal minimum interval $T_{A\_min\_LOW\_DELAY}$ is significantly smaller than $T_{Frame}$ (approximately $T_{A\_min\_LOW\_DELAY}=T_{Frame}/4$).

By keeping the basic clusters in the bursts and the same data rate, a partially mutual detection may be carried out for both modes. The receiver performs time the symbol recovery, the burst correlation and the cluster correlation together. Only the telegram correlation has to be performed separately due to the interleaving. This results in a significant saving with respect to computing power for the detection of both modes.

Figure 36:
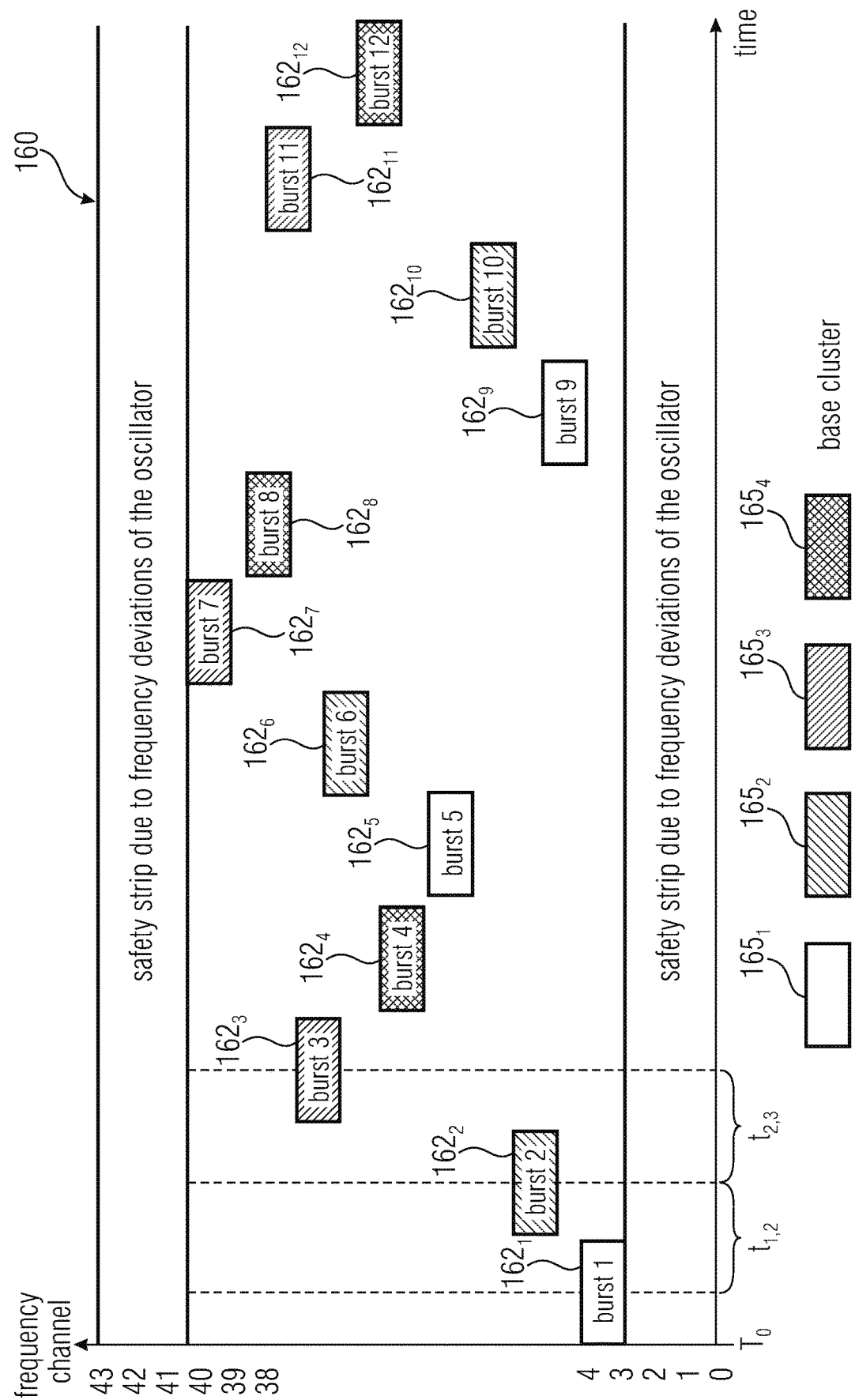
FIG. 36 shows in a diagram an exemplary occupancy of a transfer channel in the transfer of the first plurality of sub-data packets distributed in frequency and time according to the first hopping pattern.

FIG. 36 shows in a diagram an exemplary occupancy of a transfer channel in the transfer of the first plurality of sub-data packets 162 distributed in frequency and time according to the first hopping pattern 160. In other words, FIG. 36 shows the embodiment of interleaving such a low-delay pattern.

As can be seen in FIG. 36, the first hopping pattern 162 may comprise a plurality of sub-hopping patterns (clusters) 165$_1$ to 165$_4$ which are time-shifted and/or frequency-shifted versions of each other, wherein the plurality of sub-hopping patterns (clusters) 165$_1$ to 165$_4$ is interleaved in each other such that sub-data packets 162 assigned to different sub-hopping patterns (clusters) 165$_1$ to 165$_4$ are alternatingly transmitted.

For example, the sub-data packets 162$_1$, 162$_5$ and 162$_9$ may be transmitted distributed in time and frequency according to the first sub-hopping pattern (cluster) 165$_1$, whereas the sub-data packets 162$_2$, 162$_6$ and 162$_{10}$ may be transmitted distributed in time and frequency according to the second sub-hopping pattern (cluster) 1652, whereas the sub-data packets 162$_3$, 162$_7$ and 162$_{11}$ may be transmitted distributed in time and frequency according to the third sub-hopping pattern (cluster) 165$_3$, and whereas the sub-data packets 162$_4$, 162$_8$ and 162$_{12}$ may be transmitted distributed in time and frequency according to the fourth sub-hopping pattern (cluster) 165$_4$.

In embodiments, (on the data transmitter-side) the basic clusters may be interleaved in each other.

In embodiments, on the data receiver-side, the detection of the normal and of the low-delay modes may be carried out together up to the cluster correlation.

15.3. Hopping Patterns for Low-Delay TSMA

In the following, a specific second hopping pattern 160 (low-delay hopping pattern) is exemplarily defined, e.g., which may be used for the transfer of data of the first class (data with a high priority and/or higher requirements as to a maximum transfer duration).

In embodiments, a time hopping pattern, a frequency hopping pattern or a combination of a time hopping pattern and the frequency hopping pattern may be used for the single transfer of data by means of a hopping pattern.

The frequency hopping pattern may be the frequency hopping pattern having 24 hops shown in the table of FIG. 37, wherein the line in the table is the frequency hopping pattern, wherein each column in the table is a hop of the frequency hopping pattern, wherein each cell in the table indicates a transmission frequency of the respective hop of the frequency hopping pattern in carriers of UCG_C0 to UCG_C23.

In other words, FIG. 37 shows in a table a definition of a low-delay frequency hopping pattern (values in carriers of USG_C0 to UCG_C23) for a crystal tolerance (oscillator tolerance) of +/−20 ppm.

The time hopping pattern may be the time hopping pattern having 24 hops shown in the table of FIG. 38, wherein in the table of FIG. 38 the line is the time hopping pattern, wherein each column in the table is a hop of the time hopping pattern starting from a second hop so that each time hopping pattern comprises 24 hops, wherein each cell in the table indicates a temporal interval of a reference point of the respective hop to a same reference point of an immediately subsequent hop in—preferably multiples of—symbol durations.

In other words, FIG. 38 shows in a table a definition of a low-delay time hopping pattern (values in multiples of symbol durations) for a crystal tolerance (oscillator tolerance) of +/−20 ppm. Due to the fact that the length of the 24 sub-data packets may vary, the time hopping pattern is defined between the centers of the 24 sub-data packets.

In a combination of the hopping pattern made of a time hopping pattern and a frequency hopping pattern, the respective time hopping pattern and the respective frequency hopping pattern may have the same line numbers in the respective table.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

A signal that is encoded according to the invention, such as an audio signal or a video signal or a transport stream signal, may be stored on a digital storage medium or may be transferred on a transfer medium such as a wireless transfer medium or a wired transfer medium, e.g. the internet.

The inventive encoded audio signal may be stored on a digital storage medium or may be transferred on a transfer medium such as a wireless transfer medium or a wired transfer medium, e.g. the internet.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A communication apparatus, comprising:
a data transceiver comprising one or more processors or electronic circuits, wherein the data transceiver is configured to divide data of a first class onto a first plurality of sub-data packets and to transmit the first plurality of sub-data packets using a first hopping pattern, wherein the data transceiver is configured to divide data of a second class onto a second plurality of sub-data packets and to transmit the second plurality of sub-data packets using a second hopping pattern,
wherein transmission pauses between sub-data packets transmitted according to the first hopping pattern are smaller than transmission pauses between sub-data packets transmitted according to the second hopping pattern, and/or wherein sub-data packets transmitted according to the first hopping pattern are shorter than sub-data packets transmitted according to the second hopping pattern.

2. The communication apparatus according to claim 1, wherein the data of the first class comprises a higher priority and/or higher requirements as to a maximum transfer duration than the data of the second class.

3. The communication apparatus according to claim 1, the data transceiver is configured to divide data of a third class onto a third plurality of sub-data packets and to transmit the third plurality of sub-data packets using a third hopping pattern;
wherein the transmission pauses between the sub-data packets transmitted according to the second hopping pattern are smaller than transmission pauses between sub-data packets transmitted according to the third hopping pattern.

4. The communication apparatus according to claim 3, wherein the data of the second class comprises a higher priority and/or higher requirements as to a maximum transfer duration than the data of the third class.

5. The communication apparatus according to claim 1, wherein the data transceiver is configured to divide the data of the first class or a first data packet comprising the data of the first class onto the first plurality of sub-data packets such that each of the first plurality of sub-data packets comprises only a part of the data of the first class or of the first data packet, wherein the data transceiver is configured to divide the data of the second class or a second data packet comprising the data of the second class onto the second plurality of sub-data packets such that each of the second plurality of sub-data packets only comprises a part of the data of the second class or of the second data packet.

6. The communication apparatus according to claim 1, wherein the first plurality of sub-data packets comprises fewer sub-data packets than the second plurality of sub-data packets.

7. The communication apparatus according to claim 1, wherein the data transceiver is configured to transmit the data of the first class with a higher data rate or a different modulation method than the data of the second class.

8. The communication apparatus according to claim 1, wherein the data transceiver is configured, upon transmitting the data of the first class, to receive from a data receiver an acknowledgement of receipt signaling a successful receipt of the data of the first class.

9. The communication apparatus according to claim 8, wherein the data transceiver is configured to receive from the data receiver the acknowledgement of receipt temporally overlapping to the emission of:
the data of the first class using the first hopping pattern,
or the data of the second class using the second hopping pattern,
so that at least one sub-data packet transmitted according to the respective hopping pattern is arranged between two sub-data packets of a hopping pattern with which the acknowledgement of receipt of the data receiver is emitted.

10. The communication apparatus according to claim 1, wherein the data transceiver is configured to channel-encode the data of the first class and transmit the channel-encoded data using the first hopping pattern, wherein the data transceiver is configured to distribute the channel-encoded data of the first class onto the first plurality of sub-data packets such that, in a faultless transfer, only a first group of sub-data packets is needed to successfully decode the data of the first class, and such that, in a faulty transfer, a higher coding gain is achieved through a combination of the first group of sub-data packets and a second group of sub-data packets, wherein the first group of sub-data packets is transmitted temporally before the second group of sub-data packets.

11. The communication apparatus according to claim 1, wherein the data of the first class comprises core information and extension information, wherein the data transceiver is configured to divide the data of the first class onto the first plurality of sub-data packets such that as first group of sub-data packets comprises the core information and a second group of sub-data packets comprises the extension information, wherein the first group of sub-data packets is transmitted temporally before the second group of sub-data packets.

12. The communication apparatus according to claim 1, wherein the data transceiver is configured to calculate the first hopping pattern using address information of the data transmitter or information derived therefrom so that the first hopping pattern itself identifies the data transmitter.

13. The communication apparatus according to claim 12, wherein the data transceiver is configured to calculate the first hopping pattern using time-dependent or event-dependent information of the data transmitter.

14. The communication apparatus according to claim 12, wherein the data transceiver is configured to transmit encoded or encrypted information about the first hopping pattern in advance to a data receiver.

15. The communication apparatus according to claim 1, wherein the first hopping pattern is assigned to the data receiver by a base station.

16. The communication apparatus according to claim 1, wherein the data transceiver is configured to acquire, from a base station of a communication network, short address information that is shorter than address information unambiguously identifying the data transmitter within the communication network and to use the short address information when emitting with the first hopping pattern.

17. The communication apparatus according to claim 1, wherein the first hopping pattern is assigned to the data transmitter by a base station according to frequency of use and/or a priority.

18. The communication apparatus according to claim 17, wherein the data transceiver is configured to distribute the channel-encoded data of the first class onto the first plurality of sub-data packets such that, in a faulty transfer, a higher coding gain is achieved through a combination of the first group of sub-data packets and the second group of sub-data packets.

19. The communication apparatus according to claim 1, wherein the first hopping pattern comprises a plurality of sub-hopping patterns that are time-shifted and/or frequency-shifted versions of each other;
wherein the data transceiver is configured to transmit the first plurality of sub-data packets according to the plurality of sub-hopping patterns;

wherein the plurality of sub-hopping patterns are interleaved in each other such that sub-data packets assigned to different sub-hopping patterns are alternately transmitted.

20. A communication apparatus, comprising:
a data transceiver comprising one or more processors or electronic circuits, wherein the data transceiver is configured to channel-encode data and to divide the channel-encoded data onto a plurality of sub-data packets and to transmit the plurality of sub-data packets according to a hopping pattern;
wherein the data transceiver is configured to channel-encode the data and to divide the channel-encoded data onto the plurality of sub-data packets such that, in a faultless transfer, only a first group of sub-data packets is needed to successfully decode the data, wherein transmission pauses between the sub-data packets of the first group of sub-data packets are smaller than transmission pauses between sub-data packets of a second group of sub-data packets transmitted after the first group of sub-data packets;
wherein transmission pauses between the sub-data packets of the first group of sub-data packets are smaller than transmission pauses between sub-data packets of a second group of sub-data packets transmitted after the first group of sub-data packets;
wherein the data transceiver is configured to distribute the channel-encoded data of the first class onto the first plurality of sub-data packets such that, in a faulty transfer, a higher coding gain is achieved through a combination of the first group of sub-data packets and the second group of sub-data packets.

21. The communication apparatus according to claim 20, wherein data transceiver is configured to divide data of a second class onto a second plurality of sub-data packets and to transmit the second plurality of sub-data packets using a second hopping pattern;
wherein the transmission pauses between the sub-data packets transmitted according to the first hopping pattern are smaller than the transmission pauses between the sub-data packets transmitted according to the second hopping pattern.

22. The communication apparatus according to claim 20, wherein the first hopping pattern comprises a plurality of sub-hopping patterns that are time-shifted and/or frequency-shifted versions of each other;
wherein the data transceiver is configured to transmit the first plurality of sub-data packets according to the plurality of sub-hopping patterns;
wherein the plurality of sub-hopping patterns are interleaved in each other such that sub-data packets assigned to different sub-hopping patterns are alternately transmitted.

23. A communication apparatus comprising a data transceiver comprising one or more processors or electronic circuits, wherein the data transceiver is configured to divide data onto a plurality of sub-data packets and to transmit the plurality of sub-data packets using a first hopping pattern, wherein the data transceiver is configured to repeatedly transmit the plurality of sub-data packets using a second hopping pattern;
wherein transmission pauses between sub-data packets transmitted according to the first hopping pattern are smaller than transmission pauses between sub-data packets transmitted according to the second hopping pattern.

24. The communication apparatus according to claim 23, wherein the first hopping pattern extends across two separate frequency bands.

25. The communication apparatus according to claim 23, wherein the data transceiver is configured to transmit the data using the first hopping pattern twice in two separate frequency bands.

26. The communication apparatus according to claim 23, wherein the data transceiver is configured to emit the data using the second hopping pattern in two separate frequency bands.

27. The communication apparatus according to claim 23, wherein the data transceiver is configured to transmit the data using the second hopping pattern twice in two separate frequency bands.

28. The communication apparatus according to claim 23, wherein the data transceiver is configured to emit in an interleaved manner the data using the first hopping pattern and repeatedly using the second hopping pattern so that at least one sub-data packet transmitted according to the second hopping pattern is arranged between two sub-data packets transmitted according to the first hopping pattern.

29. The communication apparatus according to claim 23, wherein data transceiver is configured to divide data of a second class onto a second plurality of sub-data packets and to transmit the second plurality of sub-data packets using a second hopping pattern;
wherein the transmission pauses between the sub-data packets transmitted according to the first hopping pattern are smaller than the transmission pauses between the sub-data packets transmitted according to the second hopping pattern.

30. The communication apparatus according to claim 23, wherein the first hopping pattern comprises a plurality of sub-hopping patterns that are time-shifted and/or frequency-shifted versions of each other;
wherein the data transceiver is configured to transmit the first plurality of sub-data packets according to the plurality of sub-hopping patterns;
wherein the plurality of sub-hopping patterns are interleaved in each other such that sub-data packets assigned to different sub-hopping patterns are alternately transmitted.

31. A communication apparatus comprising a data transceiver comprising one or more processors or electronic circuits, wherein the data transceiver is configured to emit data of a first class using a data packet, and wherein the data transceiver is configured to divide the data onto a plurality sub-data packets and to repeatedly emit the data using the plurality of sub-data packets, wherein the plurality of sub-data packets is emitted according to a first hopping pattern;
wherein data transceiver is configured to divide data of a second class onto a second plurality of sub-data packets and to transmit the second plurality of sub-data packets using a second hopping pattern;
wherein the transmission pauses between the sub-data packets transmitted according to the first hopping pattern are smaller than the transmission pauses between the sub-data packets transmitted according to the second hopping pattern.

32. The communication apparatus according to claim 31, the data transceiver is configured to repeatedly emit the data of the first class using a further data packet.

33. The communication apparatus according to claim 32, wherein the data transceiver is configured to emit in a temporally interleaved manner the data of the first class using the further data packet and using the plurality of sub-data packets so that the further data packet is temporally arranged between two of the plurality of sub-data packets.

34. The communication apparatus according to claim 31, wherein the data transceiver is configured to select a temporal interval between the emission of the data packet and the plurality of sub-data packets to have such a size that receiving an acknowledgement of receipt from a data receiver is possible in the temporal interval.

35. The communication apparatus according to claim 31, wherein the first hopping pattern comprises a plurality of sub-hopping patterns that are time-shifted and/or frequency-shifted versions of each other;
   wherein the data transceiver is configured to transmit the first plurality of sub-data packets according to the plurality of sub-hopping patterns;
   wherein the plurality of sub-hopping patterns are interleaved in each other such that sub-data packets assigned to different sub-hopping patterns are alternately transmitted.

36. The communication apparatus according to claim 35, wherein the data transceiver is configured to provide the first plurality of sub-data packets and the second plurality of sub-data packets with the same synchronization sequences for synchronizing the first plurality of sub-data packets and the second plurality of sub-data packets in a data receiver.

37. A communication apparatus comprising a data transceiver comprising one or more processors or electronic circuits, wherein the data transceiver is configured to receive, using a first hopping pattern, data of a first class transferred divided onto a first plurality of sub-data packets, wherein the data transceiver is configured to receive, using a second hopping pattern, data of a second class transferred divided onto a second plurality of sub-data packets;
   wherein transmission pauses between sub-data packets received according to the first hopping pattern are smaller than transmission pauses between sub-data packets received according to the second hopping pattern, and/or wherein sub-data packets transmitted according to the first hopping pattern are shorter than sub-data packets transmitted according to the second hopping pattern.

38. The communication apparatus according to claim 37, wherein the data of the first class comprise a higher priority and/or higher requirements as to a maximum transfer duration than the data of the third class.

39. The communication apparatus according to claim 37, wherein the data transceiver is configured to receive, using a third hopping pattern, data of a third class transferred divided onto a third plurality of sub-data packets;
   wherein the transmission pauses between the sub-data packets received according to the second hopping pattern are smaller than transmission pauses between sub-data packets received according to the third hopping pattern.

40. The communication apparatus according to claim 39, wherein the data of the second class comprises a higher priority and/or higher requirements as to a maximum transfer duration than the data of the third class.

41. The communication apparatus according to claim 37, wherein the data of the first class or a first data packet comprising the data of the first class is divided onto the first plurality of sub-data packets such that each of the first plurality of sub-data packets only comprises a part of the data of the first class or of the first data packet, wherein the data transceiver is configured to receive and combine the first plurality of sub-data packets in order to acquire the data of the first class; and/or
   wherein the data of the second class or a second data packet comprising the data of the second class is divided onto the second plurality of sub-data packets such that each of the second plurality of sub-data packets only comprises a part of the data of the second class or of the second data packet, wherein the data transceiver is configured to receive and combine the second plurality of sub-data packets in order to acquire the data of the second class.

42. The communication apparatus according to claim 37, wherein the first plurality of sub-data packets comprises fewer sub-data packets that the second plurality of sub-data packets.

43. The communication apparatus according to claim 37, wherein the data of the first class is transferred with a higher data rate or with a different modulation method than the data of the second class.

44. The communication apparatus according to claim 37, wherein the data receiver comprises a data transceiver configured to transmit a first message temporally synchronized to the reception of the data of the first class using the first hopping pattern, and wherein the data transceiver is configured to transmit a second message temporally synchronized to the reception of the data of the second class using the second hopping pattern;
   wherein a temporal interval between the first hopping pattern and the first message is smaller than a temporal interval between the second hopping pattern and the second message.

45. The communication apparatus according to claim 44, wherein the first message is a first downlink message transferred divided onto a plurality of sub-data packets according to a first downlink hopping pattern, wherein the second message is a second downlink message transferred divided onto a plurality of sub-data packets according to a second downlink hopping pattern, wherein transmission pauses between the plurality of sub-data packets transferred by means of the first downlink hopping pattern are shorter than transmission pauses between the plurality of sub-data packets transferred by means of the second downlink hopping pattern.

46. The communication apparatus according to claim 37, wherein the data transceiver is configured to emit, responsive to a successful reception of the data of the first class, an acknowledgement of receipt signalizing a successfully reception of the data of the first class;
   wherein the data transceiver is configured to emit the acknowledgement of receipt only for the data of the first class and not for the data of the second class.

47. The communication apparatus according to claim 46, wherein the data transceiver is configured to emit, using a hopping pattern, the acknowledgement of receipt pattern temporally overlapping to the reception of:
   the data of the first class using the first hopping pattern,
   or the data of the second class using the second hopping pattern,
   such that at least one sub-data packet transferred according to the first hopping pattern or second hopping pattern is arranged between two sub-data packets of the hopping pattern with which the acknowledgement of receipt is emitted.

48. The communication apparatus according to claim 37, wherein the data of the first class is channel-encoded, wherein the channel-encoded data of the first class is distributed onto the first plurality of sub-data packets such that, in a faultless transfer, only a first group of sub-data packets is needed to successfully decode the data of the first class, and such that, in a faulty transfer, a higher coding gain is achieved through a combination of the first group of sub-data packets and a second group of sub-data packets, wherein the first group of sub-data packets is transferred temporally before the second group of sub-data packet;
  wherein the data transceiver is configured to decode a first part of the channel-encoded data received with the first group of sub-data packets in order to acquire the data of the first class, and, if decoding the data of the first class has not been successful, to combine, for achieving a higher coding gain, at least a second part of the channel-encoded data received with at least a second group of sub-data packets with the first part of the channel-encoded data and to decode the combination of the first part of the channel-encoded data and the at least second part of the channel-encoded data in order to acquire the data of the first class.

49. The communication apparatus according to claim 37, wherein the data of the first class comprises core information and extension information, wherein the data of the first class is divided onto the first plurality of sub-data packets such that a first group of sub-data packets comprises the core information and a second group of sub-data packets comprises the extension information, wherein the first group of sub-data packets is transferred temporally before the second group of sub-data packets;
  wherein the data transceiver is configured to first receive the first group of sub-data packets and to then receive the second group of sub-data packets in order to acquire the core information before the extension information.

50. The communication apparatus according to claim 37, wherein the first hopping pattern is calculated using address information of a data transmitter or information derived therefrom so that the first hopping pattern itself identifies the data transmitter;
  wherein the data transceiver is configured to identify the data transmitter based on the first hopping pattern.

51. The communication apparatus according to claim 50, wherein the first hopping pattern is further calculated using time-dependent or even-dependent information of the data transmitter;
  wherein the time-dependent or even-dependent information is known to the data transceiver or is transferred encrypted in at least one of the plurality of sub-data packets or a different data packet.

52. The communication apparatus according to claim 50, wherein the data transceiver is configured to receive encoded or encrypted information about the first hopping pattern in advance from the data transmitter.

53. The communication apparatus according to claim 37, wherein the data receiver is configured to assign the first hopping pattern to a data transmitter.

54. The communication apparatus according to claim 37, wherein the data receiver is configured to assign to a data transmitter short address information that is shorter than address information unambiguously identifying the data transmitter within a communication network;
  wherein the data receiver is configured to identify the data transmitter based on the short information.

55. The communication apparatus according to claim 37 wherein the data receiver is configured to assign the first hopping pattern to a data transmitter according to a frequency of use and/or a priority.

56. The communication apparatus according to claim 37, wherein the first hopping pattern comprises a plurality of sub-hopping patterns that are time-shifted and/or frequency-shifted versions of each other;
  wherein the data transceiver is configured to receive the first plurality of sub-data packets according to the plurality of sub-hopping patterns,
  wherein the plurality of sub-hopping patterns are interleaved in each other such that sub-data packets assigned to different sub-hopping patterns are alternately transferred.

57. A communication apparatus, comprising:
  a data transceiver comprising one or more processors or electronic circuits, wherein the data transceiver is configured to receive channel-encoded data, wherein the channel-encoded data is divided onto a plurality of sub-data packets and transferred distributed according to a hopping pattern, wherein the data is channel-encoded and divided onto the plurality of sub-data packets such that, in a faultless transfer, only a first group of sub-data packets is needed to successfully decode the data, wherein transmission pauses between the sub-data packets of the first group of sub-data packets are smaller than transmission pauses between sub-data packets of a second group of sub-data packets transmitted after the first group of sub-data packets;
  wherein the data transceiver is configured to receive at least the first group of sub-data packets, and to decode a part of the channel-encoded data received with the first group of sub-data packets in order to acquire the data;
  wherein the data transceiver is configured to, if decoding the data has not been successful, combine, for achieving a higher coding gain, at least a second part of the channel-encoded data received with at least a second group of sub-data packets with the first part of the channel-encoded data and to decode the combination of the first part of the channel-encoded data and the at least second part of the channel-encoded data in order to acquire the data.

58. The communication apparatus according to claim 57, wherein the data transceiver is configured to receive, using a second hopping pattern, data of a second class transferred divided onto a second plurality of sub-data packets;
  wherein transmission pauses between two sub-data packets transferred according to the first hopping pattern are smaller than transmission pauses between sub-data packets transferred according to the second hopping pattern.

59. The communication apparatus according to claim 57, wherein the first hopping pattern comprises a plurality of sub-hopping patterns that are time-shifted and/or frequency-shifted versions of each other;
  wherein the data transceiver is configured to receive the first plurality of sub-data packets according to the plurality of sub-hopping patterns,
  wherein the plurality of sub-hopping patterns are interleaved in each other such that sub-data packets assigned to different sub-hopping patterns are alternately transferred.

60. A communication apparatus comprising:
  a data transceiver comprising one or more processors or electronic circuits, wherein the data transceiver is configured to receive data divided onto a plurality of sub-data packets and transferred using a first hopping pattern and repeatedly using a second hopping pattern;
  wherein transmission pauses between sub-data packets transferred according to the first hopping pattern are smaller than transmission pauses between sub-data packets transferred according to the second hopping pattern.

61. The communication apparatus according to claim 60, wherein the first hopping pattern extends across two separate frequency bands.

62. The communication apparatus according to claim 60, wherein the data transceiver is configured to receive the data using the first hopping pattern twice in two separate frequency bands.

63. The communication apparatus according to claim 60, wherein the data transceiver is configured to receive the data using the second hopping pattern in two separate frequency bands.

64. The communication apparatus according to claim 60, the data transceiver is configured to receive the data using the second hopping pattern twice in two separate frequency bands.

65. The communication apparatus according to claim 60, wherein the data transceiver is configured to receive the data in an interleaved manner using the first hopping pattern and repeatedly using the second hopping pattern so that at least one hop of the second hopping pattern is arranged between two hops of the first hopping pattern.

66. The communication apparatus according to claim 60, wherein the data transceiver is configured to receive, using a second hopping pattern, data of a second class transferred divided onto a second plurality of sub-data packets;
wherein transmission pauses between two sub-data packets transferred according to the first hopping pattern are smaller than transmission pauses between sub-data packets transferred according to the second hopping pattern.

67. The communication apparatus according to claim 60, wherein the first hopping pattern comprises a plurality of sub-hopping patterns that are time-shifted and/or frequency-shifted versions of each other;
wherein the data transceiver is configured to receive the first plurality of sub-data packets according to the plurality of sub-hopping patterns,
wherein the plurality of sub-hopping patterns are interleaved in each other such that sub-data packets assigned to different sub-hopping patterns are alternately transferred.

68. A communication apparatus, comprising:
a data transceiver comprising one or more processors or electronic circuits, wherein the data transceiver is configured to receive data of a first class transferred using a data packet, and wherein the data transceiver is configured to receive, according to a first hopping pattern, the data divided on a plurality of data packets and transferred repeatedly using the plurality of sub-data packets;
wherein the data transceiver is configured to transmit an acknowledgement of receipt in a temporal interval between the reception of the data packet and the plurality of sub-data packets;
wherein transmission pauses between sub-data packets received according to the first hopping pattern are smaller than transmission pauses between sub-data packets received according to the second hopping pattern.

69. The communication apparatus according to claim 68, wherein the data transceiver is configured to receive the data of the first class repeatedly using a further data packet.

70. The communication apparatus according to claim 69, wherein the reception unit is configured to receive in a temporally interleaved manner the data of the first class using the further data packet and using the plurality of sub-data packets so that the further data packet is temporally arranged between two of the plurality of sub-data packets.

71. The communication apparatus according to claim 68, wherein the data transceiver is configured to transmit an acknowledgement of receipt in a temporal interval between the reception of the data packet and the plurality of sub-data packets.

72. The communication apparatus according to claim 68, wherein the data transceiver is configured to receive, using a second hopping pattern, data of a second class transferred divided onto a second plurality of sub-data packets;
wherein transmission pauses between two sub-data packets transferred according to the first hopping pattern are smaller than transmission pauses between sub-data packets transferred according to the second hopping pattern.

73. The communication apparatus according to claim 68, wherein the first hopping pattern comprises a plurality of sub-hopping patterns that are time-shifted and/or frequency-shifted versions of each other;
wherein the data transceiver is configured to receive the first plurality of sub-data packets according to the plurality of sub-hopping patterns,
wherein the plurality of sub-hopping patterns are interleaved in each other such that sub-data packets assigned to different sub-hopping patterns are alternately transferred.

74. A method for transmitting data, the method comprising:
transmitting data of a first class from a data transmitter to a data receiver, wherein the data of the first class is transmitted divided onto a first plurality of sub-data packets using a first hopping pattern;
transmitting data of a second class from the data transmitter or a different data transmitter to the data receiver, wherein the data of the second class is transmitted divided onto a second plurality of sub-data packets using a second hopping pattern;
wherein transmission pauses between sub-data packets transmitting according to the first hopping pattern are smaller than transmission pauses between sub-data packets transmitted according to the second hopping pattern.

75. A non-transitory digital storage medium having a computer program stored thereon to perform a method for transmitting data, the method comprising:
transmitting data of a first class from a data transmitter to a data receiver, wherein the data of the first class is transmitted divided onto a first plurality of sub-data packets using a first hopping pattern;
transmitting data of a second class from the data transmitter or a different data transmitter to the data receiver, wherein the data of the second class is transmitted divided onto a second plurality of sub-data packets using a second hopping pattern;
wherein transmission pauses between sub-data packets transmitted according to the first hopping pattern are smaller than transmission pauses between sub-data packets transmitted according to the second hopping pattern,
when said computer program is run by a computer.

76. A communication apparatus, comprising:
a data transmitter comprising one or more processors or electronic circuits, wherein the data transmitter is configured to transmit, distributed in time and/or frequency according to a hopping pattern, data divided onto a plurality of sub-data packets, wherein the hopping pattern is a time hopping pattern, a frequency hopping pattern or a combination of the time hopping pattern and the frequency hopping pattern, wherein the time hopping pattern is the time hopping pattern with 24 hops indicated in the following table:

| # of sub-data packets in the core frame SC | | | | | | | | | | | | | | | | | | | | | | | |
|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 66 | 66 | 66 | 66 | 66 | 66 | 66 | 66 | 66 | 123 | 66 | 66 | 66 | 66 | 60 | 66 | 66 | 198 | 66 | 66 | 255 | 66 | 66 | wherein the line in the table is the time hopping pattern, wherein each column in the table is a hop of the time hopping pattern starting from a second hop so that each time hopping pattern comprises 24 hops, wherein each cell in the table indicates a temporal interval of a reference point of the respective hop to a same reference point of an immediately subsequent hop in—advantageously multiples of—symbol durations;

wherein the frequency hopping pattern is the frequency hopping pattern with 24 hops indicated in the following table:

| # of sub-data packets in the core frame SC | | | | | | | | | | | | | | | | | | | | | | | |
|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 1 | 5 | 4 | 3 | 2 | 17 | 21 | 20 | 19 | 18 | 9 | 13 | 12 | 11 | 10 | 6 | 0 | 7 | 22 | 16 | 23 | 14 | 8 | 15 | wherein the line in the table is the frequency hopping pattern, wherein each column in the table is a hop of the frequency hopping pattern, wherein each cell in the table indicates a transmission frequency of the respective hop of the frequency hopping pattern in carriers from 0 to 23 of an uplink carrier group.

77. The communication apparatus according to claim 76, wherein the data is of a first class, wherein the plurality of sub-data packets is a first plurality of sub-data packets, and wherein the hopping pattern is a first hopping pattern;
wherein the data transmitter is configured to divide data of a second class onto a second plurality of sub-data packets and to transmit the second plurality of sub-data packets using a second hopping pattern,
wherein transmission pauses between sub-data packets transmitted according to the first hopping pattern are smaller than transmission pauses between sub-data packets transmitted according to the second hopping pattern, and/or wherein sub-data packets transmitted according to the first hopping pattern are shorter than sub-data packets transmitted according to the second hopping pattern.

78. A communication apparatus, comprising:
a data receiver comprising one or more processors or electronic circuits, wherein the data receiver is configured to receive data transferred divided onto a plurality of sub-data packets and distributed in time and/or frequency according to a hopping pattern, wherein the hopping pattern is a time hopping pattern, a frequency hopping pattern or a combination of the time hopping pattern and the frequency hopping pattern, wherein the time hopping pattern is the time hopping pattern with 24 hops indicated in the following table:

| # of sub-data packets in the core frame SC | | | | | | | | | | | | | | | | | | | | | | | |
|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 66 | 66 | 66 | 66 | 66 | 66 | 66 | 66 | 66 | 123 | 66 | 66 | 66 | 66 | 60 | 66 | 66 | 198 | 66 | 66 | 255 | 66 | 66 | wherein the line in the table is the time hopping pattern, wherein each column in the table is a hop of the time hopping pattern starting from a second hop so that each time hopping pattern comprises 24 hops, wherein each cell in the table indicates a temporal interval of a reference point of the respective hop to a same reference point of an immediately subsequent hop in—advantageously multiples of—symbol durations;

wherein the frequency hopping pattern is the frequency hopping pattern with 24 hops indicated in the following table:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 1 | 5 | 4 | 3 | 2 | 17 | 21 | 20 | 19 | 18 | 9 | 13 | 12 | 11 | 10 | 6 | 0 | 7 | 22 | 16 | 23 | 14 | 8 | 15 | wherein the line in the table is the frequency hopping pattern, wherein each column in the table is a hop of the frequency hopping pattern, wherein each cell in the table indicates a transmission frequency of the respective hop of the frequency hopping pattern in carriers from 0 to 23 of an uplink carrier group.

79. The communication apparatus according to claim 78, wherein the data is of a first class, wherein the plurality of sub-data packets is a first plurality of sub-data packets, and wherein the hopping pattern is a first hopping pattern;

wherein the data receiver is configured to receive data of a second class transferred divided onto a second plurality of sub-data packets, distributed in time/or frequency according to a second hopping pattern;

wherein transmission pauses between sub-data packets received according to the first hopping pattern are smaller than transmission pauses between sub-data packets received according to the second hopping pattern, and/or wherein sub-data packets transmitted according to the first hopping pattern are shorter than sub-data packets transmitted according to the second hopping pattern.

80. A method for transmitting data, the method comprising:

transmitting data using a hopping pattern, wherein the hopping pattern is a time hopping pattern, a frequency hopping pattern or a combination of the time hopping pattern and the frequency hopping pattern, wherein the time hopping pattern is the time hopping pattern with 24 hops indicated in the following table:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | |
| 1 | 66 | 66 | 66 | 66 | 66 | 66 | 66 | 66 | 66 | 123 | 66 | 66 | 66 | 66 | 60 | 66 | 66 | 198 | 66 | 66 | 255 | 66 | 66 | | wherein the line in the table is the time hopping pattern, wherein each column in the table is a hop of the time hopping pattern starting from a second hop so that each time hopping pattern comprises 24 hops, wherein each cell in the table indicates a temporal interval of a reference point of the respective hop to a same reference point of an immediately subsequent hop in—advantageously multiples of—symbol durations;

wherein the frequency hopping pattern is the frequency hopping pattern with 24 hops indicated in the following table:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 1 | 5 | 4 | 3 | 2 | 17 | 21 | 20 | 19 | 18 | 9 | 13 | 12 | 11 | 10 | 6 | 0 | 7 | 22 | 16 | 23 | 14 | 8 | 15 | wherein the line in the table is the frequency hopping pattern, wherein each column in the table is a hop of the frequency hopping pattern, wherein each cell in the table indicates a transmission frequency of the respective hop of the frequency hopping pattern in carriers from 0 to 23 of an uplink carrier group.

81. A method for receiving data, the method comprising:
receiving data using a hopping pattern,
wherein the hopping pattern is a time hopping pattern, a frequency hopping pattern or a combination of the time hopping pattern and the frequency hopping pattern,
wherein the time hopping pattern is the time hopping pattern with 24 hops indicated in the following table:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| 1 | 66 | 66 | 66 | 66 | 66 | 66 | 66 | 66 | 66 | 123 | 66 | 66 | 66 | 66 | 60 | 66 | 66 | 198 | 66 | 66 | 255 | 66 | 66 | wherein the line in the table is the time hopping pattern, wherein each column in the table is a hop of the time hopping pattern starting from a second hop so that each time hopping pattern comprises 24 hops, wherein each cell in the table indicates a temporal interval of a reference point of the respective hop to a same reference point of an immediately subsequent hop in—advantageously multiples of—symbol durations;
wherein the frequency hopping pattern is the frequency hopping pattern with 24 hops indicated in the following table:

| | # of sub-data packets in the core frame SC | | | | | | | | | | | | | | | | | | | | | | | |
|---|---|---|---|---|---|---|---|---|---|---|---|---|---|---|---|---|---|---|---|---|---|---|---|---|
| No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 1 | 5 | 4 | 3 | 2 | 17 | 21 | 20 | 19 | 18 | 9 | 13 | 12 | 11 | 10 | 6 | 0 | 7 | 22 | 16 | 23 | 14 | 8 | 15 | wherein the line in the table is the frequency hopping pattern, wherein each column in the table is a hop of the frequency hopping pattern, wherein each cell in the table indicates a transmission frequency of the respective hop of the frequency hopping pattern in carriers from 0 to 23 of an uplink carrier group.

82. A communication apparatus, comprising:
a data transmitter comprising one or more processors or electronic circuits, wherein the data transmitter is configured to divide data of a first class onto a first plurality of sub-data packets and to transmit the first plurality of sub-data packets using a first hopping pattern, wherein the data transmitter is configured to divide data of a second class onto a second plurality of sub-data packets and to transmit the second plurality of sub-data packets using a second hopping pattern,
wherein transmission pauses between sub-data packets transmitted according to the first hopping pattern are smaller than transmission pauses between sub-data packets transmitted according to the second hopping pattern, and/or wherein sub-data packets transmitted according to the first hopping pattern are shorter than sub-data packets transmitted according to the second hopping pattern;
wherein the data transmitter is configured to channel-encode the data of the first class and transmit the channel-encoded data of the first class using the first hopping pattern, wherein the data transmitter is configured to distribute the channel-encoded data of the first class onto the first plurality of sub-data packets such that, in a faultless transfer, only a first group of sub-data packets is needed to successfully decode the data of the first class, and such that, in a faulty transfer, a higher coding gain is achieved through a combination of the first group of sub-data packets and a second group of sub-data packets, wherein the first group of sub-data packets is transmitted temporally before the second group of sub-data packets.

83. A communication apparatus, comprising:
a data receiver comprising one or more processors or electronic circuits, the data receiver configured to receive, using a first hopping pattern, data of a first class transferred divided onto a first plurality of sub-data packets, wherein the data receiver is configured to receive, using a second hopping pattern, data of a second class transferred divided onto a second plurality of sub-data packets;
wherein transmission pauses between sub-data packets received according to the first hopping pattern are smaller than transmission pauses between sub-data packets received according to the second hopping pattern, and/or wherein sub-data packets transmitted according to the first hopping pattern are shorter than sub-data packets transmitted according to the second hopping pattern;
wherein the data of the first class is channel-encoded, wherein the channel-encoded data of the first class is distributed onto the first plurality of sub-data packets such that, in a faultless transfer, only a first group of sub-data packets is needed to successfully decode the data of the first class, and such that, in a faulty transfer, a higher coding gain is achieved through a combination of the first group of sub-data packets and a second group of sub-data packets, wherein the first group of sub-data packets is transferred temporally before the second group of sub-data packet;
wherein the data receiver is configured to decode a first part of the channel-encoded data received with the first group of sub-data packets in order to acquire the data of the first class, and, if decoding the data of the first class has not been successful, to combine, for achieving a higher coding gain, at least a second part of the channel-encoded data received with at least a second group of sub-data packets with the first part of the channel-encoded data and to decode the first part of the channel-encoded data and the at least second part of the channel-encoded data in order to acquire the data of the first class.

* * * * *

UNITED STATES PATENT AND TRADEMARK OFFICE
CERTIFICATE OF CORRECTION

| | |
|---|---|
| PATENT NO. | : 11,909,519 B2 |
| APPLICATION NO. | : 16/868272 |
| DATED | : February 20, 2024 |
| INVENTOR(S) | : Gerd Kilian et al. |

It is certified that error appears in the above-identified patent and that said Letters Patent is hereby corrected as shown below:

On the Title Page

Item (72) Inventors:
1. Delete "Raimund Meyer, Erlangen (DE);" and insert -- Raimund Meyer, Fuerth (DE); --
2. Delete "Frank Obernosterer, Fuerth (DE);" and insert -- Frank Obernosterer, Nuernberg (DE); --

Signed and Sealed this
Twenty-ninth Day of October, 2024

Katherine Kelly Vidal
*Director of the United States Patent and Trademark Office*